(12) United States Patent
Aldeguer Manté et al.

(10) Patent No.: US 12,514,897 B2
(45) Date of Patent: Jan. 6, 2026

(54) GRAPE SKIN FOR USE IN THE TREATMENT OF DYSBIOSIS

(71) Applicant: GOODGUT S.L., Girona (ES)

(72) Inventors: Xavier Aldeguer Manté, Girona (ES); Librado Jesús García-Gil, Fontcoberta (ES); Mariona Serra Pagès, Figueres (ES)

(73) Assignee: GOODGUT S.L., Girona (ES)

( * ) Notice: Subject to any disclaimer, the term of this patent is extended or adjusted under 35 U.S.C. 154(b) by 1356 days.

(21) Appl. No.: 16/617,449

(22) PCT Filed: Jun. 4, 2018

(86) PCT No.: PCT/EP2018/064669
§ 371 (c)(1),
(2) Date: Nov. 26, 2019

(87) PCT Pub. No.: WO2018/220237
PCT Pub. Date: Dec. 6, 2018

(65) Prior Publication Data
US 2023/0149497 A1 May 18, 2023

(30) Foreign Application Priority Data
Jun. 2, 2017 (EP) .................................. 17382332

(51) Int. Cl.
*A61K 36/87* (2006.01)
*A61P 1/00* (2006.01)

(52) U.S. Cl.
CPC .............. *A61K 36/87* (2013.01); *A61P 1/00* (2018.01)

(58) Field of Classification Search
CPC ........ A61K 36/87; A61K 35/37; A61K 35/38; A61P 1/00; A61P 1/04; A23L 33/105; C12Q 1/689
See application file for complete search history.

(56) References Cited

U.S. PATENT DOCUMENTS

| | | | | |
|---|---|---|---|---|
| 2005/0152901 A1* | 7/2005 | Pickford | ................. | A61P 43/00 424/145.1 |
| 2005/0239902 A1* | 10/2005 | Locke | .................... | A61K 31/12 514/689 |
| 2006/0121137 A1* | 6/2006 | Hartle | .................... | A61K 36/87 424/766 |

FOREIGN PATENT DOCUMENTS

| | | |
|---|---|---|
| CN | 104939074 A | 9/2015 |
| WO | 2013/067146 A1 | 5/2013 |
| WO | 2014/070014 A1 | 5/2014 |

OTHER PUBLICATIONS

Aura et al., "Characterization of microbial metabolism of Syrah grape products in an in vitro colon model using targeted and non-targeted analytical approaches," *Eur. J. Nutr.* 52:833-846, 2013.

Benus et al., "Association between *Faecalibacterium prausnitzii* and dietary fibre in colonic fermentation in healthy human subjects," *British Journal of Nutrition* 104:693-670, 2010.

Bralley et al., "Anti-inflammatory effects of muscadine skin extract in experimentally-induced ulcerative colitis in rats," from the Thesis: *Nutraceutical properties of the muscadine grape (Vitis rotundifolia), Sorghum Bicolor, and Polygonum cuspidatum*, University of Georgia, Athens, GA, 2007.

Bravo et al., "Characterization of Dietary Fiber and the In Vitro Indigestible Fraction of Grape Pomace," *Am. J. Enol. Vitic.* 49(2):135-141, 1998.

Carding et al., "Dysbiosis of the gut microbiota in disease," *Microb. Ecol. Health Dis.* 26:10.3402, 2015. (9 pages).

Goodgut, "Junts, fem front a les malaties digestives," Abstract, Retrieved on Oct. 16, 2017, from https://www.accucatalunya.cat/ca/noticies/goodgut-junts-fem-front-a-les-malalties-digestives/. (w/ English machine translation).

Liu et al., "Grape seed proanthocyanidin extract ameliorates inflammation and adiposity by modulating gut microbiota in high-fat diet mice," *Mol. Nutr. Food Res.* 61(9):1601082, 2017.

Lopez-Siles et al., "Changes in the Abundance of *Faecalibacterium prausnitzii* Phylogroups I and II in the Intestinal Mucosa of Inflammatory Bowel Disease and Patients with Colorectal Cancer," *Inflamm. Bowel Dis.* 22(1):28-41, 2016.

Lopez-Siles et al., "Cultured Representatives of Two Major Phylogroups of Human Colonic *Faecalibacterium prausnitzii* Can Utilize Pectin, Uronic Acids, and Host-Derived Substrates for Growth," *Applied and Environmental Microbiology* 78(2):420-428, 2012.

Lopez-Siles et al., "*Faecalibacterium prausnitzii*: from microbiology to diagnostics and prognostics," *The ISME Journal* 11:841-852, 2017.

Lopez-Siles et al., "Mucosa-Associated *Faecalibacterium prausnitzii* Phylotype Richness Is Reduced in Patients with Inflammatory Bowel Disease," *Appl. Environ. Microbiol.* 81:7582-7592, 2015.

Machiels et al., "A decrease of the butyrate-producing species *Roseburia hominis* and *Faecalibacterium prausnitzii* defines dysbiosis in patients with ulcerative colitis," *Gut* 63(8):1275-1283, 2014.

Miquel et al., "*Faecalibacterium prausnitzii* and human intestinal health," *Current Opinion in Microbiology* 16:1-7, 2013.

(Continued)

*Primary Examiner* — Aaron J Kosar
*Assistant Examiner* — Jennifer Lynn Cain
(74) *Attorney, Agent, or Firm* — Seed Intellectual Property Law Group LLP

(57) ABSTRACT

The present invention relates to the use of grape skin or a composition comprising it as prebiotic for increasing the intestinal levels and/or activity of butyrate-producing bacteria, such as *Faecalibacterium prausnitzii*, *F. prausnitzii* phylogroup I (PHGI), *F. prausnitzii* phylogroup II (PHGII), *Roseburia hominis* and *Subdoligranulum variabile*, in a subject. More specifically it refers to grape skin or a composition comprising it for use in a method of treating intestinal dysbiosis in a subject, wherein intestinal dysbiosis is characterized by a decrease of butyrate-producing bacteria levels and/or activity. In addition, it pertains to grape skin or a composition comprising it for use in a method of treating an inflammatory or non-inflammatory intestinal disease in a subject having reduced levels and/or reduced activity of butyrate-producing bacteria.

16 Claims, 10 Drawing Sheets

Specification includes a Sequence Listing.

(56) References Cited

OTHER PUBLICATIONS

Ramirez-Farias et al., "Effect of inulin on the human gut mircrobiota: stimulation of *Bifidobacterium adolescentis* and *Faecalibacterium prausnitzii*," *British Journal of Nutrition* 101:541-550, 2009.
Salyers et al. "Fermentation of Mucins and Plant Polysaccharides by Anaerobic Bacteria from the Human Colon," *Appl. Environ. Microbiol.* 34(5):529-533, 1977.
Sartor, "Rationale and Efficacy of Manipulating Intestinal Bacteria in Chronic Intestinal Inflammation by Probiotics, Prebiotics, and Diet," The 111th Abbott Nutrition Research Conference, p. 23-29, 2010. (4 pages).
TCM / SIPO (XP-002774694), "Process for preparing a tonic medicine/A tonic medicated wine, and its preparation method," database accession No. CN-91104654-A, 1 page, 1992.
WPI / 2017 Clarivate Analytics (XP002774703), "Healthcare food useful for e.g. beautifying skin, delaying again and invigorating spleen, comprises white fungus, Chinese yam, pearl barley, papaya, lotus seed, small tomato, grape seed, grape skin, dried rose powder and medlar," database accession No. 2016-076883, 2 pages, 2015.
Goñi et al., "In vitro digestibility and intestinal fermentation of grape seed and peel," *Food Chemistry* 90: 281-286, 2005.
Summary of Annual Meeting of the Pharmaceutical Society of Japan, 130(2), 2010, p. 177 (29P-am158) (w/English Machine Translation).
Kemperman et al., "Impact of polyphenols from black tea and red wine/grape juice on a gut model microbiome," *Food Research International* 53:659-669, 2013.

* cited by examiner

Fig10B                                   Fig10C

GRAPE SKIN FOR USE IN THE TREATMENT OF DYSBIOSIS

FIELD OF INVENTION

The present invention relates to the field of therapeutics and nutraceuticals, in particular it pertains to the use of grape skin or a composition comprising it as prebiotic for increasing the intestinal levels and/or activity of butyrate-producing bacteria, such as *Faecalibacterium prausnitzii, F. prausnitzii* phylogroup I (PHGI), *F. prausnitzii* phylogroup II (PHGII), *Roseburia hominis* and *Subdoligranulum variabile*, in a subject.

More specifically it refers to grape skin or a composition comprising it for use in a method of treating intestinal dysbiosis in a subject, wherein intestinal dysbiosis is characterized by a decrease of butyrate-producing bacteria levels and/or activity. In addition, it pertains to grape skin or a composition comprising it for use in a method of treating an inflammatory or non-inflammatory intestinal disease in a subject having reduced levels and/or reduced activity of butyrate-producing bacteria.

BACKGROUND OF THE INVENTION

There is growing evidence that dysbiosis of the gut microbiota is a condition associated with the pathogenesis of both intestinal and extra-intestinal disorders (Carding et al., Microb Ecol Health Dis. 2015; 26:10.3402; Lopetuso et al., Gut Pathogens 2013, 5:23). Intestinal disorders may include inflammatory bowel disease, irritable bowel syndrome and coeliac disease, while extra-intestinal disorders include for instance allergy, asthma, metabolic syndrome, cardiovascular disease, and obesity.

A reduced abundance of *Faecalibacterium prausnitzii* in intestinal disorders, such as Crohn's disease, ulcerative colitis or colorectal cancer has been reported by various authors (Miquel S. et al., Current Opinion in Microbiology 2013, 16:1-7; Sartor R. B, The 111th Abbott Nutrition Research Conference 2010, p 23-29; Lopez-Siles et al., Appl. Environ Microbiol. 2015, 81:7582-7592; Lopez-Siles et al. Inflamm Bowel Dis 2016, 22:28-41; and Lopez-Siles et al., The ISME Journal 2017, 11:841-852). In particular, inflammatory bowel disease (IBD) patients often present decreased intestinal levels of *F. prausnitzii*. For instance, Miquel S. et al. (Current Opinion in Microbiology 2013, 16:1-7) provides that various studies have reported reduced levels of *F. prausnitzii* in IBD patients both in mucosal and fecal samples and using different quantification techniques, such as RT-qPCR, FISH, etc. (see Table 1 of Miquel S. et al.). *Roseburia hominis*, another butyrate-producing species, has also been reported to be reduced in patients with ulcerative colitis (Machiels et al., Gut. 2014, 63 (8): 1275-83).

Efforts have been made to modulate the intestinal abundance of *F. prausnitzii* with the aim to increase its gut levels, through prebiotic strategies. Nevertheless, it remains unknown which factors modulate the intestinal presence of *F. prausnitzii* and the extent of their influence (Lopez-Siles et al., The ISME Journal 2017, 11:841-852). In particular, it has been reported the use by *F. prausnitzii* of various prebiotic substrates such as inulin (Ramirez-Farias C. et al., British Journal of Nutrition. 2019, 101:541-550); riboflavin (WO 2014/070014 A1), and polydextrose and soluble corn fibre (WO 2013/067146 A1).

The major fermentable component of grape skin fiber has been described to be pectin (Bravo L. and Saura-Calixto F., "Characterization of Dietary Fiber and the In Vitro Indigestible Fraction of Grape Pomace", Am. J. Enol. Vitic., 1998, 49:135-141). Lopez-Siles M. et al. (Appl. Environ. Microbiol. 2012, 78 (2): 420) discloses that *F. prausnitzii* was found to use apple pectin as substrate but that none of the tested *F. prausnitzii* strains were able to grow in citrus pectin (see the legend of Table 2 of page 424). This is in line with the findings of Salyers A. et al. "Fermentation of Mucins and Plant Polysaccharides by Anaerobic Bacteria from the Human Colon", Appl. Environ. Microbiol. 1977, 34:529-533) reporting that *F. prausnitzii* failed to use (citrus) pectin.

Also, Benus R. et al. ("Association between *Faecalibacterium prausnitzii* and dietary fibre in colonic fermentation in healthy human subjects", British Journal of Nutrition. 2010, 104:693-70) teaches that not all pectins are equally usable by *F. prausnitzii*. In particular, the authors reported that a reduction of *F. prausnitzii* and *Roseburia intestinalis* group was observed in healthy human subjects treated with a pea fiber-supplemented diet, which was found by the authors to be an indication that the used fiber failed to support proliferation of these bacterial species and explained by the strong linkages between uronic acid and xylose in pea pectin.

Besides, Bralley E. et al., ("Anti-inflammatory effects of muscadine skin extract in experimentally-induced ulcerative colitis in rats", from the thesis Nutraceutical properties of the muscadine grape (*Vitis rotundifolia*), *Sorghum Bicolor*, and *Polygonum cuspidatum*, 1998, Georgia University) describes the anti-inflammatory effects of dehydrated muscadine (*Vitis rotundifolia*) skin in a TNBS (2, 4, 6-trinitrobenzene sulfonic acid)-induced model of colitis in rats. This document does not relate to the treatment of dysbiosis in subjects suffering from colitis, but aims to treat the inflammation characteristic of intestinal inflammatory diseases and points to the phytochemicals with antioxidant properties present in muscadine grape (e.g., quercetin and resveratrol) as the components in grape skin responsible for the obtaining of an anti-inflammatory effect.

Accordingly, *F. prausnitzii* and other butyrate-producing bacteria are part of the intestinal microbiota and have a protective role in intestinal health. Despite efforts having been made in recent years, there is still a need to find strategies to treat dysbiosis of the gut microbiota in a subject, in particular, to increase the intestinal levels of beneficial bacterial species such as *F. prausnitzii* and other butyrate-producing bacteria.

SUMMARY OF THE INVENTION

The first aspect of the invention relates to grape skin, preferably isolated grape skin, for use in a method of treating intestinal dysbiosis in a subject, wherein intestinal dysbiosis is characterized by decreased levels and/or a reduction in the activity of butyrate-producing bacteria (e.g., by butyrate-producing bacteria having low or reduced levels of short chain fatty acid (SCFA) production), preferably wherein butyrate-producing bacteria are selected from the group consisting of *Faecalibacterium prausnitzii, F. prausnitzii* phylogroup I (PHGI), *F. prausnitzii* phylogroup II (PHGII), *Roseburia hominis* and *Subdoligranulum variabile*.

In another aspect, the invention refers to grape skin, preferably isolated grape skin, for use in a method of treating an intestinal disease in a subject, wherein said subject has intestinal dysbiosis characterized by decreased levels and/or a reduction in the activity of butyrate-producing bacteria (e.g., by butyrate-producing bacteria having low or reduced levels of SCFA production), preferably wherein butyrate-producing bacteria are selected from the group consisting of *Faecalibacterium prausnitzii, F. prausnitzii* phylogroup I (PHGI), *F. prausnitzii* phylogroup II (PHGII), *Roseburia hominis* and *Subdoligranulum variabile*.

In a further aspect, the invention refers to grape skin, preferably isolated grape skin, for use in a method of treating an intestinal disease in a subject.

In still a further aspect, the present invention is concerned with synergistic combinations of grape skin and a compound selected from the group consisting of a prebiotic, a single species or a group of probiotic species, secondary products of bacteria, modulators of molecular pathways of bacteria/host interactions and narrow-spectrum antibiotics. It further refers to a composition comprising grape skin and a compound as above defined providing synergistic effects in the treatment of intestinal dysbiosis and the use thereof in the treatment of intestinal dysbiosis, preferably in the treatment of butyrate-producing bacteria dysbiosis.

DETAILED DESCRIPTION OF THE INVENTION

Definitions

Figure 1A:
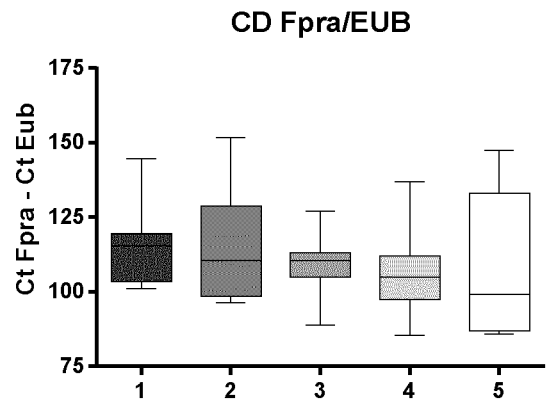
FIG. 1A. Fpra levels/EUB Ct value in Crohn's Disease (CD) patients samples; 1=negative Control (no substrate), 2=200 mg Previpect, 3=600 mg Previpect, 4=200 mg Previpect+200 mg Pectin, 5=200 mg Pectin. Significant values differences are marked with asterisks (* when $p \le 0.05$;  when $p \le 0.01$; and * when $p \le 0.001$).

The terms "subject", or "individual" are used herein interchangeably to refer to all the animals classified as mammals and includes but is not limited to domestic and farm animals, primates and humans, for example, human beings, non-human primates, cows, horses, pigs, sheep, goats, dogs, cats, or rodents. Preferably, the subject is a male or female human being of any age or race.

The term "treatment" encompasses both a prophylactic and a therapeutic treatment. The term "therapeutic treatment" or "therapy" as used herein refers to bringing a body from a pathological state or disease back to its normal, healthy state. The term "prophylactic treatment" as used herein refers to preventing a pathological state.

The term "therapeutically effective amount" as used herein refers to an amount that is effective, upon single or multiple dose administration to a subject (such as a human patient) in the prophylactic or therapeutic treatment of a disease, disorder or pathological condition as defined herein.

The term "prebiotic" was proposed in 1995 by Gibson and Roberfroid (The journal of nutrition, 125, 1401-1412) and refers to "a non-digestible food ingredient that beneficially affects the host by selectively stimulating the growth and/or activity of one or a limited number of bacteria in the colon, and thus improves health". Prebiotics may be used to treat or prevent intestinal dysbiosis, which can be defined as an imbalance of the intestinal microbiota. Prebiotics are known to exert positive effects on the intestinal function by two main mechanisms: 1) stimulating the growth and/or activity of beneficial indigenous bacteria resident in the gut (typically, bifidobacteria and lactobacilli); and 2) increasing the production of short-chain fatty acids (SCFAs). It should be noted that not all the constituents of dietary fiber are prebiotics. The prebiotic characteristics of an undigested substrate are dependent on whether beneficial components of the indigenous gut microflora will selectively use it as a substrate (Gálvez et al., "Prebiotics and Probiotics in Experimental Models of Rodent Colitis: Lessons in Treatment or Prevention of Inflammatory Bowel Diseases", Chapter 35 (p. 601-610) of the book Bioactive Foods in promoting health, Ed: R. R. Watson and V. R. Preedy, 2010, Academic Press; Manning T. S. and Gibson G. R. "Prebiotics", Best Practice & Research Clinical Gastroenterology 2004, 18 (2): 287-298).

The term "probe" as used herein refers to synthetic or biologically produced nucleic acids, between 10 and 285 base pairs in length which contain specific nucleotide sequences that allow specific and preferential hybridization under predetermined conditions to target nucleic acid sequences, and optionally contain a moiety for detection or for enhancing assay performance. A minimum of ten nucleotides is generally necessary in order to statistically obtain specificity and to form stable hybridization products, and a maximum of 285 nucleotides generally represents an upper limit for length in which reaction parameters can be easily adjusted to determine mismatched sequences and preferential hybridization. Probes may optionally contain certain constituents that contribute to their proper or optimal functioning under certain assay conditions. For example, probes may be modified to improve their resistance to nuclease degradation (e.g., by end capping), to carry detection ligands (e.g., fluorescein) or to facilitate their capture onto a solid support (e.g., poly-deoxyadenosine "tails").

The term "primers" as used herein refers to oligonucleotides that can be used in an amplification method, such as a polymerase chain reaction ("PCR"), to amplify a nucleotide sequence. Primers are designed based on the polynucleotide sequence of a particular target sequence, e.g., one specific 16S rDNA sequence. Design and validation of primers and probes is well known in the art. For quantitative real-time PCR methods, see for instance Rodriguez A et al. (Methods Mol Biol., 2015, 1275:31-56).

The term "specific" as used herein means that a nucleotide sequence will hybridize to/amplify a predetermined target sequence and will not substantially hybridize to/amplify a non-target sequence under the assay conditions, generally stringent conditions are used.

The term "hybridization" as used herein refers to a process by which, under predetermined reaction conditions, two partially or completely complementary strands of nucleic acid are allowed to come together in an antiparallel fashion to form a double-stranded nucleic acid with specific and stable hydrogen bonds, following explicit rules pertaining to which nucleic acid bases may pair with one another.

The term "substantial hybridization" means that the amount of hybridization observed will be such that one observing the results would consider the result positive with respect to hybridization data in positive and negative controls. Data which is considered "background noise" is not substantial hybridization.

The term "stringent hybridization conditions" means approximately 35° C. to 65° C. in a salt solution of approximately 0.9 molar NaCl. Stringency may also be governed by such reaction parameters as the concentration and type of ionic species present in the hybridization solution, the types and concentrations of denaturing agents present, and the temperature of hybridization. Generally as hybridization conditions become more stringent, longer probes are preferred if stable hybrids are to be formed. As a rule, the stringency of the conditions under which hybridization is to take place will dictate certain characteristics of the preferred probes to be employed.

The term "identity" as used herein refers to an exact nucleotide-to-nucleotide or amino acid to amino acid correspondence of two polynucleotides or polypeptide sequences, respectively. Two or more sequences (polynucleotide or amino acid) can be compared by determining their "percent identity". The "percent identity" of two sequences, whether nucleic acid or amino acid sequences, is the number of exact matches between two aligned sequences divided by the length of the shorter sequence and multiplied by 100. Suitable programs for calculating the percent identity or similarity between sequences are well known in the art, such as the NCBI BLAST program, used for example with default parameters (http://www.ncbi.nlm.gov/cgi-bin/BLAST).

Detailed Description

In a first aspect, the present invention relates to the use of grape skin or a composition comprising it as prebiotic for increasing the intestinal levels of butyrate-producing bacteria.

Butyrate producers display Butyryl CoA: acetate CoA transferase activity (Duncan et al., Appl Environ Microbiol. 2002, 68:5186-5190). This activity is broadly present among anaerobic bacteria belonging to the Clostridial subphylum such as members of the clostridial cluster IV, also known as the *Clostridium leptum* group (Duncan et al., Int J Syst Evol Microbiol 2002, 52, 2141-2146) and cluster XIVa, also known as the *Clostridium coccoides* group (Hold et al., Appl Environ Microbiol 2003, 69, 4320-4324; Barcenilla et al., Appl Environ Microbiol 2000, 66, 1654-166). *F. prausnitzii* is a representative butyrate producer belonging to the clostridial cluster IV, whereas various species of the genus *Roseburia*, such as *Roseburia cecicola, Roseburia intestinalis* and *Roseburia hominis* are butyrate producers classified under the clostridial cluster XIVa.

More specifically, in a first aspect the present invention refers to grape skin for use in a method of treating intestinal dysbiosis in a subject, wherein intestinal dysbiosis is characterized by a decrease of butyrate-producing bacteria levels and/or a reduction in the activity of butyrate-producing bacteria (also referred herein as "butyrate-producing bacteria dysbiosis"). Preferably, said butyrate-producing bacteria are selected from the group consisting of *F. prausnitzii*, including phylogroups thereof (e.g. PHGI and/or PHGII), *Roseburia hominis* and *Subdoligranulum variabile*.

In a related aspect, the present invention provides a method of treating intestinal dysbiosis in a subject, wherein intestinal dysbiosis is characterized by a decrease of butyrate-producing bacteria levels and/or a reduction in the activity of butyrate-producing bacteria (e.g., by butyrate-producing bacteria having low or reduced levels of short chain fatty acid (SCFA) production), comprising administering to a subject in need of such treatment a therapeutically effective amount of grape skin as described herein.

Preferably, said method of treating intestinal dysbiosis in a subject is a prophylactic method, namely said subject does not present low or reduced levels and/or activity of butyrate-producing bacteria.

The composition and diversity of the microbiota has been reported to be altered in disease. The term "dysbiosis" refers to a condition with a microbial imbalance on or within the body between protective and harmful bacteria. The term "intestinal dysbiosis" relates to the unfavorable alteration of the gut microbiota. For instance, some authors have studied the microbial composition in inflammatory bowel disease and have defined a dysbiosis signature characterizing Crohn's disease (CD) and ulcerative colitis (UC). In particular, Joosens et al. (Gut 2011, 60:631-7) reported that five bacterial species characterise dysbiosis in CD, namely a decrease in *F. prausnitzii, Bifidobacterium adolescentis, Dialister invisus* and an uncharacterised species of *Clostridium* cluster XIVa, and an increase in Ruminococcus gnavus; this bacterial signature pointing towards a lack of butyrate-producing bacteria in the pathogenesis of the disease. More recently, a reduction of *Roseburia hominis* and *F. prausnitzii* has been described to characterize UC dysbiosis (Machiels et al. Gut. 2014, 63 (8): 1275-83).

In a particular embodiment, intestinal dysbiosis is characterized by low levels or a decrease of butyrate-producing bacteria, preferably wherein butyrate-producing bacteria are selected from the group consisting of *Faecalibacterium prausnitzii, F. prausnitzii* phylogroup I (PHGI), *F. prausnitzii* phylogroup II (PHGII), *Roseburia hominis* and *Subdoligranulum variabile*.

Low levels or a decrease of butyrate-producing bacteria may be determined by a method comprising:

a) determining the levels of a butyrate-producing bacteria in an intestinal sample of said subject;
b) comparing the levels of said butyrate-producing bacteria in said subject sample with the levels in a reference sample;

wherein when the levels in said subject sample are below the levels in said reference sample there is a decrease of butyrate-producing bacteria. Methods for quantifying the levels of a bacterial species in an intestinal sample are described herein below.

Intestinal samples may be for instance a biopsy from the mucosal tissue of the ileum; colon and/or rectum. Preferably, this intestinal sample is a feces sample. These types of samples are routinely used in the clinical practice and a person skilled in the art will know how to identify the most appropriate means for their obtaining and preservation. Once a sample has been obtained, it may be used fresh, it may be frozen, lyophilized or preserved using appropriate means.

The term "reference value", as used herein, relates to a predetermined criteria used as a reference for evaluating the values or data obtained from the samples collected from a subject. The reference value or reference level can be an absolute value, a relative value, a value that has an upper or a lower limit, a range of values, an average value, a median value, a mean value, or a value as compared to a particular control or baseline value. A reference value can be based on an individual sample value or can be based on a large number of samples, such as from population of subjects of the chronological age matched group, or based on a pool of samples including or excluding the sample to be tested.

The reference value can be obtained from a subject or group of subjects not presenting signs and/or symptoms of intestinal disease, from a subject or group of subjects not having an intestinal disease or from the same healthy subject or a subject that was diagnosed as having an intestinal disease but at an earlier time point. Preferably, said reference sample is a sample of a subject or group of subjects not having an intestinal disease.

The level of a marker is considered "decreased" when the level of said marker in a sample is lower than its reference value. The level of a marker is considered to be lower than its reference value when it is at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at least 100%, at least 110%, at least 120%, at least 130%, at least 140%, at least 150%, or lower than its reference value. Preferably, for establishing intestinal dysbiosis the decrease in abundance levels of one or more of the bacterial markers in the subject's sample with respect to the reference value is statistically significant.

Likewise, the level of a marker is considered "increased" when the level of said marker in a sample is higher than its reference value. The level of a marker is considered to be higher than its reference value when it is at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at least 100%, at least 110%, at least 120%, at least 130%, at least 140%, at least 150%, or higher than its reference value.

Alternatively or in addition, subjects having more than about 1.2, 1.3, 1.4, 1.5, 2, 3, 4, 5, 6, 7, 8, 9, 10, 15 or 20 fold levels deviation (i.e., increase or decrease) than the reference value as described herein may be identified as having intestinal dysbiosis.

The amount that is statistically significant can be established by a person skilled in the art by means of using different statistical tools; illustrative, non-limiting examples of said statistical tools include determining confidence intervals, determining the p-value, the Chi-Square test discriminating functions, etc. Preferred confidence intervals are at least 90%, at least 95%, at least 97%, at least 98%, at least 99%. The p-values are, preferably less than 0.1, less than 0.05, less than 0.01, less than 0.005 or less than 0.001. Typically, the appropriate statistical analysis is determined based on whether the variable under study has a normal distribution, for instance by using the test of Kolmogorov-Smirnov and on whether there is homoscedasticity, which is determined for instance with the Levene test. Preferably, in those cases where there is a normal distribution and homoscedasticity, a parametric model such as t-test or ANOVA test is used; and where normality is not accomplished then a non-parametric model such as Mann-Whitney U test or Kruskal-Wallis test is generally used.

Alternatively, the decrease of butyrate-producing bacteria may be defined by determining the ratio of the abundance levels of one or more butyrate-producing bacterial species or group of species in a particular subject with respect to other bacterial species or group of species in said subject, for instance, a decrease of butyrate-producing bacteria may be found when:

the ratio of the levels (e.g. median $\log_{10}$ 16S rRNA gene copies/million bacterial 16S rRNA gene copies) of *Faecalibacterium prausnitzii/Escherichia coli* is of less than 2.5; or the ratio of the levels *Eubacteria/Roseburia hominis* is higher than 12.5.

In a particular embodiment, optionally in combination with one or more of the embodiments or features described above or below, the decrease of butyrate-producing bacteria is defined by determining the ratio of the abundance levels of one or more butyrate-producing bacterial species or group of species in a particular subject with respect to other bacterial species or group of species in said subject and is expressed as normalized indexes, including but not limited to:

ratio *Faecalibacterium prausnitzii/Escherichia coli* (FE index): the lower the value, the higher the dysbiosis degree of the subject; and/or ratio butyrate producing bacteria/pro-inflammatory bacteria (BP index): the lower the value, the higher the dysbiosis degree of the subject; for instance wherein butyrate producing bacteria are calculated by the sum of the total abundance of *Faecalibacterium prausnitzii*, (optionally, also or alternatively *Faecalibacterium prausnitzii* PHGI, and *Faecalibacterium prausnitzii* PHGII), *Roseburia hominis* and *Subdoligranulum variabile* and the proinflammatory bacteria is the total abundance of *Escherichia coli*.

In addition, intestinal dysbiosis in a subject may further be characterized by a reduction in the activity of butyrate-producing bacteria, for instance, butyrate-producing bacteria having low or reduced levels of SCFA production. This may be determined by the ratio butyrate/butyrate producing bacteria (BB index): butyrate producing bacteria can be calculated by the sum of the total abundance of *Faecalibacterium prausnitzii*, (optionally, also or alternatively *Faecalibacterium prausnitzii* PHGI and *Faecalibacterium prausnitzii* PHGII), *Roseburia hominis* and *Subdoligranulum variabile* and butyrate is the concentration of butyrate obtained in the fermentation tubes. The lower the value, less active are the butyrate producing bacteria. Reduced or low levels of butyrate production can be for instance wherein the BB index in a subject is lower than in a reference or control sample.

The term "abundance", "levels" or "load" as used herein refers to a measure of the quantity of a target microorganism within a biological sample. Bacterial quantification is generally carried out by molecular methods, typically by determining the number of 16S rRNA gene copies of said target microorganism, for instance by fluorescence in situ hybridization (FISH), quantitative polymerase chain reaction (qPCR) or PCR/pyrosequencing. Quantification of the abundance of a target nucleic acid sequence within a biological sample might be absolute or relative. "Relative quantification" is generally based on one or more internal reference genes, i.e., 16S rRNA genes from reference strains, such as determination of total bacteria using universal primers and expressing the abundance of the target nucleic acid sequence as a percentage of total bacterial 16S rRNA gene copies or normalized by *E. coli* 16S rRNA gene copies. "Absolute quantification" gives the exact number of target molecules by comparison with DNA standards or normalizing by DNA concentration.

Quantification levels might be expressed as the concentration (DNA amount per unit of volume), the DNA amount or number of gene copies per number of cells, the cycle threshold value (Ct value) or any mathematical transformation thereof, such as the log 10 of the number of gene copies. Ct values are inversely proportional to the log 10 of target nucleic acid concentration in the sample.

In a particular embodiment, optionally in combination with one or more of the embodiments described above or below, the butyrate-producing species as described herein are quantified by qPCR. Preferably, quantification has been performed by qPCR and quantification levels are expressed as the cycle threshold value (Ct value), in this instance, a reduction in the abundance levels of butyrate-producing bacteria is shown as an increase in the Ct values.

Quantitative PCR (qPCR), also known as real-time PCR is well known in the art. Different instruments are available, such as ABI Prism 7700 SDS, GeneAmp 5700 SDS, ABI Prism 7900 HT SDS from Applied Biosystems; iCycler iQ from Bio-Rad; Smart Cycler from Cepheid; Rotor-Gene from Corbett Research; LightCycler from Roche Molecular Biochemicals and Mx4000 Multiplex from Stratagene. The qPCR process enables accurate quantification of the PCR product in real-time by measuring PCR product accumulation very early in the exponential phase of the reaction, thus reducing bias in the quantification linked to the PCR amplification efficiency occurring in end-point PCR. Technology overview and protocols for qPCR are available for instance from the above-mentioned vendors, e.g., http://www.sigmaaldrich.com/technical-documents/protocols/biology/sybr-green-qpcr.html or http://www.sigmaaldrich.com/life-science/molecular-biology/pcr/quantitative-pcr/qpcr-technical-guide.html. For a review of qPCR methods see Smith C J and Osborn A M., FEMS Microbiol Ecol., 2009; 67 (1): 6-20 and Giulietti et al., Methods 2001; 25, 386-401. In a particular embodiment, the quantification method comprises a multiplex qPCR, for instance when quantifying the levels of *F. prausnitzii* phylogroup I and phylogroup II in a single qPCR reaction.

Several genes can be used for bacterial quantification purposes. Typically, a specific target bacteria is quantified by PCR amplification of the 16S rRNA gene. 16S rRNA differs for almost each bacterial species. A bacterial species is hard to define, but is often taken as organisms with 16S rRNA gene sequences having at least 97% identity, defined as an operational taxonomic unit (OTU). A 16S rRNA gene sequence of about 1.5 kilobases has nine short hypervariable regions that distinguish bacterial taxa; the sequences of one or more of these regions are targeted in a community census (Weinstock B. M, Nature 2012, 489, 250-256).

Protein coding genes, for instance housekeeping genes may also be used. Roux et al. (FEMS Microbiol Ecol 78 (2011) 617-628), describes the use of five protein marker genes (rplB, pyrG, fusA, leuS and rpoB), for which primer sets were available, as taxonomic markers for ecological studies. The use of nucleotidyl transferase gene and the butyryl-CoA transferase gene for specific target bacteria quantification purposes has also been described (Jia et al. FEMS Microbiol Lett. 2010; 310:138-144).

Different detecting chemistries are available for qPCR. All of them can be used with the above-mentioned qPCR instruments. The term "detection chemistry" refers to a method to report amplification of specific PCR product in real-time PCR and may include hydrolysis or TaqMan® probes; molecular beacons; scorpions; hybridization probes and DNA-binding dyes such as SYBR® Green I. These are described in detail for instance in Giulietti et al., Methods 2001; 25, 386-401.

Preferably, quantification of the butyrate-producing species described herein is carried out by 16S rRNA gene quantification. In a preferred embodiment, polynucleotides (e.g., primers and probes) for the quantification of the butyrate-producing species described herein are those disclosed in the examples or polynucleotides with an identity of at least 85% thereto, preferably of at least 90%, more preferably of at least 95%, even more preferably of at least about 97%, 98%, 99%, or 100% identical thereto.

Preferably, said polynucleotides have between 10 and 30 nucleotides, more preferably between 15 and 26 nucleotides, even more preferably between 18 and 22 nucleotides, and even more preferably about 20 nucleotides. In a particular embodiment, said primers and/or probes have been modified for detection or for enhancing the assay performance.

In a particular embodiment, the butyrate-producing bacteria are selected from the group consisting of *Faecalibacterium prausnitzii*, *F. prausnitzii* phylogroup I (PHGI), *F. prausnitzii* phylogroup II (PHGII), *Roseburia hominis* and *Subdoligranulum variabile* and the respective abundance levels are determined by a method comprising the use of one or more of the following:

A polynucleotide selected from the group consisting of SEQ ID NO:1, SEQ ID NO:2, SEQ ID NO:3, and a polynucleotide with an identity of at least 85% thereto, for the determination of the levels of *F. prausnitzii*;

A polynucleotide consisting of SEQ ID NO:6 or a polynucleotide with an identity of at least 85% thereto for the determination of the levels of PHGI, optionally, in combination with SEQ ID NO:4 and/or SEQ ID NO:5, or with a polynucleotide with an identity of at least 85% thereto;

A polynucleotide consisting of SEQ ID NO:7 or a polynucleotide with an identity of at least 85% thereto for the determination of the levels of PHGII, optionally, in combination with SEQ ID NO:4 and/or SEQ ID NO:5, or with a polynucleotide with an identity of at least 85% thereto;

A polynucleotide selected from the group consisting of SEQ ID NO:11, SEQ ID NO:12, and a polynucleotide with an identity of at least 85% thereto for the determination of the levels of *Roseburia hominis*; and A polynucleotide selected from the group consisting of SEQ ID NO:13, SEQ ID NO:14, and a polynucleotide with an identity of at least 85% thereto for the determination of the levels of *Subdoligranulum variabile*.

*Faecalibacterium* is a new genus created by Duncan et al. (Duncan et al., Int J Syst Evol Microbiol. 2002; 52, 2141-2146). The non-spore-forming, non-motile Gram positive, strictly anaerobic organism produces butyrate, d-lactate and formate, and utilizes acetate. Genomic DNA G-C content is 47±57 mol % (as determined by thermal denaturation). The type strain, whose characteristics were reported by Cato et al. (1974), is *Faecalibacterium prausnitzii* ATCC 27768T (NCIMB 13872T). However, most of the recent studies performed on this species in the last ten years are based on strain A2-165 (DSM 17677) also described by Duncan et al. (Duncan et al., Int J Syst Evol Microbiol. 2002; 52, 2141-2146). Today, *F. prausnitzii* species are a major representative of Firmicutes phylum, *Clostridium* class, Ruminococcaceae family (Miquel S. et al., Current Opinion in Microbiology 2013, 16:1-7).

Figure 1B:
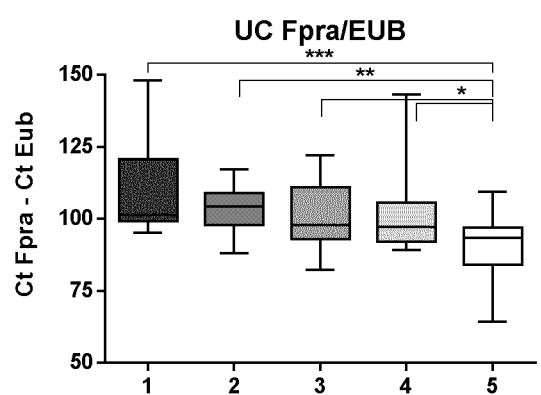
FIG. 1B. Fpra/EUB Ct value in Ulcerative Colitis (UC) patients samples; 1=negative control (no substrate), 2=200 mg Previpect, 3=600 mg Previpect, 4=200 mg Previpect+200 mg Pectin, 5=200 mg Pectin. Significant values differences are marked with asterisks (* when $p \le 0.05$;  when $p \le 0.01$; and * when $p \le 0.001$).
Figure 1C:
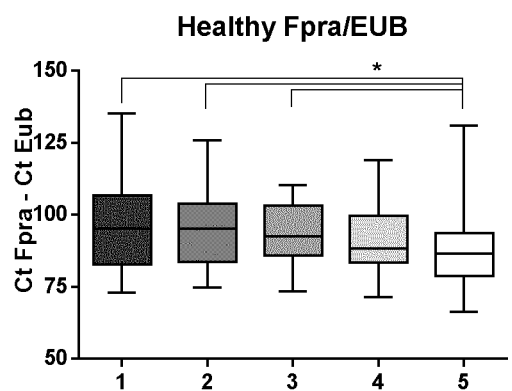
FIG. 1C. Fpra/EUB Ct value in healthy (H) subjects samples; 1=negative control (no substrate), 2=200 mg Previpect, 3=600 mg Previpect, 4=200 mg Previpect+200 mg Pectin, 5=200 mg Pectin. Significant values differences are marked with asterisks (* when $p \le 0.05$;  when $p \le 0.01$; and * when $p \le 0.001$).
Figure 2A:
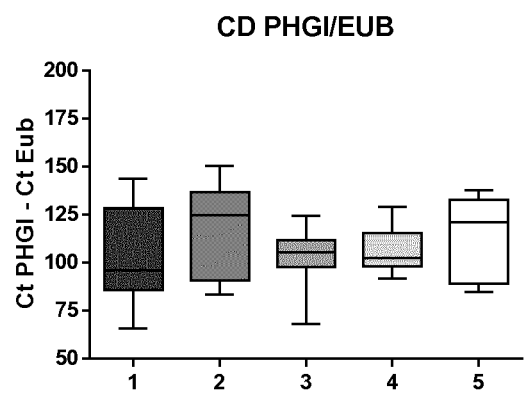
FIG. 2A. PHG-I/EUB Ct value in CD patients samples; 1=negative control (no substrate), 2=200 mg Previpect, 3=600 mg Previpect, 4=200 mg Previpect+200 mg Pectin, 5=200 mg Pectin. Significant values differences are marked with asterisks (* when $p \le 0.05$;  when $p \le 0.01$; and * when $p \le 0.001$).
Figure 2B:
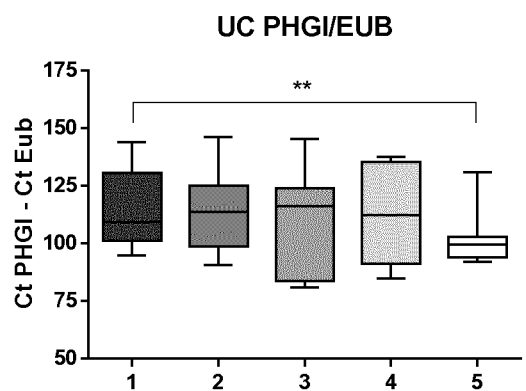
FIG. 2B. PHG-I/EUB I Ct value in UC patients samples; 1=negative control (no substrate), 2=200 mg Previpect, 3=600 mg Previpect, 4=200 mg Previpect+200 mg Pectin, 5=200 mg Pectin. Significant values differences are marked with asterisks (* when $p \le 0.05$;  when $p \le 0.01$; and * when $p \le 0.001$).
Figure 2C:
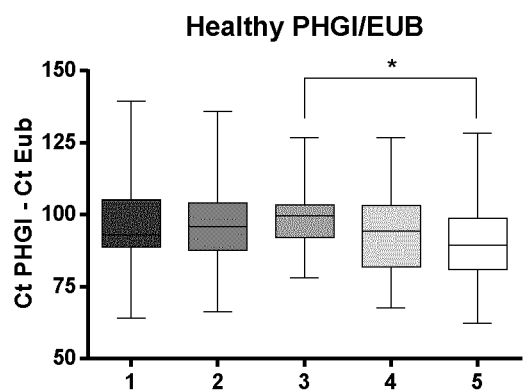
FIG. 2C. PHG-I/EUB Ct value in H subjects samples; 1=negative control (no substrate), 2=200 mg Previpect, 3=600 mg Previpect, 4=200 mg Previpect+200 mg Pectin, 5=200 mg Pectin. Significant values differences are marked with asterisks (* when $p \le 0.05$;  when $p \le 0.01$; and * when $p \le 0.001$).
Figure 3A:
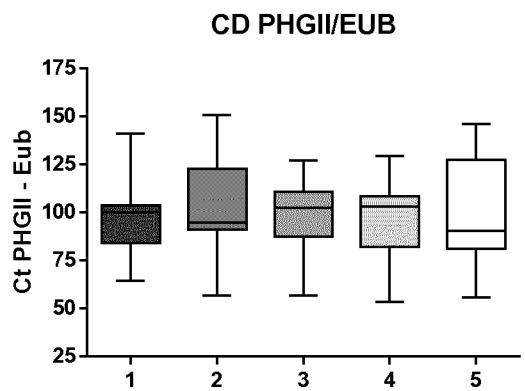
FIG. 3A. PHG-II/EUB Ct value in CD patients samples (experiment 3); 1=Negative Control (no substrate), 2=200 mg Previpect, 3=600 mg Previpect, 4=200 mg Previpect+200 mg Pectin, 5=200 mg Pectin. Significant values differences are marked with asterisks (* when $p \le 0.05$;  when $p \le 0.01$; and * when $p \le 0.001$).
Figure 3B:
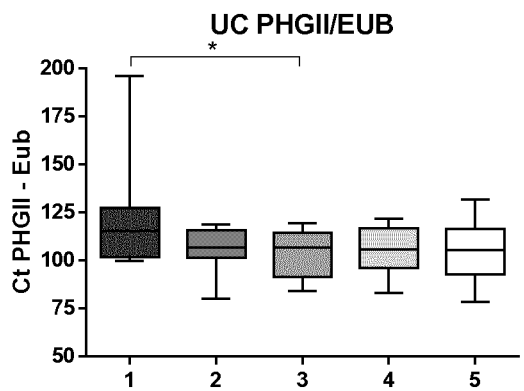
FIG. 3B. PHG-II/EUB I Ct value in UC patients samples; 1=negative control (no substrate), 2=200 mg Previpect, 3=600 mg Previpect, 4=200 mg Previpect+200 mg Pectin, 5=200 mg Pectin. Significant values differences are marked with asterisks (* when $p \le 0.05$;  when $p \le 0.01$; and * when $p \le 0.001$).
Figure 3C:
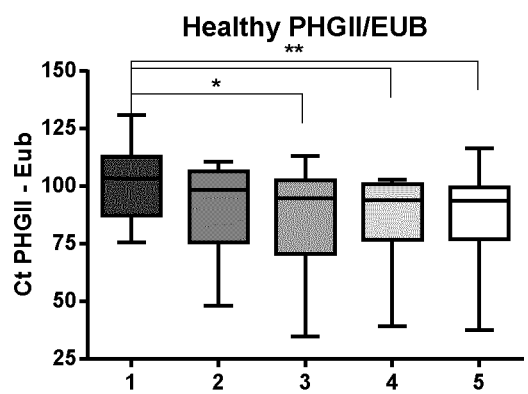
FIG. 3C. PHG-II/EUB Ct value in H subjects samples; 1=negative control (no substrate), 2=200 mg Previpect, 3=600 mg Previpect, 4=200 mg Previpect+200 mg Pectin, 5=200 mg Pectin. Significant values differences are marked with asterisks (* when $p \le 0.05$;  when $p \le 0.01$; and * when $p \le 0.001$).
Figure 4A:
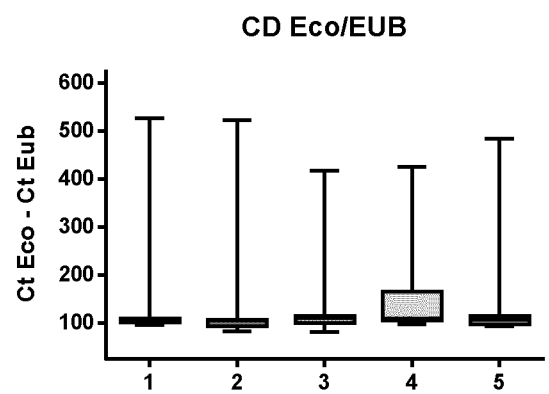
FIG. 4A. Eco/EUB I Ct value in CD patients samples; 1=negative control (no substrate), 2=200 mg Previpect, 3=600 mg Previpect, 4=200 mg Previpect+200 mg Pectin, 5=200 mg Pectin. Significant values differences are marked with asterisks (* when $p \le 0.05$;  when $p \le 0.01$; and * when $p \le 0.001$).
Figure 4B:
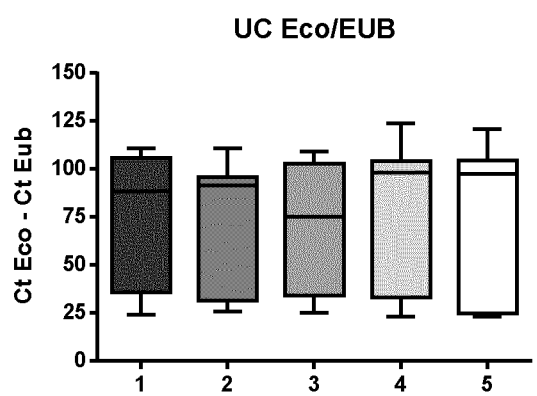
FIG. 4B. Eco/EUB Ct value in UC patients samples; 1=negative control (no substrate), 2=200 mg Previpect, 3=600 mg Previpect, 4=200 mg Previpect+200 mg Pectin, 5=200 mg Pectin. Significant values differences are marked with asterisks (* when $p \le 0.05$;  when $p \le 0.01$; and * when $p \le 0.001$).
Figure 4C:
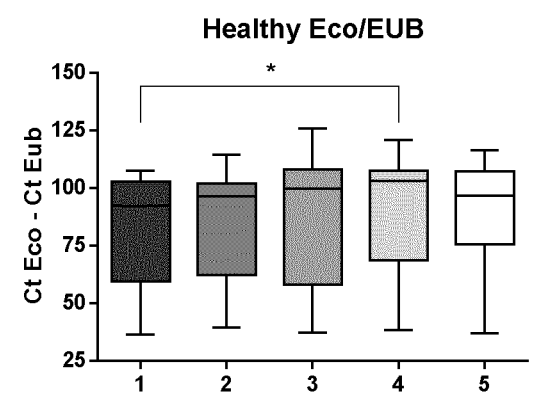
FIG. 4C. Eco/EUB Ct value in H subjects samples; 1=negative control (no substrate), 2=200 mg Previpect, 3=600 mg Previpect, 4=200 mg Previpect+200 mg Pectin, 5=200 mg Pectin. Significant values differences are marked with asterisks (* when $p \le 0.05$;  when $p \le 0.01$; and * when $p \le 0.001$).
Figure 5A:
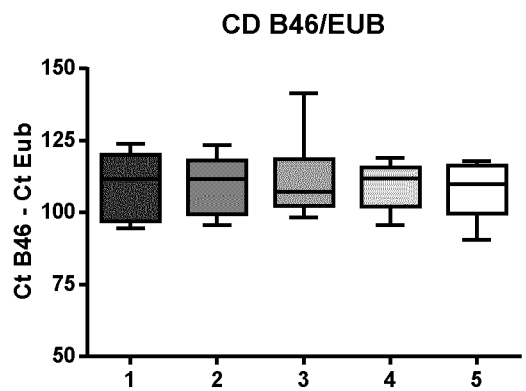
FIG. 5A. B46/EUB Ct value in CD patients samples; 1=negative control (no substrate), 2=200 mg Previpect, 3=600 mg Previpect, 4=200 mg Previpect+200 mg Pectin, 5=200 mg Pectin. Significant values differences are marked with asterisks (* when $p \le 0.05$;  when $p \le 0.01$; and * when $p \le 0.001$).
Figure 5B:
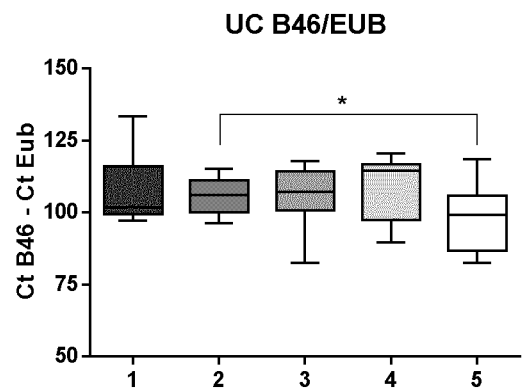
FIG. 5B. B46/EUB Ct value in UC patients samples; 1=negative control (no substrate), 2=200 mg Previpect, 3=600 mg Previpect, 4=200 mg Previpect+200 mg Pectin, 5=200 mg Pectin. Significant values differences are marked with asterisks (* when $p \le 0.05$;  when $p \le 0.01$; and * when $p \le 0.001$).
Figure 5C:
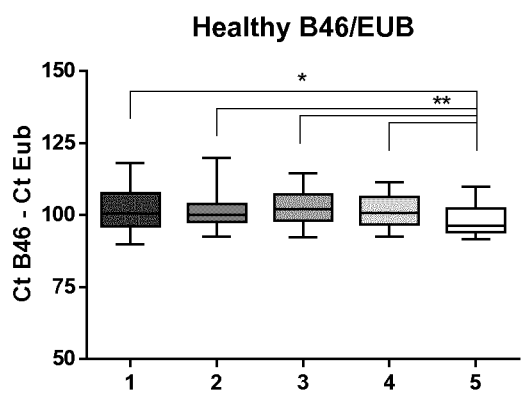
FIG. 5C. B46/EUB Ct value in H subjects samples; 1=negative control (no substrate), 2=200 mg Previpect, 3=600 mg Previpect, 4=200 mg Previpect+200 mg Pectin, 5=200 mg Pectin. Significant values differences are marked with asterisks (* when $p \le 0.05$;  when $p \le 0.01$; and * when $p \le 0.001$).
Figure 6A:
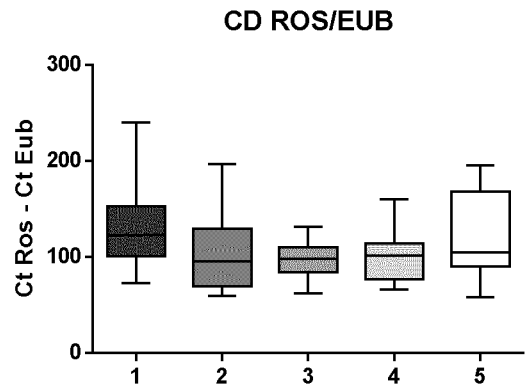
FIG. 6A. Ros/EUB Ct value in CD patients samples; 1=negative control (no substrate), 2=200 mg Previpect, 3=600 mg Previpect, 4=200 mg Previpect+200 mg Pectin, 5=200 mg Pectin. Significant values differences are marked with asterisks (* when $p \le 0.05$;  when $p \le 0.01$; and * when $p \le 0.001$).
Figure 6B:
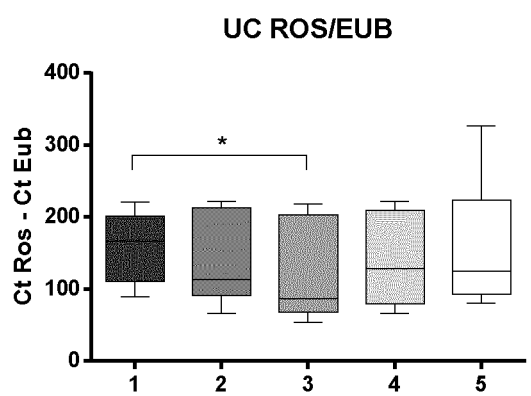
FIG. 6B. Ros/EUB Ct value in UC samples; 1=negative control (no substrate), 2=200 mg Previpect, 3=600 mg Previpect, 4=200 mg Previpect+200 mg Pectin, 5=200 mg Pectin. Significant values differences are marked with asterisks (* when $p \le 0.05$;  when $p \le 0.01$; and * when $p \le 0.001$).
Figure 6C:
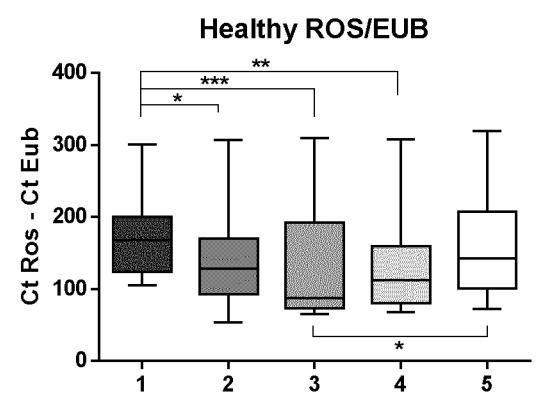
FIG. 6C. Ros/EUB Ct value in H subjects samples; 1=negative control (no substrate), 2=200 mg Previpect, 3=600 mg Previpect, 4=200 mg Previpect+200 mg Pectin, 5=200 mg Pectin. Significant values differences are marked with asterisks (* when $p \le 0.05$;  when $p \le 0.01$; and * when $p \le 0.001$).
Figure 7A:
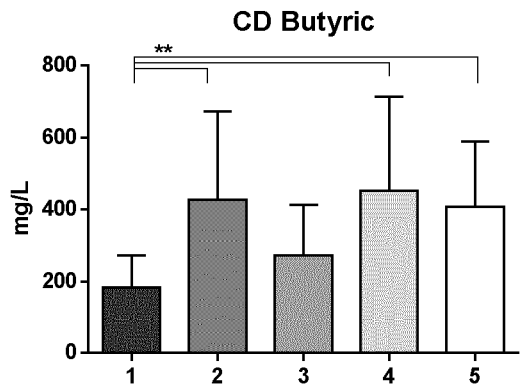
FIG. 7A. Butyric acid levels (mg/L) in CD patients samples; 1=negative control (no substrate), 2=200 mg Previpect, 3=600 mg Previpect, 4=200 mg Previpect+200 mg Pectin, 5=200 mg Pectin. Significant values differences are marked with asterisks (* when p≤0.05;  when p≤0.01; and * when p≤0.001).
Figure 7B:
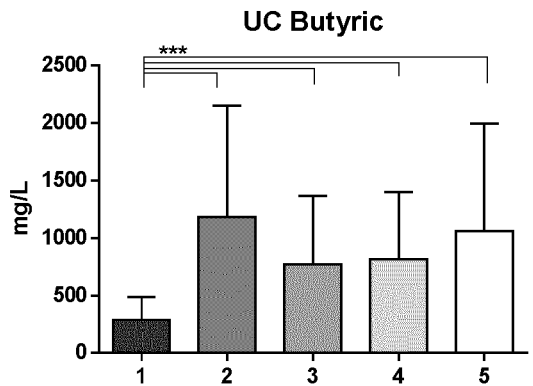
FIG. 7B. Butyric acid levels (mg/L) in UC patients samples; 1=negative control (no substrate), 2=200 mg Previpect, 3=600 mg Previpect, 4=200 mg Previpect+200 mg Pectin, 5=200 mg Pectin. Significant values differences are marked with asterisks (* when p≤0.05;  when p≤0.01; and * when p≤0.001).
Figure 7C:
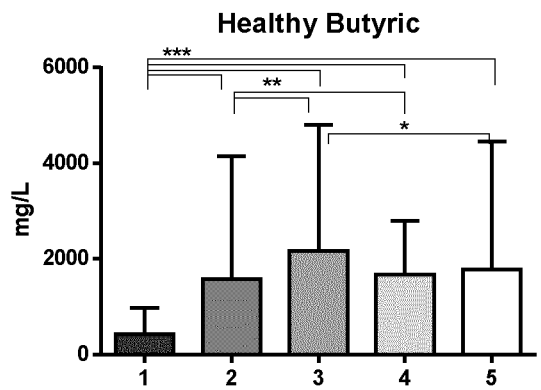
FIG. 7C. Butyric acid levels (mg/L) in H subjects samples; 1=negative control (no substrate), 2=200 mg Previpect, 3=600 mg Previpect, 4=200 mg Previpect+200 mg Pectin, 5=200 mg Pectin. Significant values differences are marked with asterisks (* when p≤0.05;  when p≤0.01; and * when p≤0.001).
Figure 8A:
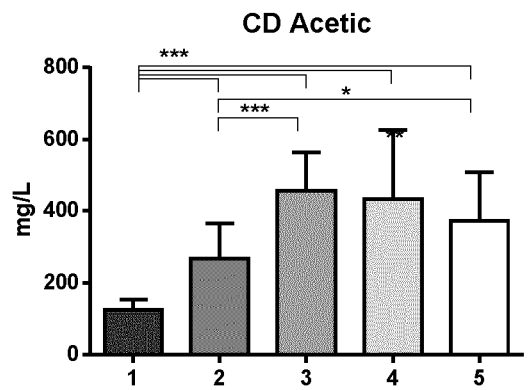
FIG. 8A. Acetic acid levels (mg/L) in CD patients samples; 1=negative control (no substrate), 2=200 mg Previpect, 3=600 mg Previpect, 4=200 mg Previpect+200 mg Pectin, 5=200 mg Pectin. Significant values differences are marked with asterisks (* when p≤0.05;  when p≤0.01; and * when p≤0.001).
Figure 8B:
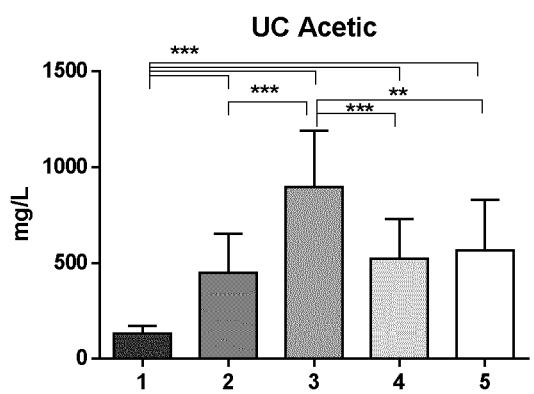
FIG. 8B. Acetic acid levels (mg/L) in UC patients samples; 1=negative control (no substrate), 2=200 mg Previpect, 3=600 mg Previpect, 4=200 mg Previpect+200 mg Pectin, 5=200 mg Pectin. Significant values differences are marked with asterisks (* when p≤0.05;  when p≤0.01; and * when p≤0.001).
Figure 8C:
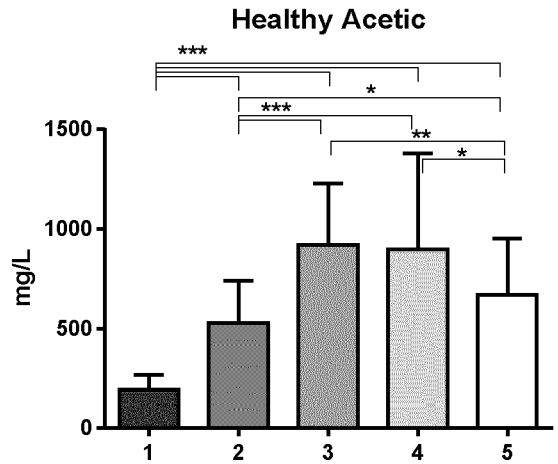
FIG. 8C. Acetic acid levels (mg/L) in H subjects samples; 1=negative control (no substrate), 2=200 mg Previpect, 3=600 mg Previpect, 4=200 mg Previpect+200 mg Pectin, 5=200 mg Pectin. Significant values differences are marked with asterisks (* when p≤0.05;  when p≤0.01; and * when p≤0.001).
Figure 9A:
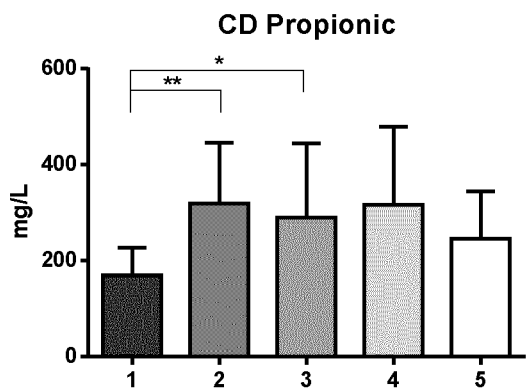
FIG. 9A. Propionic acid levels (mg/L) in CD patients samples; 1=negative control (no substrate), 2=200 mg Previpect, 3=600 mg Previpect, 4=200 mg Previpect+200 mg Pectin, 5=200 mg Pectin. Significant values differences are marked with asterisks (* when p≤0.05;  when p≤0.01; and * when p≤0.001).
Figure 9B:
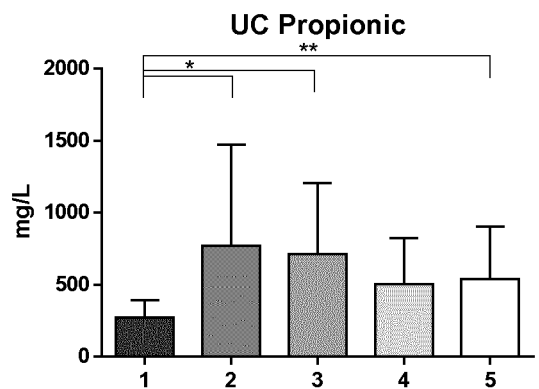
FIG. 9B. Propionic acid levels (mg/L) in UC patients samples (experiment 3); 1=negative control (no substrate), 2=200 mg Previpect, 3=600 mg Previpect, 4=200 mg Previpect+200 mg Pectin, 5=200 mg Pectin. Significant values differences are marked with asterisks (* when p≤0.05;  when p≤0.01; and * when p≤0.001).
Figure 9C:
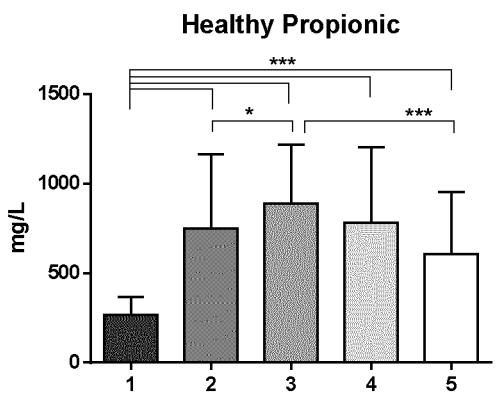
FIG. 9C. Propionic acid levels (mg/L) in H subjects samples; 1=negative control (no substrate), 2=200 mg Previpect, 3=600 mg Previpect, 4=200 mg Previpect+200 mg Pectin, 5=200 mg Pectin. Significant values differences are marked with asterisks (* when p≤0.05;  when p≤0.01; and * when p≤0.001).
Figure 10A:
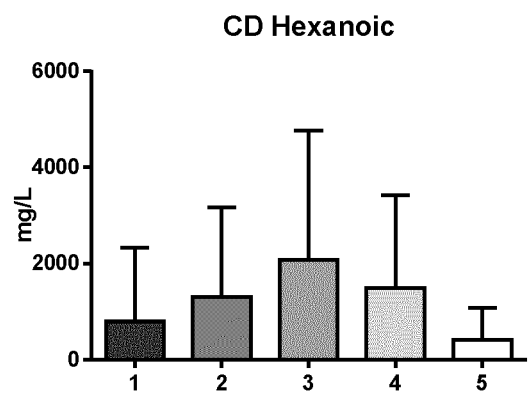
FIG. 10A. Hexanoic acid levels (mg/L) in CD patients samples; 1=negative control (no substrate), 2=200 mg Previpect, 3=600 mg Previpect, 4=200 mg Previpect+200 mg Pectin, 5=200 mg Pectin. Significant values differences are marked with asterisks (* when p≤0.05;  when p≤0.01; and * when p≤0.001).
Figure 10B:
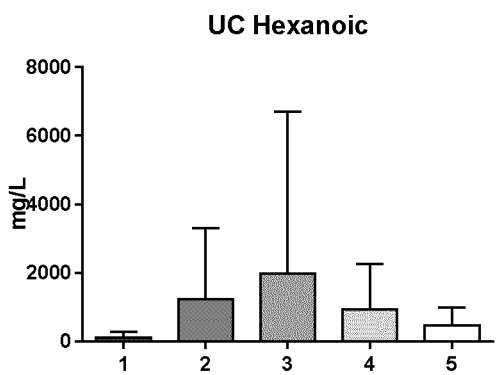
FIG. 10B. Hexanoic acid levels (mg/L) in UC patients samples; 1=negative control (no substrate), 2=200 mg Previpect, 3=600 mg Previpect, 4=200 mg Previpect+200 mg Pectin, 5=200 mg Pectin. Significant values differences are marked with asterisks (* when p≤0.05;  when p≤0.01; and * when p≤0.001).
Figure 10C:
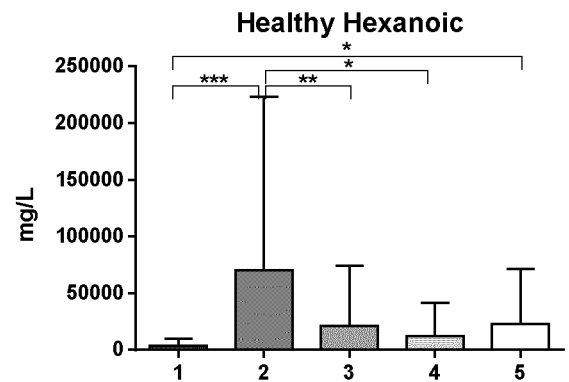
FIG. 10C. Hexanoic acid levels (mg/L) in H subjects samples; 1=negative control (no substrate), 2=200 mg Previpect, 3=600 mg Previpect, 4=200 mg Previpect+200 mg Pectin, 5=200 mg Pectin. Significant values differences are marked with asterisks (* when p≤0.05;  when p≤0.01; and * when p≤0.001).
Figure 11A:
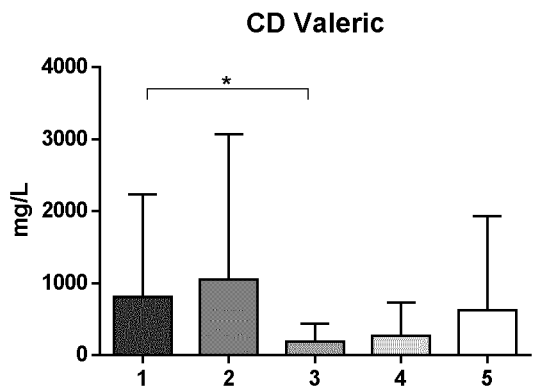
FIG. 11A. Valeric acid levels (mg/L) in CD patients samples; 1=negative control (no substrate), 2=200 mg Previpect, 3=600 mg Previpect, 4=200 mg Previpect+200 mg Pectin, 5=200 mg Pectin. Significant values differences are marked with asterisks (* when p≤0.05;  when p≤0.01; and * when p≤0.001).
Figure 11B:
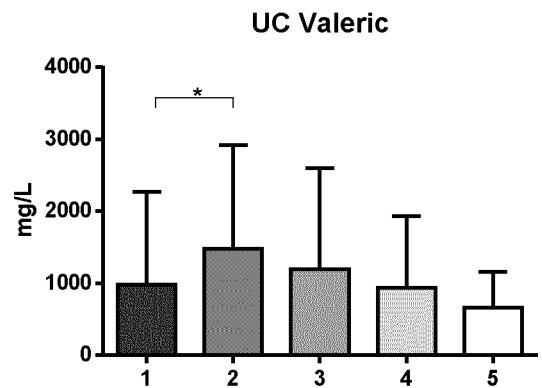
FIG. 11B. Valeric acid levels (mg/L) in UC patients samples; 1=negative control (no substrate), 2=200 mg Previpect, 3=600 mg Previpect, 4=200 mg Previpect+200 mg Pectin, 5=200 mg Pectin. Significant values differences are marked with asterisks (* when p≤0.05;  when p≤0.01; and * when p≤0.001).
Figure 11C:
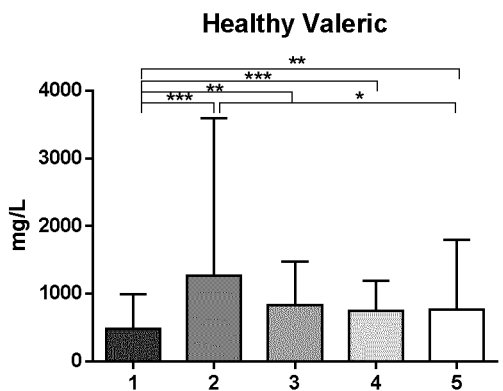
FIG. 11C. Valeric acid levels (mg/L) in H subjects samples; 1=negative control (no substrate), 2=200 mg Previpect, 3=600 mg Previpect, 4=200 mg Previpect+200 mg Pectin, 5=200 mg Pectin. Significant values differences are marked with asterisks (* when p≤0.05;  when p≤0.01; and * when p≤0.001).
Figure 12A:
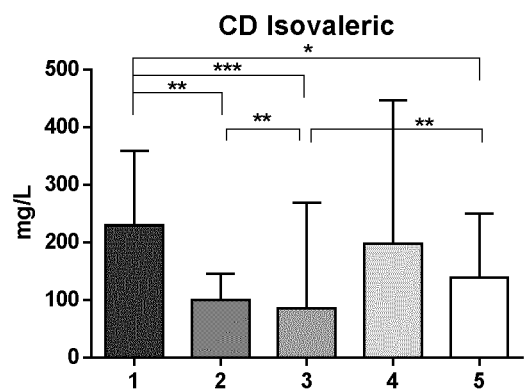
FIG. 12A. Isovaleric acid levels (mg/L) in CD patients samples; 1=negative control (no substrate), 2=200 mg Previpect, 3=600 mg Previpect, 4=200 mg Previpect+200 mg Pectin, 5=200 mg Pectin. Significant values differences are marked with asterisks (* when p≤0.05;  when p≤0.01; and * when p≤0.001).
Figure 12B:
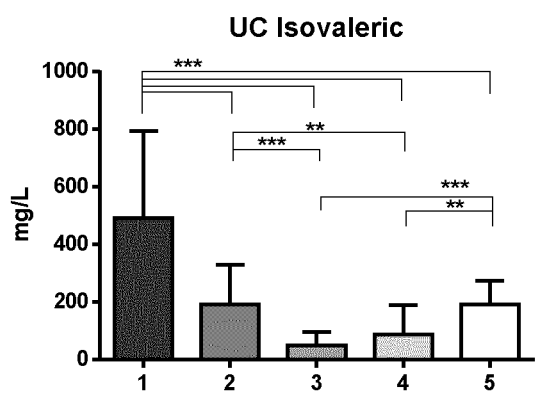
FIG. 12B. Isovaleric acid levels (mg/L) in UC patients samples; 1=Negative Control (no substrate), 2=200 mg Previpect, 3=600 mg Previpect, 4=200 mg Previpect+200 mg Pectin, 5=200 mg Pectin. Significant values differences are marked with asterisks (* when p≤0.05;  when p≤0.01; and * when p≤0.001).
Figure 12C:
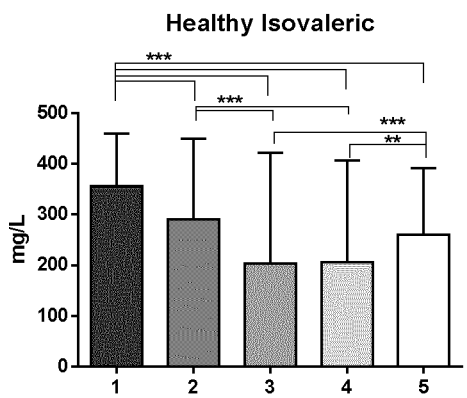
FIG. 12C. Isovaleric acid levels (mg/L) in H subjects samples; 1=negative control (no substrate), 2=200 mg Previpect, 3=600 mg Previpect, 4=200 mg Previpect+200 mg Pectin, 5=200 mg Pectin. Significant values differences are marked with asterisks (* when p≤0.05;  when p≤0.01; and * when p≤0.001).
Figure 13A:
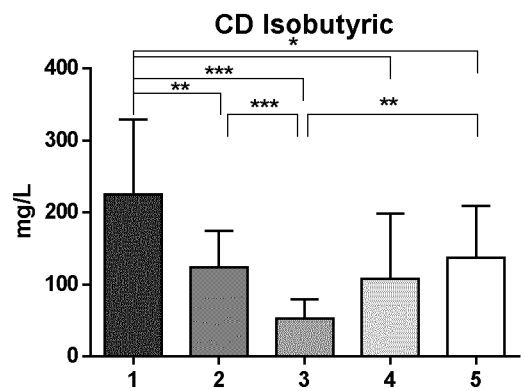
FIG. 13A. Isobutyric acid levels (mg/L) in CD patients samples; 1=negative control (no substrate), 2=200 mg Previpect, 3=600 mg Previpect, 4=200 mg Previpect+200 mg Pectin, 5=200 mg Pectin. Significant values differences are marked with asterisks (* when p≤0.05;  when p≤0.01; and * when p≤0.001).
Figure 13B:
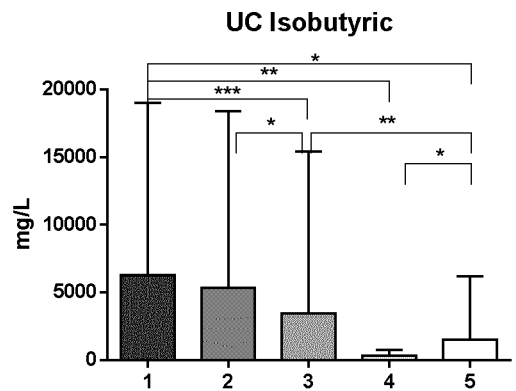
FIG. 13B. Isobutyric acid levels (mg/L) in UC patients samples; 1=negative control (no substrate), 2=200 mg Previpect, 3=600 mg Previpect, 4=200 mg Previpect+200 mg Pectin, 5=200 mg Pectin. Significant values differences are marked with asterisks (* when p≤0.05;  when p≤0.01; and * when p≤0.001).
Figure 13C:
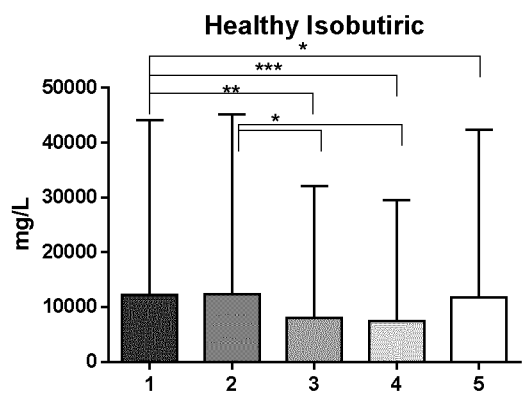
FIG. 13C. Isobutyric acid levels (mg/L) in H subjects samples; 1=negative control (no substrate), 2=200 mg Previpect, 3=600 mg Previpect, 4=200 mg Previpect+200 mg Pectin, 5=200 mg Pectin. Significant values differences are marked with asterisks (* when p≤0.05;  when p≤0.01; and * when p≤0.001).
Figure 14A:
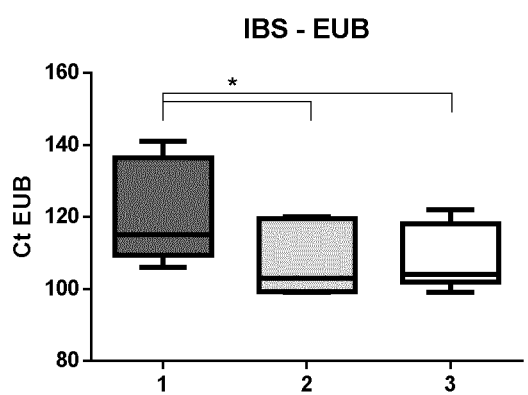
FIG. 14A. EUB Ct value in Irritable bowel syndrome (IBS) patients samples; 1=negative control (no substrate), 2=200 mg Previpect, 3=200 mg *Plantago ovata*. Significant values differences are marked with asterisks (* when p≤0.05;  when p≤0.01; and * when p≤0.001).
Figure 14B:
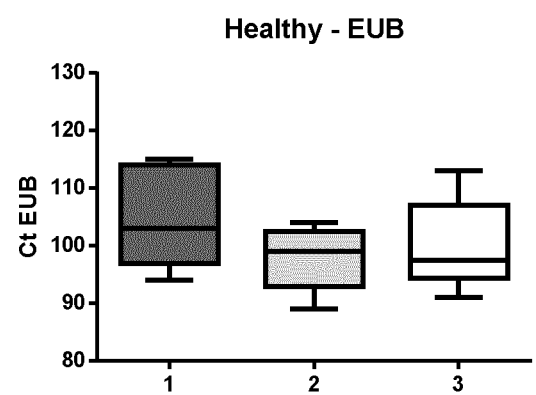
FIG. 14B. EUB Ct value in healthy subjects samples; 1=negative control (no substrate), 2=200 mg Previpect, 3=200 mg *Plantago ovata*. Significant values differences are marked with asterisks (* when p≤0.05;  when p≤0.01; and * when p≤0.001).
Figure 15A:
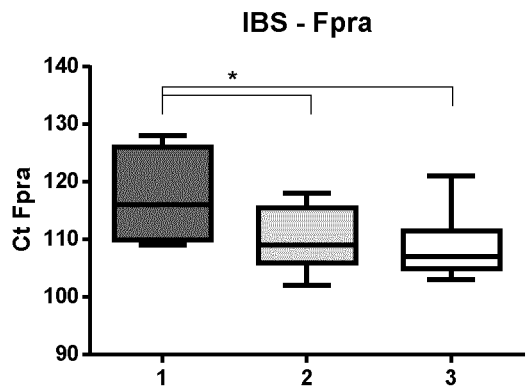
FIG. 15A. Fpra Ct value in IBS patients samples; 1=negative control (no substrate), 2=200 mg Previpect, 3=200 mg *Plantago ovata*. Significant values differences are marked with asterisks (* when p≤0.05;  when p≤0.01; and * when p≤0.001).
Figure 15B:
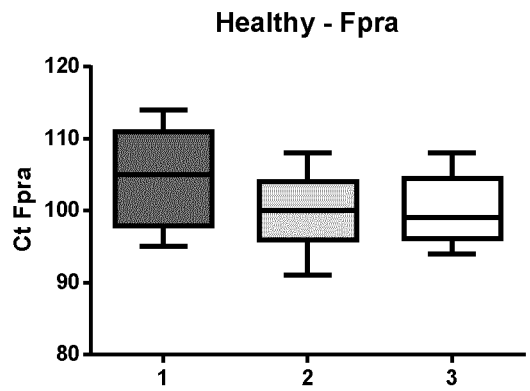
FIG. 15B. Fpra Ct value in healthy subjects samples; 1=negative control (no substrate), 2=200 mg Previpect, 3=200 mg *Plantago ovata*. Significant values differences are marked with asterisks (* when p≤0.05;  when p≤0.01; and * when p≤0.001).
Figure 16A:
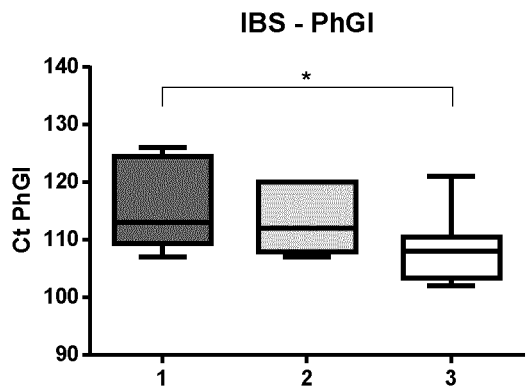
FIG. 16A. PhGI Ct value in IBS patients samples; 1=negative control (no substrate), 2=200 mg Previpect, 3=200 mg *Plantago ovata*. Significant values differences are marked with asterisks (* when p≤0.05;  when p≤0.01; and * when p≤0.001).
Figure 16B:
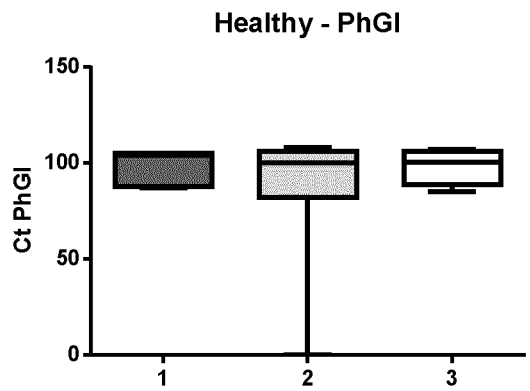
FIG. 16B. PhGI Ct value in healthy subjects samples; 1=negative control (no substrate), 2=. 200 mg Previpect, 3=200 mg *Plantago ovata*. Significant values differences are marked with asterisks (* when p≤0.05;  when p≤0.01; and * when p≤0.001).
Figure 17A:
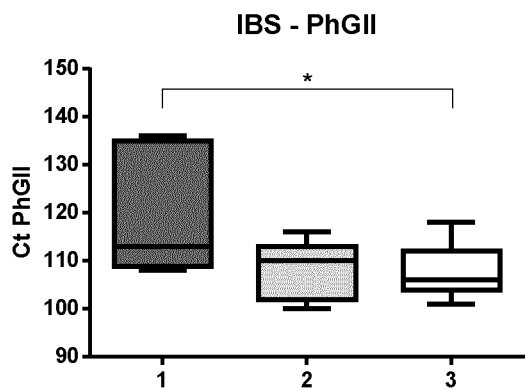
FIG. 17A. PhGII Ct value in IBS patients samples; 1=negative control (no substrate), 2=200 mg Previpect, 3=200 mg *Plantago ovata*. Significant values differences are marked with asterisks (* when p≤0.05;  when p≤0.01; and * when p≤0.001).
Figure 17B:
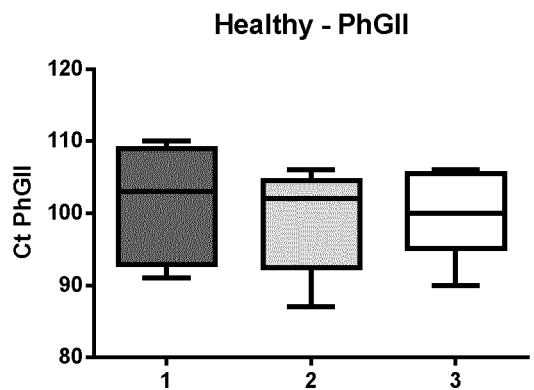
FIG. 17B. PhGII Ct value in healthy subjects samples; 1=negative control (no substrate), 2=200 mg Previpect, 3=200 mg *Plantago ovata*. Significant values differences are marked with asterisks (* when p≤0.05;  when p≤0.01; and * when p≤0.001).
Figure 18A:
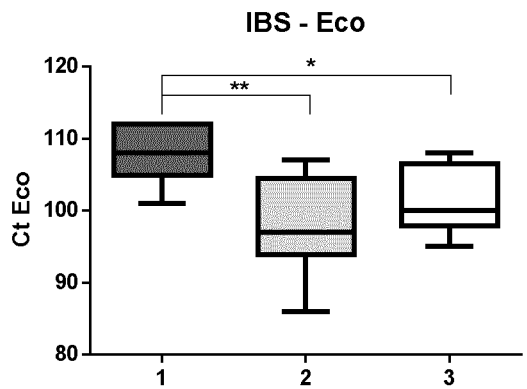
FIG. 18A. Eco Ct value in IBS patients samples; 1=negative control (no substrate), 2=200 mg Previpect, 3=200 mg *Plantago ovata*. Significant values differences are marked with asterisks (* when p≤0.05;  when p≤0.01; and * when p≤0.001).
Figure 18B:
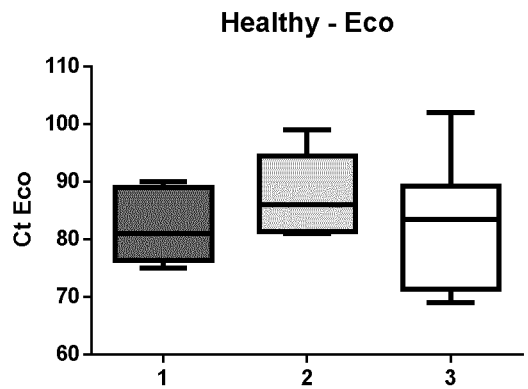
FIG. 18B. Eco Ct value in healthy subjects samples; 1=negative control (no substrate), 2=200 mg Previpect, 3=200 mg *Plantago ovata*. Significant values differences are marked with asterisks (* when p≤0.05;  when p≤0.01; and * when p≤0.001).
Figure 19A:
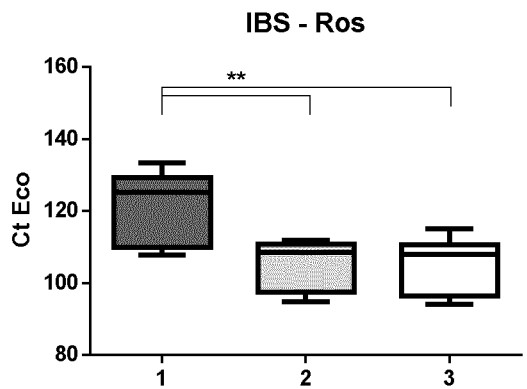
FIG. 19A. Ros Ct value in IBS patients samples; 1=negative control (no substrate), 2=200 mg Previpect, 3=200 mg *Plantago ovata*. Significant values differences are marked with asterisks (* when p≤0.05;  when p≤0.01; and * when p≤0.001).
Figure 19B:
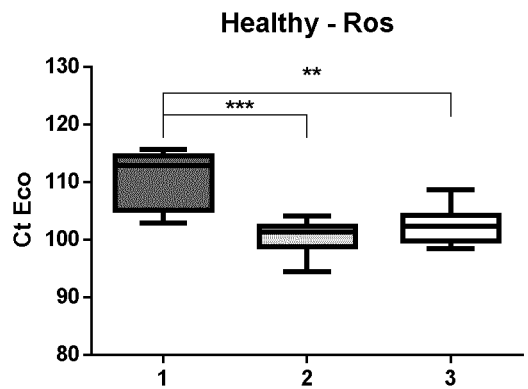
FIG. 19B. Ros Ct value in healthy subjects samples; 1=negative control (no substrate), 2=200 mg Previpect, 3=200 mg *Plantago ovata*. Significant values differences are marked with asterisks (* when p≤0.05;  when p≤0.01; and * when p≤0.001).
Figure 20A:
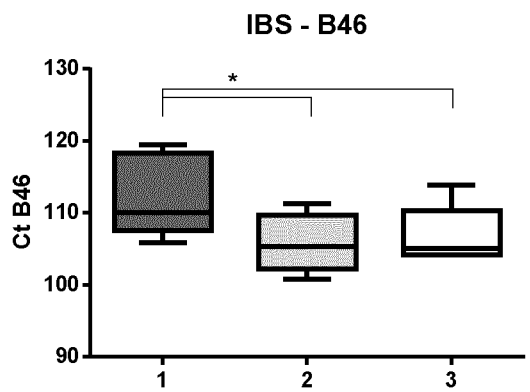
FIG. 20A. B46 Ct value in IBS patients samples; 1=negative control (no substrate), 2=200 mg Previpect, 3=200 mg *Plantago ovata*. Significant values differences are marked with asterisks (* when p≤0.05;  when p≤0.01; and * when p≤0.001).
Figure 20B:
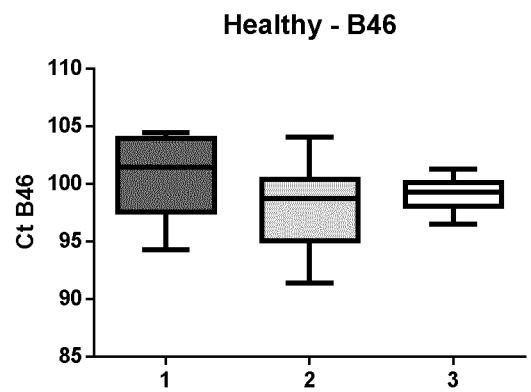
FIG. 20B. B46 Ct value in healthy subjects samples; 1=negative control (no substrate), 2=200 mg Previpect, 3=200 mg *Plantago ovata*. Significant values differences are marked with asterisks (* when p≤0.05;  when p≤0.01; and * when p≤0.001).
Figure 21A:
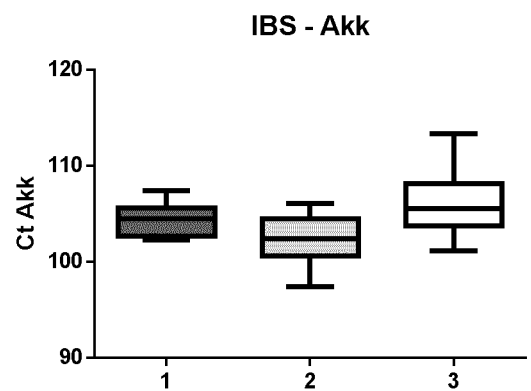
FIG. 21A. Akk Ct value in IBS patients samples; 1=negative control (no substrate), 2=200 mg Previpect, 3=200 mg *Plantago ovata*. Significant values differences are marked with asterisks (* when p≤0.05;  when p≤0.01; and * when p≤0.001).
Figure 21B:
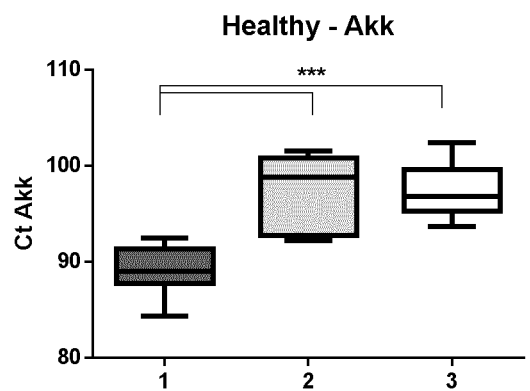
FIG. 21B. Akk Ct value in healthy subjects samples; 1=negative control (no substrate), 2=200 mg Previpect, 3=200 mg *Plantago ovata*. Significant values differences are marked with asterisks (* when p≤0.05;  when p≤0.01; and * when p≤0.001).

Two phylogroups of *F. prausnitzii* have been previously described (Lopez-Siles et al., Appl Environ Microbiol. 2012; 78:420-428). This study analyses the phylogenetic relationship of *F. prausnitzii* isolates to other members of *Clostridium* cluster IV based on 16S rRNA gene sequences and defines for the first time two phylogroups within *F. prausnitzii* species (FIG. 1 of Lopez-Siles et al. 2012), specifically it defines two branches within the Ruminococcaceae family with >97% sequence identity. These include five sequences reported previously for the isolates M21/2, ATCC 27766, and ATCC 27768 (belonging to PHGI) and A2-165 and L2-6 (belonging to PHGII).

WO2017/025617 describes a qPCR assay for simultaneously quantifying both *F. prausnitzii* phylogroups comprising the use of a unique pair of species-specific primers for 16S rRNA gene of *F. prausnitzii* and two hydrolysis probes targeting each *F. prausnitzii* phylogroup. The oligonucleotides used for this assay are shown in Table 15 of WO2017/025617, which contents are hereby incorporated by reference.

The expression "*Faecalibacterium prausnitzii* dysbiosis" as used herein refers to a decrease of total *F. prausnitzii* (Fpra), *F. prausnitzii* phylogroup I (PHGI) and/or *F. prausnitzii* phylogroup II (PHGII).

*Roseburia hominis* was first described by Duncan et al. (International Journal of Systematic and Evolutionary Microbiology 2006, 56, 2437-2441). It is a gram-variable or Gram-negative, strictly anaerobic, slightly curved rods, phylogenetically related to *R. intestinalis* but not sufficiently related for inclusion within the existing species. The type strain is A2-183. *R. hominis* is able to grow on glycerol but failed to grow on complex substrates such as inulin, xylan and amylopectin (see Table 1). Butyrate and formate are major products of *R. hominis* metabolism (see Table 2).

*Subdoligranulum variabile* was first described by Holmstrom et al. (Anaerobe 2004, 10, 197-203). It is a strictly anaerobic, non-spore-forming, Gram-negative staining organism which exhibits a somewhat variable coccus-shaped morphology. Comparative 16S ribosomal RNA gene sequencing studies showed that is phylogenetically a member of the *Clostridium leptum* supra-generic rRNA cluster. The type strain of *S. variabile* is BI 114T. The major products of glucose fermentation are butyric and lactic acids.

Said subject may be a subject which does not present symptoms of an intestinal disease. Indeed, a subject may experience intestinal dysbiosis, such as dysbiosis characterized by a decrease of *F. prausnitzii* and/or other butyrate-producing bacteria, before having an intestinal disease, for instance in the case of an inflammatory disease, before signs and/or symptoms of inflammation appear. In the in vitro fermentation experiments of Example 2, a statistically significant increase is observed in *Roseburia hominis*, *F. prausnitzii* phylogroup II and *Subdoligranulum* variable abundance in feces samples from healthy subjects wherein Previpect™ is used as substrate with respect to the negative control. This increase is maintained for *Roseburia hominis* and *F. prausnitzii* phylogroup II when relative levels of these markers with respect to *Eubacteria* are determined (see Tables 1 and 2). In a particular embodiment, optionally in combination with one or more of the embodiments described above or below, said subject does not present symptoms of an intestinal disease and has dysbiosis of PHGII, *Subdoligranulum* variable and/or *Roseburia hominis*.

Alternatively, said subject may have an intestinal disease. This intestinal disease may be an inflammatory intestinal disease, for instance "inflammatory bowel disease (IBD)", or a non-inflammatory intestinal disease.

The term "Inflammatory bowel disease (IBD)" as used herein refers to a group of idiopathic chronic inflammatory intestinal conditions. The two main disease categories the term covers are Crohn's disease (CD) and ulcerative colitis (UC), with both overlapping and distinct clinical and pathological features. The diagnosis of IBD requires a comprehensive physical examination and a review of the patient's history. Various tests, including blood tests, stool examination, endoscopy, biopsies, and imaging studies help exclude other causes and confirm the diagnosis. (World Gastroenterology Organisation Global Guidelines, Inflammatory bowel disease: a global perspective, June 2009; and Silverberg et al., Can J Gastroenterol. 2005, 19 Suppl A: 5-36). With an increasing understanding of epidemiology and genetics of IBD, it has become evident to clinicians that UC and CD may actually represent several forms of IBD. Thus, the term "IBD" as used herein includes phenotypes thereof.

The term "IBD phenotypes" as used herein includes diseases or disorders such as CD, UC, indeterminate colitis, inflammatory bowel disease type unclassified (IBDU), pouchitis, microscopic colitis, proctitis, diverticulitis (Mowat et al., Gut 2011, 1-37; Geboes et al., J Clin Pathol 2005; 58:1133-1134; Regueiro M, J Clin Gastroenterol. 2004, 38 (9): 733-740; Cheifetz A, and Itzkowitz S., J Clin Gastroenterol. 2004 May-June; 38 (5 Suppl 1): S44-50). It further includes subtypes within an IBD disease or disorder. CD subtypes are for instance those defined by the Montreal classification, wherein CD is classified according to age at diagnosis, location and/or behavior: UC subtypes can be also those defined by the Montreal classification, wherein UC is classified according to disease extend and/or disease severity (World Gastroenterology Organisation Global Guidelines, Inflammatory bowel disease: a global perspective, June 2009; and Silverberg et al., Can J Gastroenterol. 2005, 19 Suppl A: 5-36).

The term "indeterminate colitis (IC)" as used herein refers to those cases of chronic IBD without characteristic features of either UC or CD in a colectomy specimen (Silverberg et al., Can J Gastroenterol. 2005, 19 Suppl A: 5-36; Satsangi et al., Gut 2006; 55, 749-753).

The term "inflammatory bowel disease type unclassified (IBDU)" as used herein refers to those cases wherein there is evidence on clinical and endoscopic grounds for chronic inflammatory bowel disease affecting the colon, without small bowel involvement and there is no histological or other evidence to establish either CD or UC, wherein infection has been ruled out (Satsangi et al., Gut 2006; 55, 749-753).

In a particular embodiment, optionally in combination with one or more of the embodiments described above or below, said subject has IBD. Preferably, said subject has UC. UC patients have previously been reported to be characterized by decreased levels of PHGII (WO2017/025617).

In the in vitro fermentation experiments of Example 2, a statistically significant increase is observed in *F. prausnitzii* phylogroup II abundance in feces samples from UC patients wherein Previpect™ is used as substrate with respect to the negative control, even when relative levels with respect to *Eubacteria* are determined (see Tables 4 and 5). In a particular embodiment, optionally in combination with one or more of the embodiments described above or below, said subject has ulcerative colitis and PHGII dysbiosis.

In another particular embodiment, optionally in combination with one or more of the embodiments described above or below, said subject has a non-inflammatory intestinal disease. Illustrative non-limiting examples of non-inflammatory intestinal diseases are irritable bowel syndrome (IBS) and colorectal cancer (Miquel S. et al., Current Opinion in Microbiology 2013, 16:1-7). In a particular embodiment of the invention, said intestinal disease is a non-inflammatory intestinal disease with the proviso that it is not colorectal cancer. In another particular embodiment, said non-inflammatory intestinal disease is irritable bowel syndrome. Example 3 provides the experimental results obtained when incubating feces samples with Previpect™ 200, apple pectin and *Plantago ovata* in IBS patients and healthy subjects. As shown in Table 12, a statistically significant increase in total abundance was observed in total *F. prausnitzii, Roseburia hominis* and *Subdoligranulum variabile* when incubating feces samples of IBS patients with Previpect™ 200 with respect to the negative control. In a particular embodiment, optionally in combination with one or more of the embodiments described above or below, said subject has IBS and *F. prausnitzii, Roseburia hominis* and/or *Subdoligranulum variabile* dysbiosis.

In a further particular embodiment, optionally in combination with one or more of the embodiments described above or below, said subject is a human subject.

In a second aspect, the invention relates to grape skin, preferably isolated grape skin, for use in a method of treating an intestinal disease in a subject, wherein said subject has intestinal dysbiosis characterized by a decrease of butyrate-producing bacteria, preferably wherein butyrate-producing bacteria are selected from the group consisting of *Faecalibacterium prausnitzii, F. prausnitzii* phylogroup I (PHGI), *F. prausnitzii* phylogroup II (PHGII), *Roseburia hominis* and *Subdoligranulum variabile*.

It further refers to a method of treating an intestinal disease in a subject, wherein said subject has intestinal dysbiosis characterized by a decrease of butyrate-producing bacteria, preferably wherein butyrate-producing bacteria are selected from the group consisting of *Faecalibacterium prausnitzii, F. prausnitzii* phylogroup I (PHGI), *F. prausnitzii* phylogroup II (PHGII), *Roseburia hominis* and *Subdoligranulum variabile*, wherein said method comprises administering to a subject in need of such treatment a therapeutically effective amount of grape skin as described herein.

In a particular embodiment, said method of treating an intestinal disease is a prophylactic method and said subject does not present signs and/or symptoms of intestinal disease. In another embodiment, said method of treating an intestinal disease is a therapeutic method and said subject has an intestinal disease, i.e., presents signs and/or symptoms of intestinal disease. Particular embodiments and preferred features of these aspects are as described above.

In a further aspect, the invention refers to grape skin, preferably isolated grape skin, for use in a method of treating an intestinal disease in a subject. In a related aspect, it refers to a method of treating an intestinal disease in a subject, wherein said method comprises administering to a subject in need of such treatment a therapeutically effective amount of grape skin as described herein. In a particular embodiment of any of the above, said intestinal disease is other than ulcerative colitis, preferably, said disease other than ulcerative colitis is CD or IBS. Particular embodiments and preferred features of these aspects are as described above.

Grape skin as referred herein is preferably "isolated grape skin". The term "isolated grape skin" as used herein refers to grape skin isolated from the pulp, seeds and stems. Methods for separating grape skin from the pulp and other pomace are well known by a person skilled in the art. For instance, grape skin may be isolated manually. In a particular embodiment, the whole grape is dehydrated and then grape skin is isolated from other pomace (e.g. seeds and stems).

The grape may be from any grape species, from a white or red grape variety, preferably from a white grape variety. The pectin content of grape pomace has been reported to present significant differences between red and white grape variety, being higher in pomaces from white varieties (Gónzalez-Centeno M R, et al. Food sci technol. 2010; 43:1580-1586). Illustrative non-limiting examples of white grape varieties include *Vitis vinifera, Vitis labrusca, Vitis riparia, V. vinifera* hybrids and non-*V. vinifera* hybrids.

Preferably, the grape skin is from a grape species other than *Vitis rotundifolia*. The chemical composition of muscadine grape (*Vitis rotundifolia*) wines is described in Basha et al. (African Journal of Biotechnology 2004, Vol. 3 (10), 523-528) to differ from that of bunch grape (*Vitis vinifera*) wines, in particular with respect to its composition in antioxidant compounds. Notably, muscadine grapes have been reported to be characterized by the presence of a high concentration of certain phenolic compounds and to contain ellagic acid which is not usually found in grape species other than muscadine (Olien et al. Hortsci. 199025, 732-739; Lin and Vine J. Food Sci. 1990, 55, 1607-1613).

In a preferred embodiment, optionally, in combination with one or more of the embodiments described above or below, said grape is from the grape species *Vitis vinifera*. Examples of white grape varieties of the *Vitis vinifera* species are well known in the art and include but are not limited to white Grenache, pinot blanc, chardonnay, and sauvignon blanc. Preferably, this grape is from the grape species *Vitis vinifera* and from the white Grenache variety.

Isolated grape skin may be submitted to physical transformation processes, such as dehydration (including lyophilisation) or grinding. In a particular embodiment, optionally, in combination with one or more of the embodiments described above or below, said grape skin is dehydrated grape skin characterized by having a content of water equal to or less than 20%, such as around 18%. Preferably, said grape skin is dehydrated grape skin with a content of water equal to or less than 15%, such as with a content of water between 5 and 15%, more preferably between 10 and 12%, such as around 11%.

In a further embodiment, optionally, in combination with one or more of the embodiments described above or below, said grape skin is obtained or obtainable by a method comprising:

a) drying whole grapes, and
b) separating the grape skin;

c) optionally, grinding the product obtained in b); and
d) optionally, sieving the product obtained in c).

Preferably, in step a) grapes are dried in an air-circulating oven at 60-62° C. at least for 2 days. For instance it may be dried between 2 and 5 days, more preferably for 2 days.

The ground product is not particularly limited by its particle size. The particle size of the ground product obtained after step c) may be for instance from 0.001 mm to 5 mm. Typically, it has a particle size of less than 2 mm, preferably of less than 1 mm, more preferably of less than 0.1 mm. In a particular embodiment, the ground product is micronized.

The term "micronization" as used herein refers to the process of reducing the average diameter of a solid material's particles. Usually, the term micronization is used when the particles that are produced from only a few micrometres (typically less than 100 μm) to the nanometre range in diameter. Traditional micronization techniques are based on the use of friction to reduce particle size. The term "grinding" as used herein is broadly used to encompass any technique aimed to the reduction of particle size such as milling and grinding.

In a preferred embodiment, optionally in combination with one or more of the embodiments described above or below, the present invention relates to a composition comprising isolated grape skin as described herein and at least one pharmaceutically, veterinary or dietetically acceptable excipient or vehicle for use in a method of treating intestinal dysbiosis in a subject, wherein intestinal dysbiosis is characterized by a decrease of butyrate-producing bacteria as described herein. It further relates to the use of said pharmaceutical composition for use in a method of treating an intestinal disease in a subject wherein said subject has intestinal dysbiosis characterized by a decrease of butyrate-producing bacteria as described herein.

The term "pharmaceutically, veterinary or dietetically acceptable excipient or vehicle" refers to excipients or vehicles suitable for use thereof in pharmaceutical, veterinary or food technologies for preparing the compositions. These components, excipients or carriers must be compatible with other ingredients of the composition. It must also be suitable for use thereof in contact with the tissue or organ of human beings and animals without excessive toxicity, irritation, allergic response or other immunogenicity problems or complications at a reasonable benefit/risk ratio. They are substances lacking pharmacological activity at the concentrations present in a pharmaceutical form. The excipients or vehicles are used to provide the pharmaceutical or veterinary form characteristics which assure the stability, bioavailability, acceptability and ease of administration of one or more active ingredients. As regards the extent to which the excipients affect active ingredient release, they will be able to modify the magnitude and the time profile of the pharmacological activity of the drug product, by means of changes in its bioavailability. The excipients are also used to provide the preparation with suitable form or consistency. Examples of types of excipients: solubilizers, disintegrants or disintegrating agents, emulsifiers (emulsifying agents), dyes, flavorings, binders, antioxidants, lubricants, preservatives, thickeners, etc. Pharmaceutically acceptable carriers or excipients, such as those described in Remington's Pharmaceutical Sciences 16th edition, Osol, A. Ed. (1980) or *Remington: The Science and Practice of Pharmacy* $22^{nd}$ edition, Pharmaceutical press (2012), ISBN-13: 9780857110626 may also be included in a pharmaceutical composition described herein, provided that they do not adversely affect the desired characteristics of the pharmaceutical composition.

According to a preferred embodiment, the composition is a pharmaceutical composition. Any route of administration is suitable but oral or rectal administration may be preferred. The pharmaceutical composition is preferably formulated for oral or rectal administration. An oral composition may be for instance in the form of a pill, tablet, pastille, capsule, powder, wafer, effervescent powder or tablets, solution, suspension, syrup or granules. For solid pharmaceutical compositions, conventional nontoxic solid carriers may be used which include, for example, pharmaceutical grades of mannitol, lactose, starch, magnesium stearate, sodium saccharin, talcum, cellulose, glucose, sucrose, magnesium carbonate, and the like. A rectal composition may be inter alia in the form of a suppository, an enema or a specialized catheter. According to another preferred embodiment, the composition is a food composition. The food composition can be a liquid composition or beverage, a solid composition or a nutritional supplement or complement (also referred to as dietary or food supplement or complement). In the context of the present invention, the term "food composition" would encompass any solid or liquid food enriched with isolated grape skin as well as any nutritional supplement or complement containing isolated grape skin.

The food composition can be a liquid composition, i.e., a beverage, according to terms most generally used in the society. In the context of the present invention, such liquid composition includes, but is not limited to, any beverage selected from the group consisting of animal or plant milk, as well as any derivative thereof, such as for example, milk shakes, yogurt, kefir, etc.; fruit and/or vegetable juices; still water or sparkling water, or flavored or sweetened (by means of nutritive sweeteners (sucrose, fructose . . . ) or artificial sweeteners) water or beverages; seasonings, such as for example, any salsa, dressing, ketchup, oil, vinegar or vinegar preparations; alcoholic beverages of any type; tea, coffee; as well as all types of refreshing beverages or soft drinks, or energizing beverages.

The food composition can also be a solid composition. Such solid composition can, for example, be selected from, but is not limited to, the group consisting of animal or plant milk derivatives, such as cheese, butter, margarine and tofu; any type of bread, including fresh, packaged or frozen bread, sliced bread, wholemeal bread, spice bread, sweet bread, salty bread, etc; pasta prepared from any cereal flour, such as wheat or semolina flour (macaroni, spaghetti, noodles, etc); baked goods, including cakes, cookies, muffins, doughnuts, etc.; infusions, tea or coffee, in bulk or in sachets, for preparing beverages; jellies, candies, including gummy candies, better known as "soft fruit candies"; as well as any type of solid seasoning, for example, oregano, salt, coriander, parsley, basil, etc, or mixtures thereof.

Finally, the food composition can also be a nutritional, dietary or food supplement or complement, any of these terms being used in the context of the present invention in an equivalent manner. These terms are normally used for compositions consumed orally, which contain an ingredient intended for complementing the diet, in the case of the present invention, the isolated grape skin. They shall never replace a conventional food, or be the only component of a meal or of the diet. They can be found in different presentations, such as pastilles, pills, tablets, capsules, soft gelatin capsules, gelatin capsules, wafers, effervescent tablets, liquids (solution, suspension, syrup), granules and powders, all of which are included as particular embodiments within the scope of the present invention. Dietetically or pharmaceutically acceptable excipients are obvious for the skilled person for obtaining any of the preceding presentations, and they are included within the scope of the present invention.

In a particular embodiment, optionally in combination with one or more of the embodiments described above or below, the isolated grape skin composition is formulated as a delayed-release or enteric oral form. In delayed-release oral forms either the outer surface or the contents resist the action of gastric fluid but release the active ingredient(s) in the presence of intestinal fluid. Such delayed release oral forms include but are not limited to granulates, tablets, as well as hard or soft capsules, and combinations thereof.

Said delayed-release oral forms comprise at least one gastro-resistant layer or coating, wherein said gastro-resistant layer or coating comprises at least one gastro-intestinal polymer. The term "coating" as used herein refers to the application of a layer to the whole of a surface, e.g. to the shell of a capsule or to a core comprising the active ingredient. In some embodiments, said delayed-release form may comprise 2, 3 or more gastro-resistant layers or coatings.

Gastro-resistant polymers are well known in the art. These polymers dissolve generally at a pH above 5.5 and make possible to protect the substance or composition that they coat from the gastric environment. Illustrative, non-limiting examples of gastro-resistant polymers and polymeric coatings are cellulose acetate, the copolymers of the methacrylic acid and of the methacrylic esters in different ratios, commercially known under the trade-mark EUDRAGIT®, mainly EUDRAGIT® L and EUDRAGIT® S, polyvinylacetophthalate and hydroxypropylmethylcellulose phthalate. Moreover, said gastro-resistant layer or coating may further comprise a plasticizer, such as diethylphthalate, dibutylphthalate, triacetin, polyethylene glycols and acetylated monoglycerides. Typically, a plasticizer is comprised in an amount between 5% and 15% in weight with respect to the amount of coating agent.

In a particular embodiment, optionally in combination with one or more of the embodiments described above or below, said composition further comprises a compound selected from the group consisting of a prebiotic, a single species or a group of probiotic species (including natural or genetically modified microorganisms), secondary products of bacteria (e.g. butyrate), modulators of molecular pathways of bacteria/host interactions and narrow-spectrum antibiotics.

Prebiotic and probiotic compounds are well known in the art and may be used alone or in combination (i.e. synbiotic applications), see for instance the Handbook of Prebiotics and Probiotics Ingredients; Health benefits and food applications (Ed. Ungsoo Cho S. and Finocchiaro T., CRC press, 2009).

In a particular embodiment, optionally in combination with one or more of the embodiments described above or below, said composition further comprises a prebiotic compound. Illustrative, non-limiting examples of prebiotic compounds which may be used in combination with grape skin as described herein, include and may be selected from other grape derivatives (e.g., grape seed or grape seed proanthocyanidin extract (GSPE, see Liu W. et al., Mol. Nutr. Food Res 61, 9, 2017)), germinated barley foodstuff (GBF), fructo-oligosaccharides (FOS), inulin, apple pectin, and Ispaghula husk (also referred as *Plantago ovata*) seeds and/or flowers and/or any other part of the plant. Preferably, said prebiotic compound is apple pectin.

Many probiotic species have been described including those present in yogurt and other dairy products. Illustrative, non-limiting examples of probiotic species include lactobacilli (e.g., *Lactobacillus acidophilus, Lactobacillus bulgarius, Lactobacillus reuteri*), bifidobacteria (e.g., *Bifidobacterium bifidum*), *Streptococcus thermophilus, Saccharomyces boulardii, Bacillus subtilis* and non-pathogenic species of *E. coli*.

In a particular embodiment, optionally in combination with one or more of the embodiments described above or below, said composition further comprises a single species or a group of probiotic species selected from the group consisting of butyrate-producing bacteria, lactobacilli, bifidobacteria, *Streptococcus thermophilus, Saccharomyces boulardii, Bacillus subtilis* and non-pathogenic species of *E. coli*, wherein preferably said butyrate-producing bacteria are selected from the group consisting of *F. prausnitzii, F. prausnitzii* phylogroup I, *F. prausnitzii* phylogroup II, *R. hominis*, and *S. variabile*.

The composition may be in any form, such as in lyophilized, liquid or nebulized form. If for example lyophilized bacteria are used for making the composition, then said preliminary composition of lyophilized bacteria may be rehydrated, e.g. with sterile isotonic saline solution, so that a final composition with the desired total concentration (CFU/ml) can be obtained.

To provide for easy use, the composition may be in dosed form. For example, each dose comprises $10^7$ or more, $10^8$ or more, $10^9$ or more, $10^{10}$ or more, $10^{11}$ or more colony forming units (CFU) of bacteria ($10^9$ or more may be preferred). A dose may have a volume in the range of 0.1 to 100 ml, preferably 0.2 to 50 ml, more preferably 0.5 to 20 ml, more preferably 1.0 to 10 ml, more preferably 1.5 to 5 ml.

In a further aspect, the present invention is concerned with synergistic combinations of grape skin and a compound selected from the group consisting of a prebiotic, a single species or a group of probiotic species, secondary products of bacteria, modulators of molecular pathways of bacteria/host interactions and narrow-spectrum antibiotics. It further refers to a composition comprising grape skin and a compound as above defined providing synergistic effects in the treatment of intestinal dysbiosis and the use thereof in the treatment of intestinal dysbiosis, preferably in the treatment of butyrate-producing bacteria dysbiosis. Particular embodiments and preferred features are as described herein.

It is contemplated that any features described herein can optionally be combined with any of the embodiments of any medical use, composition, pharmaceutical composition, method of treatment, method of manufacturing a composition and/or combination therapies of the invention; and any embodiment discussed in this specification can be implemented with respect to any of these. It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications are herein incorporated by reference to the same extent as if each individual publication or patent application was specifically and individually indicated to be incorporated by reference.

The use of the word "a" or "an" may mean "one," but it is also consistent with the meaning of "one or more," "at least one," and "one or more than one". The use of the term "another" may also refer to one or more. The use of the term "or" in the claims is used to mean "and/or" unless explicitly indicated to refer to alternatives only or the alternatives are mutually exclusive.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. The term "comprises" also encompasses and expressly discloses the terms "consists of" and "consists essentially of". As used herein, the phrase "consisting essentially of" limits the scope of a claim to the specified materials or steps and those that do not materially affect the basic and novel characteristic(s) of the claimed invention. As used herein, the phrase "consisting of" excludes any element, step, or ingredient not specified in the claim except for, e.g., impurities ordinarily associated with the element or limitation.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "around", "approximately" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by ±1, 2, 3, 4, 5, 6, 7, 8, 9, 10, 11, 12, 13, 14 or 15%. Accordingly, the term "about" may mean the indicated value±5% of its value, preferably the indicated value±2% of its value, most preferably the term "about" means exactly the indicated value (±0%).

Items of the Invention

1. Isolated grape skin for use in a method of treating intestinal dysbiosis in a subject, wherein intestinal dysbiosis is characterized by a decrease of butyrate-producing bacteria, preferably wherein butyrate-producing bacteria are selected from the group consisting of *Faecalibacterium prausnitzii*, *F. prausnitzii* phylogroup I (PHGI), *F. prausnitzii* phylogroup II (PHGII), *Roseburia hominis* and *Subdoligranulum variabile*.

2. The isolated grape skin for use according to item 1, wherein said subject does not present signs and/or symptoms of intestinal disease.
3. The isolated grape skin for use according to item 1, wherein said subject has an intestinal disease.
4. Isolated grape skin for use in a method of treating an intestinal disease in a subject wherein said subject has intestinal dysbiosis characterized by a decrease of butyrate-producing bacteria, preferably wherein butyrate-producing bacteria are selected from the group consisting of *Faecalibacterium prausnitzii*, *F. prausnitzii* phylogroup I (PHGI), *F. prausnitzii* phylogroup II (PHGII), *Roseburia hominis* and *Subdoligranulum variabile*.
5. The isolated grape skin for use according to item 4, wherein said method is a prophylactic method and said subject does not present signs and/or symptoms of intestinal disease.
6. The isolated grape skin for use according to item 4, wherein said method is a therapeutic method and said subject has an intestinal disease.
7. The isolated grape skin for use according to any of items 3 to 6, wherein said intestinal disease is an inflammatory bowel disease.
8. The isolated grape skin for use according to any of items 3 to 7, wherein said intestinal disease is ulcerative colitis or Crohn's disease.
9. The isolated grape skin for use according to any of items 3 to 6, wherein said intestinal disease is irritable bowel syndrome.
10. The isolated grape skin for use according to any of items 1 to 9, wherein said subject is a human subject.
11. The isolated grape skin for use according to any of items 1 to 10, wherein a decrease of butyrate-producing bacteria is determined by a method comprising:
    a. determining the levels of a butyrate-producing bacteria in an intestinal sample, preferably a feces sample, of said subject;
    b. comparing the levels of said butyrate-producing bacteria in said subject sample with the levels in a reference sample, preferably wherein said reference sample is a sample of a subject or group of subjects not having an intestinal disease;
    wherein when the levels in said subject sample are below the levels in said reference sample there is a decrease of butyrate-producing bacteria.
12. The isolated grape skin for use according to item 11, wherein the levels of butyrate-producing bacteria are determined by quantitative PCR.
13. The isolated grape skin for use according to any of items 11 or 12, wherein said butyrate-producing bacteria are selected from the group consisting of *Faecalibacterium prausnitzii*, *F. prausnitzii* phylogroup I (PHGI), *F. prausnitzii* phylogroup II (PHGII), *Roseburia hominis* and *Subdoligranulum variabile* and the respective levels of butyrate-producing bacteria are determined by a method comprising the use of one or more of the following:
    A polynucleotide selected from the group consisting of SEQ ID NO:1, SEQ ID NO:2, SEQ ID NO:3, and a polynucleotide with an identity of at least 85% thereto, for the determination of the levels of *F. prausnitzii*;
    A polynucleotide consisting of SEQ ID NO:6 or a polynucleotide with an identity of at least 85% thereto for the determination of the levels of PHGI, optionally, in combination with SEQ ID NO:4 and/or SEQ ID NO:5, or with a polynucleotide with an identity of at least 85% thereto;

A polynucleotide consisting of SEQ ID NO:7 or a polynucleotide with an identity of at least 85% thereto for the determination of the levels of PHGII, optionally, in combination with SEQ ID NO:4 and/or SEQ ID NO:5, or with a polynucleotide with an identity of at least 85% thereto;

A polynucleotide selected from the group consisting of SEQ ID NO:11, SEQ ID NO: 12, and a polynucleotide with an identity of at least 85% thereto for the determination of the levels of *Roseburia hominis*; and A polynucleotide selected from the group consisting of SEQ ID NO:13, SEQ ID NO: 14, and a polynucleotide with an identity of at least 85% thereto for the determination of the levels of *Subdoligranulum variabile*.

14. The isolated grape skin for use according to any of items 1 to 13, wherein said grape skin is from a grape species other than *Vitis rotundifolia*.
15. The isolated grape skin for use according to any of items 1 to 14, wherein said grape skin is from the grape species *Vitis vinifera*, preferably from a white grape variety.
16. The isolated grape skin for use according to any of items 1 to 15, wherein said grape skin is dehydrated grape skin characterized by having a content of water equal to or less than 20%.
17. The isolated grape skin for use according to any of items 1 to 16, obtained or obtainable by a method comprising:
    a) drying whole grapes; and
    b) separating the grape skin;
    c) optionally, grinding the product obtained in b); and
    d) optionally, sieving the product obtained in c), preferably to obtain a product with a particle size of 1 mm or less.
18. The isolated grape skin for use according to item 17, wherein in step a) the whole grapes are dried in an air-circulating oven at 60-62° C. for at least 2 days.
19. A composition comprising the isolated grape skin as defined in any of items 1 to 18, for use according to any of items 1 to 18.
20. The composition for use according to item 19, wherein said composition further comprises a compound selected from the group consisting of a prebiotic, a single species or a group of probiotic species, secondary products of bacteria, modulators of molecular pathways of bacteria/host interactions and narrow-spectrum antibiotics.
21. The composition for use according any of items 19 or 20, wherein said composition further comprises a prebiotic compound selected from the group consisting of germinated barley foodstuff (GBF), fructo-oligosaccharides (FOS), inulin, apple pectin, and Ispaghula husk seeds and/or flowers and/or any other part of the plant.
22. The composition for use according to any of items 19 to 21, wherein said composition further comprises a single species or a group of probiotic species are selected from the group consisting of butyrate-producing bacteria, lactobacilli, bifidobacteria, *Streptococcus thermophilus*, *Saccharomyces boulardii*, *Bacillus subtilis* and non-pathogenic species of *E. coli*, wherein preferably said butyrate-producing bacteria are selected from the group consisting of *F. prausnitzii*, *F. prausnitzii* phylogroup I, *F. prausnitzii* phylogroup II, *R. hominis*, and *S. variabile*.
23. The composition according to any of items 1 to 22, wherein said composition is formulated for oral or rectal administration.

The following examples serve to illustrate the present invention and should not be construed as limiting the scope thereof.

EXAMPLES

Example 1.—Characterization of the Assayed Dehydrated Grape Skin Composition

A dehydrated grape skin composition has been obtained by a method comprising drying of whole grape skins from a white grape variety (i.e., white Grenache (Alt Empordà, Catalonia, Spain) of the grape species *Vitis vinifera* in an air-circulating oven at 60-62° C. for 2 days, and the subsequent grinding and the sieving thereof using a 1 mm sieve. The resulting composition with a particle size of 1 mm or less is referred herein as "Previpect™".

The table below provides the results of the chemical composition analysis of this grape skin composition, wherein it is specified for instance, the content of soluble and insoluble fibre, as well as neutral sugars:

Chemical Composition Analysis:
Results:
  Total sugars (expressed in glucose) % (p/p) s.s.n . . . 53.24
    Method: Lurff-Schoorl volumetric method (Regulation (EC) n° 152/2009)
  Sugars chromatogram
    Method: HPLC-Refractive Index (RI)
      Fructose % (p/p) s.s.n . . . 25.8
      Glucose % (p/p) s.s.n . . . 6.1
      Sucrose % (p/p) s.s.n . . . <0.5
      Maltose % (p/p) s.s.n . . . <0.5
      Lactose Monohydrate % (p/p) s.s.n . . . <0.5
  Soluble and Insoluble Dietetic Fibre % (p/p) s.s.n
    Method: Gravimetric analysis (AOAC Official Method 993. 19 1(1996) $16^{th}$. Edition)
      Total Dietetic Fibre % (p/p) s.s.n . . . 32.16
      Soluble Dietetic Fibre % (p/p) s.s.n . . . 3.30
      Insoluble Dietetic Fibre % (p/p) s.s.n . . . 28.86
  Humidity and Volatile Substances (103° C.) % (p/p) s.s.n, 6.30
    Method: Gravimetric analysis (Regulation (EC) n° 152/2009)
  Sodium (Na) mg/Kg s.s.n . . . 78
    Method: Flame atomic absorption spectroscopy (A.A.S.)
  Nitrates ($NO_3Na$) mg/Kg s.s.n . . . 26
    Method: HPLC-UV (DAD)

Dehydration Tests

Figure 22:
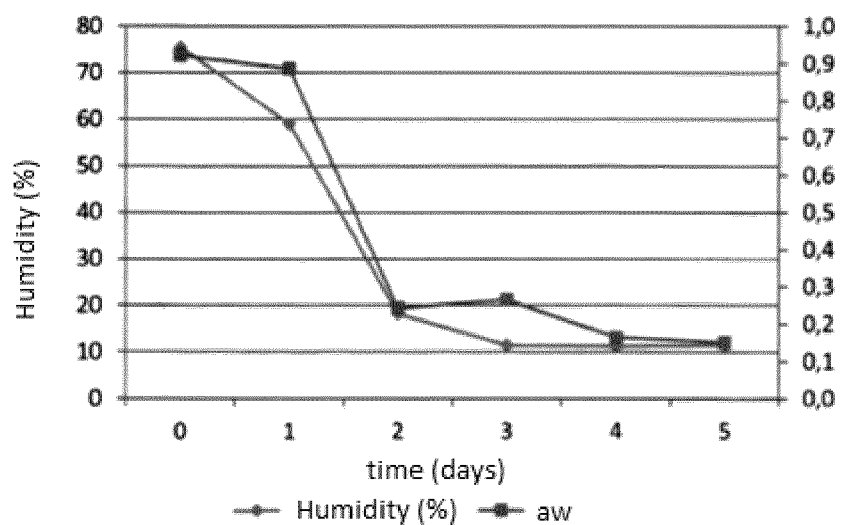
FIG. 22. Graph illustrating the humidity (%) and activity of water of a grape sample subjected to dehydration in an air-circulating oven at 60-62° C. for a period of 5 days (days 0 to 5).

A thermobalance was used for determining the moisture content of a sample of grape skin of the *Vitis vinifera* species (white Grenache variety) after drying in an air-circulating oven at 60-62° C. for a period of 5 days. The results show that after 2 days the percentage of humidity is below 20%, after 3 days being stabilized around 11%. The results are shown below and represented in FIG. 22.

| t(days) | Humidity(%) | Activity of water (aw) |
|---|---|---|
| 0 | 75.53 | 0.921 |
| 1 | 59.05 | 0.886 |
| 2 | 18.22 | 0.242 |
| 3 | 11.55 | 0.265 |
| 4 | 11.25 | 0.164 |
| 5 | 11.56 | 0.151 |

Example 2.—In Vitro Incubation of Previpect™ with Faeces Samples from IBD Patients and Healthy Subjects Material & Methods 1. Patients, Clinical Data and Sampling Fecal samples were obtained by thirteen healthy subjects (H) and eleven patients diagnosed with inflammatory bowel disease (IBD): 5 diagnosed with Crohn's disease (CD) and 6 diagnosed with Ulcerative Colitis (UC). Those volunteers were recruited by the Gastroenterology Service of the Hospital Universitari Dr. Josep Trueta (Girona, Spain).

Subjects recruited as IBD patients were diagnosed according to standard clinical, pathological and endoscopic criteria and all were in active disease in terms of inflammatory response (with calprotectin levels over 250 µg/G or protein C reactive (PCR) levels over 0.5 µg/L). The control group consisted of healthy subjects, without any known gastrointestinal disorder, was recruited according to clinical standards.

2. Sample Collection, Preservation and Storage

Each subject contributed with one fecal sample. These were collected at the Gastroenterology Service of the Hospital Universitari Dr. Josep Trueta. Briefly, the samples were collected in a sterile urine pot (Sarstedt, Nümbrecht, Germany), kept at room temperature and used fresh, within less than 4 hours after deposition. All samples from all subjects were homogenized and immediately used for the experiment.

3. Fecal Incubations

Fecal fermentations were carried out with fresh human feces obtained from IBD and healthy subjects as described above. In the laboratory, fecal samples were transferred to a stomacher sterile plastic bag and, after addition of 5:1 of fermentation buffer (0.1M $KH_2PO_4$, 0.05 mM NaOH; pH 7.0), the bags were carefully squeezed to mix the contents. The mix or fecal slurry was stirred in a Stomacher 400 (Seward, Worthing, UK) at 230 rpm for 3 minutes. Ten milliliters of this suspension were transferred into borosilicate glass tubes with phenolic cap. Each of the following compounds had been previously added:

Negative control: 10 ml of fermentation buffer;
Previpect™ 200:200 mg of Previpect™ diluted in 10 ml of fermentation buffer;
Previpect™ 600:600 mg of Previpect™ diluted in 10 ml of fermentation buffer;
Pectin 200:200 mg of apple pectin (Solgar, Madrid, Spain) diluted in 10 ml of fermentation buffer;
Previpect™+Pectin 200:200 mg of apple pectin plus 200 mg of Previpect™ both diluted in 10 ml of fermentation buffer.

The tubes containing the substrates had been previously autoclaved during 10 minutes at 100° C. to degas. The fermentation tubes were tightly closed and incubated at 37° C. under gentle agitation.

After 72 hours, the tubes were transferred to a sterile plastic tube to then centrifuge at 4° C. for 30 minutes at 4500×g. The supernatants were transferred to another tube and centrifuged again at 4° C. for 15 minutes at 4500×g. Finally, the supernatants were stored in closed vials at −20° C.

One unique fecal sample was used from each volunteer except of one healthy subject that had been taken as an internal control for the experiments. However, due to the variation reported in the experiments, this subject has been considered as different subjects in each experiment.

4. DNA Extraction

DNA from fermentation tubes was extracted, before the centrifugations, using NucleoSpin® Soil Kit (Macherey-Nagel GmbH &Co., Duren, Germany). Briefly, 250 µl of sample were placed in a Nucleospin bead-tube. 700 µl of SL1 and 150 µl of Enhancer (SX) were added to each sample in order to improve DNA recovery. Afterwards, DNA was extracted and purified following the instructions from the manufacturer. Genomic DNA was eluted with 100 µl of elution buffer and stored at −20° C. until use. DNA concentration of the extracts was determined with a Qubit fluorimeter (Invitrogen detection Technologies, USA) using Qubit dsDNA High Sensitivity Assay Kit. Prior to qPCR analysis, DNA concentration was adjusted to 8 ng/µl with free DNA water.

5. Analysis of Short Chain Fatty Acids (SCFAs)

Two milliliters of supernatants from fecal incubations were passed through a 0.22 µl sterile filter into a new tube. Eighty-five milliliters of crotonic acid (10000 ppm) was added as internal standard, plus 100 µl of 85% of phosphoric acid to transform into non-ionized samples for each 1.5 ml of sample. Vials were put into a DB-FFAP column (Agilent, CA, US) in a GC-FID system (Agilent, CA, US). Short-chain fatty acids measured were as follows: acetic, propionic, butyric, isobutyric, valeric, isovaleric and hexanoic acid.

6. Quantitative Real-Time PCR (qPCR) of DNA Extracted from Fecal Samples

DNA from fecal incubations was analysed by quantitative real-time PCR. More specifically, we assessed the quantity of total *Faecalibacterium prausnitzii* (Fpra), *Faecalibacterium prausnitzii* phylogroup I (PhGI), *Faecalibacterium prausnitzii* phylogroup II (PhGII), *Escherichia coli* (Eco), *Roseburia hominis* (ROS), B46 (*Subdoligranulum variabile*) and *Eubacteria* (EUB). Fpra, PhGI, PGhII and Eco bacterial sequences were quantified using a quantitative real time PCR with Taqman™ probe-based assays while ROS, B46 and EUB were quantified with SYBR® Green assays. Primers and qPCR conditions were as described below:

TABLE A

Primers and probes used for the qPCR assays:

| Bacterial species | Oligonucleotide sequence | |
|---|---|---|
| *Faecalibacterium prausnitzii* | Fpra428F (SEQ ID NO: 1) | 5'-TGTAAACTCCTGTTGTTG AGGAAGATA A-3' |
| | Fpra583R (SEQ ID NO: 2) | 5'-GCGCTCCCTTTACACCC A-3' |
| | Fpra493PR (SEQ ID NO: 3) | '6FAM3'-CAAGGAAGTGACGGCTAACTA CGTGCCAG-5'TAMRA |

TABLE A-continued

Primers and probes used for the qPCR assays:

| Bacterial species | | Oligonucleotide sequence |
|---|---|---|
| Faecalibacterium prausnitzii PhGI and PhGII (phylogroup specific probes) | Fpra(PHG)136F (SEQ ID NO: 4) | 5'-CTCAAAGAGGGGACAAC AGTT-3' |
| | Fpra(PHG)232R (SEQ ID NO: 5) | 5'-GCCATCTCAAAGCGGATT G-3' |
| | PHG1180PR (SEQ ID NO: 6) | 5'FAM-TAAGCCCACGACCCG GCATCG-3'BHQ1 |
| | PHG2180PR (SEQ ID NO: 7) | 5'HEX-TAAGCCCACRGCTCG GCATC-3'BHQ1 |
| Escherichia coli | Eco395F (SEQ ID NO: 8) | 5'-CATGCCGCGTGTATGAAG AA-3' |
| | Eco490R (SEQ ID NO: 9) | 5'-CGGGTAACGTCAATGAGC AAA-3' |
| | Eco437PR (SEQ ID NO: 10) | 5'6FAM-TATTAACTTTACTCCCTTCCT CCCCGCTGAA-3'TAMRA |
| Roseburia hominis (Larsen et al 2010. PloS One 5(2): e9085) | VROS2F (SEQ ID NO: 11) | 5'-TACTGCATTGGAAACTGT CG-3' |
| | VROS2R (SEQ ID NO: 12) | 5'-CGGCACCGAAGAGCAAT-3' |
| Subdoligranulum variabile (B46) | B46F (SEQ ID NO: 13) | 5'-TCCACGTAAGTCACAAGC G-3' |
| | B46R (SEQ ID NO: 14) | 5'-CGCCTACCTGTGCACTAC TC-3' |
| Eubacteria | EubF (SEQ ID NO: 15) | 5'-ACTCCTACGGGAGGCAGCA GT-3' |
| | EubR (SEQ ID NO: 16) | 5'-GTATTACCGCGGCTGCTGG CAC-3' |

Samples were run in duplicate in the same plate. For data analysis, the mean of the duplicate quantifications was used. Bacterial abundances for each sample were expressed as Ct normalized to total DNA concentration, where the Ct (cycle threshold) value is defined as the number of q-PCR cycles required for the fluorescent signal to cross the threshold. Ct levels are inversely proportional to the logarithm of target nucleic acid concentration in the sample. The real-time assays undergo 40 cycles of amplification.

All quantitative PCR were performed using AriaMx PCR System (Stratagene by Agilent, Santa Clara, CA, USA), and analyzed using the AriaMx Software version1.2 (Stratagene by Agilent, Santa Clara, CA, USA).

7. Methods of Statistical Analysis

Statistical normal distribution of the data was analyzed through Kolmogorov-Smirnov test. According to whether there was a statistical normal distribution of the data or not, an adequate statistical test to compare the following groups was used. Normal t-test was used to compare groups distributed normally whereas Mann-Whitney non-parametric test was used to compare groups without normal distribution.

Results

In order to determine the potential improvement on the gut microbiota caused by Previpect™ addition, the abundance of *Eubacteria*, B46, *Roseburia hominis*, *F. prausnitzii*, phylogroup I, phylogroup II and *E. coli* of these patients were studied after incubation with the five different substrates. The bacterial species quantification results are presented in FIGS. 1A to 6C. The concentration of short chain fatty acids (SCFA) such as butyric, hexanoic, isobutyric, isovaleric, propionic, valeric, and acetic acid was also quantified in order to assess the expected increase in the metabolic activity of microbiota capable of producing SCFA after Previpect™ addition. The SCFA quantification results are presented in FIGS. 7A to 13C.

Statistical comparison was done among the five treatments in the three different sample groups: healthy (H) subjects, Crohn's disease (CD) and ulcerative colitis (UC) patients. Data did not show a normal distribution, therefore, Mann-Whitney, a non-parametric test was used to compare treatments.

Statistical Comparison Results

Healthy (H) Subjects

TABLE 1

Comparison of the total abundance of *Eubacteria* (EUB), B46, *F. prausnitzii* (Fpra), phylogroup I (PhGI), phylogroup II (PhGII), *Escherichia coli* (Eco) and *Roseburia hominis* (ROS) in feces samples from healthy subjects incubated with the different substrates. Numbers in the table indicate the p-value, a p-value <0.05 has been considered to be statistically significant.

| | | EUB | B46 | Fpra | Eco | PhGI | PhGII | ROS |
|---|---|---|---|---|---|---|---|---|
| Negative control | Previpect™ 200 | 0.000 | 0.024 | 0.025 | 0.653 | 0.090 | 0.005 | 0.004 |
| | Previpect™ 600 | 0.000 | 0.064 | 0.004 | 0.594 | 0.169 | 0.000 | 0.000 |
| | Previpect™ + pectin 200 | 0.000 | 0.008 | 0.000 | 0.389 | 0.008 | 0.000 | 0.000 |
| | Pectin 200 | 0.000 | 0.001 | 0.000 | 0.636 | 0.009 | 0.001 | 0.093 |
| Previpect™ 200 | Previpect™ 600 | 0.445 | 0.753 | 0.509 | 0.346 | 0.928 | 0.290 | 0.034 |
| | Previpect™ + Pectin 200 | 0.096 | 0.572 | 0.084 | 0.126 | 0.128 | 0.054 | 0.149 |
| | Pectin 200 | 0.808 | 0.110 | 0.063 | 0.450 | 0.248 | 0.542 | 0.379 |

TABLE 1-continued

Comparison of the total abundance of *Eubacteria* (EUB), B46, *F. prausnitzii* (Fpra), phylogroup I (PhGI), phylogroup II (PhGII), *Escherichia coli* (Eco) and *Roseburia hominis* (ROS) in feces samples from healthy subjects incubated with the different substrates. Numbers in the table indicate the p-value, a p-value <0.05 has been considered to be statistically significant.

|  |  | EUB | B46 | Fpra | Eco | PhGI | PhGII | ROS |
|---|---|---|---|---|---|---|---|---|
| Previpect ™ 600 | Previpect ™ + Pectin 200 | 0.423 | 0.281 | 0.185 | 0.937 | 0.027 | 0.479 | 0.251 |
|  | Pectin 200 | 0.426 | 0.106 | 0.102 | 0.844 | 0.131 | 0.778 | 0.013 |
| Previpect ™ + pectin 200 | Pectin 200 | 0.090 | 0.502 | 0.596 | 0.657 | 0.984 | 0.401 | 0.037 |

A general increase in butyrate producing species, such as B46, *Roseburia hominis*, *F. prausnitzii*, especially *F. prausnitzii* phylogroup II, is observed when comparing the negative control (without substrate) to Previpect™ 200 mg and Previpect™ 600 mg. In addition, an increase in *Roseburia hominis* abundance is observed when comparing Previpect™ 600 mg to Pectin 200 mg (i.e., apple pectin).

TABLE 2

Comparison of relative levels of B46, *F. prausnitzii* (Fpra), phylogroup I (PhGI), phylogroup II (PhGII), *Escherichia coli* (Eco) and *Roseburia hominis* (ROS) compared to total bacteria represented by *Eubacteria* (EUB) in feces samples from healthy subjects. Numbers in the table indicate the p-value, a p-value <0.05 has been considered to be statistically significant.

|  |  | B46/EUB | Fpra/EUB | Eco/EUB | PhGI/EUB | PhGII/EUB | ROS/EUB |
|---|---|---|---|---|---|---|---|
| Negative control | Previpect ™ 200 | 0.903 | 0.626 | 0.612 | 0.729 | 0.053 | 0.031 |
|  | Previpect ™ 600 | 0.468 | 0.590 | 0.106 | 0.778 | 0.011 | 0.001 |
|  | Previpect ™ + pectin 200 | 0.958 | 0.248 | 0.022 | 0.470 | 0.003 | 0.003 |
|  | Pectin 200 | 0.030 | 0.014 | 0.212 | 0.056 | 0.004 | 0.162 |
| Previpect ™ 200 | Previpect ™ 600 | 0.326 | 0.995 | 0.267 | 0.415 | 0.359 | 0.058 |
|  | Previpect ™ + Pectin 200 | 0.778 | 0.447 | 0.064 | 0.563 | 0.158 | 0.285 |
|  | Pectin 200 | 0.010 | 0.017 | 0.537 | 0.088 | 0.172 | 0.475 |
| Previpect ™ 600 | Previpect ™ + Pectin 200 | 0.408 | 0.365 | 0.788 | 0.143 | 0.550 | 0.256 |
|  | Pectin 200 | 0.002 | 0.018 | 0.679 | 0.011 | 0.618 | 0.013 |
| Previpect ™ + pectin 200 | Pectin 200 | 0.003 | 0.100 | 0.409 | 0.307 | 0.788 | 0.088 |

The observed statistically significant increase in *Roseburia hominis* and phylogroup II abundance for Previpect™ 200 mg and Previpect™ 600 mg (with respect to the negative control) is maintained when their relative levels over *Eubacteria* are determined. Similarly, the observed increase in *Roseburia hominis* abundance when comparing Previpect™ 600 mg to Pectin 200 mg is also maintained when relative levels with respect to *Eubacteria* are determined.

TABLE 3

Comparison of concentration of organic short chain fatty acids (SCFA): butyric, hexanoic, isobutyric, isovaleric, propionic, valeric, and acetic acid for in feces samples from healthy subjects. Numbers in the table indicate the p-value, a p-value <0.05 has been considered statistically significant.

|  |  | Butyric acid | Hexanoic acid | Isobutyric acid | Isovaleric acid | Propionic acid | Valeric acid | Acetic acid |
|---|---|---|---|---|---|---|---|---|
| Negative control | Previpect ™ 200 | 0.000 | 0.000 | 0.265 | 0.000 | 0.000 | 0.000 | 0.000 |
|  | Previpect ™ 600 | 0.000 | 0.282 | 0.003 | 0.000 | 0.000 | 0.002 | 0.000 |
|  | Previpect ™ + pectin 200 | 0.000 | 0.081 | 0.001 | 0.000 | 0.000 | 0.001 | 0.000 |
|  | Pectin 200 | 0.000 | 0.016 | 0.020 | 0.000 | 0.000 | 0.004 | 0.000 |
| Previpect ™ 200 | Previpect ™ 600 | 0.002 | 0.008 | 0.048 | 0.000 | 0.030 | 0.793 | 0.000 |
|  | Previpect ™ + Pectin 200 | 0.006 | 0.018 | 0.020 | 0.000 | 0.773 | 0.920 | 0.000 |
|  | Pectin 200 | 0.131 | 0.070 | 0.222 | 0.386 | 0.101 | 0.020 | 0.041 |

TABLE 3-continued

Comparison of concentration of organic short chain fatty acids (SCFA): butyric, hexanoic, isobutyric, isovaleric, propionic, valeric, and acetic acid for in feces samples from healthy subjects. Numbers in the table indicate the p-value, a p-value <0.05 has been considered statistically significant.

|  |  | Butyric acid | Hexanoic acid | Isobutyric acid | Isovaleric acid | Propionic acid | Valeric acid | Acetic acid |
|---|---|---|---|---|---|---|---|---|
| Previpect ™ 600 | Previpect ™ + Pectin 200 | 0.930 | 0.653 | 0.814 | 0.877 | 0.111 | 0.712 | 0.330 |
|  | Pectin 200 | 0.032 | 0.153 | 0.153 | 0.001 | 0.000 | 0.083 | 0.002 |
| Previpect ™ + pectin 200 | Pectin 200 | 0.072 | 0.329 | 0.099 | 0.002 | 0.083 | 0.187 | 0.035 |

Previpect™ has been found to be metabolically rich. In particular, an increase in butyric and acetic acid concentration was observed when comparing Previpect™ 200 mg and Previpect™ 600 mg with the negative control. In addition, a statistically significant increase in butyric and acetic acid production was observed when comparing Previpect™ 600 mg to Pectin 200 mg (i.e., apple pectin).

An increase in butyric acid concentration has been described to provide a better environment for colonocytes Benus R. et al. ("Association between *Faecalibacterium prausnitzii* and dietary fibre in colonic fermentation in healthy human subjects", British Journal of Nutrition. 2010, 104:693-70). Likewise, an increase in acetic acid concentration is also beneficial as it results in a higher concentration of nutrients for other *Clostridium* sp found in the gut microbiota such as *Clostridium* group XIV. *Clostridium* group XIV have been reported to represent a substantial part (10-40%) of total bacteria in gut microbiota. Clostridia play a crucial role in gut homeostasis by interacting with the other resident microbe populations, but also by providing specific and essential functions (Lopetuso et al., "Commensal Clostridia: leading players in the maintenance of gut homeostasis" Gut Pathogen 2013, 5:23).

Ulcerative Colitis (UC) Patients

TABLE 4

Comparison of the total abundance *Eubacteria* (EUB), B46, *F. prausnitzii* (Fpra), phylogroup I (PhGI), phylogroupII (PhGII), *Escherichia coli* (Eco) and *Roseburia hominis* (ROS) in feces samples from ulcerative colitis patients. Numbers in the table indicate the p-value, a p-value <0.05 has been considered to be statistically significant.

|  |  | EUB | B46 | Fpra | Eco | PhGI | PhGII | ROS |
|---|---|---|---|---|---|---|---|---|
| Negative control | Previpect ™ 200 | 0.001 | 0.025 | 0.004 | 0.326 | 0.072 | 0.000 | 0.309 |
|  | Previpect ™ 600 | 0.581 | 0.089 | 0.822 | 0.501 | 0.545 | 0.269 | 0.179 |
|  | Previpect ™ + pectin 200 | 0.533 | 0.985 | 0.427 | 0.558 | 0.393 | 0.103 | 0.242 |
|  | Pectin 200 | 0.000 | 0.000 | 0.000 | 0.719 | 0.002 | 0.002 | 0.355 |
| Previpect ™ 200 | Previpect ™ 600 | 0.000 | 0.000 | 0.006 | 0.208 | 0.324 | 0.026 | 0.783 |
|  | Previpect ™ + Pectin 200 | 0.150 | 0.134 | 0.218 | 0.085 | 0.733 | 0.096 | 0.910 |
|  | Pectin 200 | 0.161 | 0.039 | 0.005 | 0.461 | 0.048 | 0.335 | 0.473 |
| Previpect ™ 600 | Previpect ™ + Pectin 200 | 0.161 | 0.166 | 0.307 | 0.821 | 0.690 | 0.495 | 0.835 |
|  | Pectin 200 | 0.000 | 0.000 | 0.000 | 0.249 | 0.030 | 0.011 | 0.597 |
| Previpect ™ + pectin 200 | Pectin 200 | 0.054 | 0.001 | 0.007 | 0.290 | 0.202 | 0.101 | 0.803 |

An increase in the microbiota abundance including specific indicators such as B46, *F. prausnitzii*, and especially *F. prausnitzii* phylogroup II, which has been described to be deficient in UC patients, is observed when comparing Previpect™ 200 mg to the negative control.

TABLE 5

Comparison of relative levels of B46, *F. prausnitzii* (Fpra), phylogroup I (PhGI), phylogroup II (PhGII), *Escherichia coli* (Eco) and *Roseburia hominis* (ROS) compared to total bacteria represented by *Eubacteria* (EUB) in feces samples from ulcerative colitis patients. Numbers in the table indicate the p-value, a p-value <0.05 has been considered to be statistically significant.

|  |  | B46/EUB | Fpra/EUB | Eco/EUB | PhGI/EUB | PhGII/EUB | ROS/EUB |
|---|---|---|---|---|---|---|---|
| Negative control | Previpect™ 200 | 0.629 | 0.769 | 0.877 | 0.945 | 0.091 | 0.380 |
|  | Previpect™ 600 | 0.581 | 0.091 | 0.730 | 0.730 | 0.017 | 0.044 |
|  | Previpect™ + pectin 200 | 0.955 | 0.082 | 0.497 | 0.450 | 0.072 | 0.180 |
|  | Pectin 200 | 0.141 | 0.000 | 0.450 | 0.010 | 0.051 | 0.692 |
| Previpect™ 200 | Previpect™ 600 | 0.717 | 0.335 | 0.877 | 0.743 | 0.427 | 0.125 |
|  | Previpect™ + Pectin 200 | 0.450 | 0.234 | 0.193 | 0.473 | 0.940 | 0.835 |
|  | Pectin 200 | 0.047 | 0.002 | 0.461 | 0.096 | 0.720 | 0.395 |
| Previpect™ 600 | Previpect™ + Pectin 200 | 0.533 | 0.910 | 0.395 | 0.850 | 0.417 | 0.317 |
|  | Pectin 200 | 0.096 | 0.019 | 0.650 | 0.417 | 0.821 | 0.052 |
| Previpect™ + pectin 200 | Pectin 200 | 0.054 | 0.036 | 0.678 | 0.494 | 0.547 | 0.310 |

A statistically significant increase in phylogroup II is maintained when abundance values are expressed relative to *Eubacteria* abundance for Previpect™ 600 mg in comparison with the negative control.

TABLE 6

Comparison of concentration of organic short chain fatty acids (SCFA): butyric, hexanoic, isobutyric, isovaleric, propionic, valeric, and acetic acid for in feces samples from ulcerative colitis patients. Numbers in the table indicate the p-value, a p-value <0.05 has been considered to be statistically significant.

|  |  | Butyric acid | Hexanoic acid | Isobutyric acid | Isovaleric acid | Propionic acid | Valeric acid | Acetic acid |
|---|---|---|---|---|---|---|---|---|
| Negative control | Previpect™ 200 | 0.000 | 0.121 | 0.209 | 0.000 | 0.017 | 0.029 | 0.000 |
|  | Previpect™ 600 | 0.001 | 0.052 | 0.001 | 0.000 | 0.048 | 0.986 | 0.000 |
|  | Previpect™ + pectin 200 | 0.000 | 0.208 | 0.002 | 0.000 | 0.113 | 0.787 | 0.000 |
|  | Pectin 200 | 0.000 | 0.104 | 0.037 | 0.001 | 0.006 | 0.368 | 0.000 |
| Previpect™ 200 | Previpect™ 600 | 0.196 | 0.986 | 0.048 | 0.000 | 0.524 | 0.202 | 0.000 |
|  | Previpect™ + Pectin 200 | 0.857 | 0.863 | 0.066 | 0.009 | 0.235 | 0.121 | 0.264 |
|  | Pectin 200 | 0.773 | 0.762 | 0.540 | 0.801 | 0.692 | 0.061 | 0.171 |
| Previpect™ 600 | Previpect™ + Pectin 200 | 0.614 | 0.822 | 0.540 | 0.665 | 0.090 | 0.971 | 0.000 |
|  | Pectin 200 | 0.349 | 0.911 | 0.002 | 0.000 | 0.471 | 0.914 | 0.003 |
| Previpect™ + pectin 200 | Pectin 200 | 0.821 | 0.750 | 0.042 | 0.004 | 0.910 | 0.880 | 0.651 |

Previpect™ has been found to be metabolically rich. In particular, an increase in butyric and acetic acid concentration was observed when comparing Previpect™ 200 mg and Previpect™ 600 mg with the negative control. In addition, an increase of acetic acid production was observed when comparing Previpect™ 600 to Pectin 200.

Crohn's Disease (CD) Patients

TABLE 7

Comparison of the total abundance of *Eubacteria* (EUB), B46, *F. prausnitzii* (Fpra), phylogroup I (PhGI), phylogroup II (PhGII), *Escherichia coli* (Eco) and *Roseburia hominis* (ROS) in feces samples from Crohn's disease patients. Numbers in the table indicate the p-value, a p-value <0.05 has been considered to be statistically significant.

|  |  | EUB | B46 | Fpra | Eco | PhGI | PhGII | ROS |
|---|---|---|---|---|---|---|---|---|
| Negative control | Previpect™ 200 | 0.056 | 0.032 | 0.000 | 0.056 | 0.496 | 0.229 | 0.045 |
|  | Previpect™ 600 | 0.389 | 0.829 | 0.902 | 0.579 | 0.643 | 0.877 | 0.241 |
|  | Previpect™ + pectin 200 | 0.192 | 0.061 | 0.000 | 0.378 | 0.595 | 0.157 | 0.067 |
|  | Pectin 200 | 0.085 | 0.012 | 0.001 | 0.109 | 0.926 | 0.229 | 0.325 |

TABLE 7-continued

Comparison of the total abundance of *Eubacteria* (EUB), B46, *F. prausnitzii* (Fpra), phylogroup I (PhGI), phylogroup II (PhGII), *Escherichia coli* (Eco) and *Roseburia hominis* (ROS) in feces samples from Crohn's disease patients. Numbers in the table indicate the p-value, a p-value <0.05 has been considered to be statistically significant.

|  |  | EUB | B46 | Fpra | Eco | PhGI | PhGII | ROS |
|---|---|---|---|---|---|---|---|---|
| Previpect™ 200 | Previpect™ 600 | 0.008 | 0.211 | 0.056 | 0.093 | 0.794 | 0.164 | 0.069 |
|  | Previpect™ + Pectin 200 | 0.530 | 0.712 | 1.000 | 0.144 | 0.197 | 0.895 | 0.692 |
|  | Pectin 200 | 0.686 | 0.366 | 0.092 | 0.339 | 0.862 | 0.583 | 0.236 |
| Previpect™ 600 | Previpect™ + Pectin 200 | 0.029 | 0.145 | 0.063 | 0.175 | 0.355 | 0.221 | 0.175 |
|  | Pectin 200 | 0.021 | 0.056 | 0.021 | 0.105 | 1.000 | 0.099 | 0.908 |
| Previpect™ + pectin 200 | Pectin 200 | 0.947 | 0.596 | 0.643 | 0.486 | 0.530 | 0.597 | 0.391 |

An increase in specific species such as *Roseburia* and *F. prausnitzii* is observed when comparing Previpect™ 200 mg to the negative control.

TABLE 8

Comparison of relative levels of B46, *F. prausnitzii* (Fpra), phylogroup I (PhGI), phylogroup II (PhGII), *Escherichia coli* (Eco) and *Roseburia hominis* (ROS) compared to total bacteria represented by *Eubacteria* (EUB) in feces samples from Crohn's disease patients. Numbers in the table indicate the p-value, a p-value <0.05 has been considered statistically significant.

|  |  | B46/EUB | Fpra/EUB | Eco/EUB | PhGI/EUB | PhGIIEUB | ROS/EUB |
|---|---|---|---|---|---|---|---|
| Negative control | Previpect™ 200 | 0.926 | 0.460 | 0.293 | 0.218 | 0.878 | 0.139 |
|  | Previpect™ 600 | 0.878 | 0.441 | 0.558 | 0.712 | 0.644 | 0.096 |
|  | Previpect™ + pectin 200 | 0.751 | 0.230 | 0.216 | 0.307 | 0.621 | 0.169 |
|  | Pectin 200 | 0.423 | 0.166 | 0.975 | 0.460 | 0.644 | 0.782 |
| Previpect™ 200 | Previpect™ 600 | 0.794 | 0.885 | 0.260 | 0.073 | 0.954 | 0.686 |
|  | Previpect™ + Pectin 200 | 0.947 | 0.322 | 0.064 | 0.198 | 0.974 | 0.843 |
|  | Pectin 200 | 0.603 | 0.285 | 0.417 | 0.665 | 0.341 | 0.419 |
| Previpect™ 600 | Previpect™ + Pectin 200 | 1.000 | 0.208 | 0.947 | 0.974 | 0.974 | 0.668 |
|  | Pectin 200 | 0.908 | 0.386 | 0.686 | 0.225 | 0.419 | 0.326 |
| Previpect™ + pectin 200 | Pectin 200 | 0.947 | 0.817 | 0.372 | 0.575 | 0.488 | 0.356 |

No statistically significant differences were observed between the different substrates when abundance levels are expressed with respect to *Eubacteria* abundance.

TABLE 9

Comparison of concentration of organic short chain fatty acids (SCFA): butyric, hexanoic, isobutyric, isovaleric, propionic, valeric, and acetic acid for in feces samples from Crohn's disease patients. Numbers in the table indicate the p-value, a p-value <0.05 has been considered to be statistically significant.

|  |  | Butyric acid | Hexanoic acid | Isobutyric acid | Isovaleric acid | Propionic acid | Valeric acid | Acetic acid |
|---|---|---|---|---|---|---|---|---|
| Negative control | Previpect™ 200 | 0.003 | 0.787 | 0.010 | 0.002 | 0.002 | 0.792 | 0.000 |
|  | Previpect™ 600 | 0.235 | 0.461 | 0.000 | 0.001 | 0.041 | 0.048 | 0.000 |
|  | Previpect™ + pectin 200 | 0.003 | 0.757 | 0.028 | 0.131 | 0.059 | 0.705 | 0.000 |
|  | Pectin 200 | 0.002 | 0.682 | 0.035 | 0.048 | 0.086 | 0.468 | 0.000 |
| Previpect™ 200 | Previpect™ 600 | 0.225 | 0.682 | 0.001 | 0.003 | 0.564 | 0.057 | 0.001 |
|  | Previpect™ + Pectin 200 | 0.947 | 0.893 | 0.262 | 0.391 | 0.843 | 0.553 | 0.075 |
|  | Pectin 200 | 0.954 | 0.192 | 0.729 | 0.773 | 0.273 | 0.248 | 0.033 |
| Previpect™ 600 | Previpect™ + Pectin 200 | 0.187 | 0.816 | 0.323 | 0.166 | 0.553 | 0.176 | 0.843 |
|  | Pectin 200 | 0.149 | 0.277 | 0.003 | 0.003 | 0.729 | 0.184 | 0.106 |
| Previpect™ + ectin 200 | Pectin 200 | 0.630 | 0.204 | 0.386 | 0.700 | 0.336 | 0.211 | 0.178 |

Previpect™ has been found to be metabolically rich. In particular, an increase in butyric and acetic acid concentration was observed when comparing Previpect™ 200 mg and Previpect™ 600 mg with the negative control.

Example 3.—In Vitro Incubation of Previpect™ with Faeces Samples from IBS Patients and Healthy Subjects Material & Methods 1. Patients, Clinical Data and Sampling Fecal samples were obtained from three healthy subjects (H) and three patients diagnosed with irritable bowel syndrome (IBS). Those volunteers were recruited by the Gastroenterology Service of the Hospital Universitari Dr. Josep Trueta (Girona, Spain).

Subjects recruited as IBS patients were diagnosed according to Rome IV criteria for IBS which are: Recurrent abdominal pain on average at least 1 day a week in the last 3 months associated with two or more of the following:
1. Related to defecation
2. Associate with a change in a frequency stool
3. Associated with a change in form (consistency) of stool; and Symptoms must have started at least 6 months ago (Lacy et al., Gastroenterology 2016, 150 (6), 1393-1407).

The control group consisted of healthy subjects, without any known gastrointestinal disorder, and was recruited according to clinical standards.

2. Sample Collection, Preservation and Storage

Each subject contributed with one fecal sample. These were collected at the Gastroenterology Service of the Hospital Universitari Dr. Josep Trueta. Briefly, the samples were collected in a sterile urine pot (Sarstedt, Nümbrecht, Germany), kept at room temperature and used fresh, within less than 4 hours after deposition. All samples from all subjects were homogenized and immediately used for the experiment.

3. Fecal Incubations

Fecal fermentations were carried out with fresh human feces obtained from IBS and healthy subjects as described above. In the laboratory, fecal samples were transferred to a stomacher sterile plastic bag and, after addition of 5:1 of fermentation buffer (0.1M $KH_2PO_4$, 0.05 mM NaOH; pH 7.0), the bags were carefully squeezed to mix the contents. The mix or fecal slurry was stirred in a Stomacher 400 (Seward, Worthing, UK) at 230 rpm for 3 minutes. Ten milliliters of this suspension were transferred into borosilicate glass tubes with phenolic cap. Each of the following compounds had been previously added:

Negative control: 10 ml of fermentation buffer;
Previpect™ 200:200 mg of Previpect™ diluted in 10 ml of fermentation buffer;
Plantago ovata 200:200 mg of Plantago ovata (Cinfa, Spain) diluted in 10 ml of fermentation buffer.
Pectin 200:200 mg of apple pectin (Solgar, Madrid, Spain) diluted in 10 ml of fermentation buffer when enough sample was provided.

The tubes containing the substrates had been previously autoclaved during 10 minutes at 100° C. to degas. The fermentation tubes were tightly closed and incubated at 37° C. under gentle agitation.

After 72 hours, the tubes were transferred to a sterile plastic tube to then centrifuge at 4° C. for 30 minutes at 4500×g. The supernatants were transferred to another tube and centrifuged again at 4° C. for 15 minutes at 4500×g. Finally, the supernatants were stored in closed vials at −20° C.

One unique fecal sample was used from each patient. All the samples from healthy subject were provided by the same person. However, due to the variation reported in the experiments, this subject has been considered as different subjects in each experiment.

4. DNA Extraction

DNA from fermentation tubes was extracted, before the centrifugations, using NucleoSpin® Soil Kit (Macherey-Nagel GmbH &Co., Duren, Germany). Briefly, 250 μl of sample were placed in a Nucleospin bead-tube. 700 μl of SL1 and 150 μl of Enhancer (SX) were added to each sample in order to improve DNA recovery. Afterwards, DNA was extracted and purified following the instructions from the manufacturer. Genomic DNA was eluted with 100 μl of elution buffer and stored at −20° C. until use. DNA concentration of the extracts was determined with a Qubit fluorimeter (Invitrogen detection Technologies, USA) using Qubit dsDNA High Sensitivity Assay Kit. Prior to qPCR analysis, DNA concentration was adjusted to 8 ng/μl with free DNA water.

5. Quantitative Real-Time PCR (qPCR) of DNA Extracted from Fecal Samples

DNA from fecal incubations was analysed by quantitative real-time PCR. More specifically, we assessed the quantity of total Faecalibacterium prausnitzii (Fpra), F. prausnitzii phylogroup I (PhGI), F. prausnitzii phylogroup II (PhGII), Escherichia coli (Eco), Roseburia hominis (ROS), B46 (Subdoligranulum variabile), Akkermansia muciniphila (AKK) and Eubacteria (EUB). Fpra, PGhI, PGhII and Eco bacterial sequences were quantified using a quantitative real time PCR with Taqman™ probe-based assays while ROS, B46 and EUB were quantified with SYBR® Green assays. Primers and qPCR conditions were as described below:

TABLE B

Primers and probes used for the qPCR assays:

| Species | | primer sequence |
|---|---|---|
| Faecalibacterium prausnitzii | Fpra428F (SEQ ID NO: 1) | 5'-TGTAAACTCCTGTTGTT GAGGAAGATAA-3' |
| | Fpra583R (SEQ ID NO: 2) | 5'-GCGCTCCCTTTACACCC A-3' |
| | Fpra493PR (SEQ ID NO: 3) | '6FAM3'-CAAGGAAGTGAC GGCTAACTACGTGCCAG- 5'TAMRA |
| F. prausnitzii PhGI\PhGII | Fpra(PHG) 136F (SEQ ID NO: 4) | 5'-CTCAAAGAGGGGGACAA CAGTT-3' |
| | Fpra(PHG) 232R (SEQ ID NO: 5) | 5'-GCCATCTCAAAGCGGAT TG-3' |
| | PHG1180PR (SEQ ID NO: 6) | 5'FAM-TAAGCCCACGACCC GGCATCG-3'BHQ1 |
| | PHG2180PR (SEQ ID NO: 7) | 5'HEX-TAAGCCCACRGCTC GGCATC-3' BHQ1 |

TABLE B-continued

Primers and probes used for the qPCR assays:

| Species | | primer sequence |
|---|---|---|
| *Escherichia coli* | Eco395F (SEQ ID NO: 8) | 5'-CATGCCGCGTGTATGAAGAA-3' |
| | Eco490R (SEQ ID NO: 9) | 5'-CGGGTAACGTCAATGAGCAAA-3' |
| | Eco437PR (SEQ ID NO: 10) | 5'6FAM-TATTAACTTTACTCCCTTCCTCCCCGCTGAA-3'TAMRA |
| *Roseburia hominis* (Larsen et al 2010. PloS One 5(2): e9085) | VROS2F (SEQ ID NO: 11) | 5'-TACTGCATTGGAAACTGTCG-3' |
| | VROS2R (SEQ ID NO: 12) | 5'-CGGCACCGAAGAGCAAT-3' |
| *Subdoligranulum variabile* B46 | B46F (SEQ ID NO: 13) | 5'-TCCACGTAAGTCACAAGCG-3' |
| | B46R B46R (SEQ ID NO: 14) | 5'-CGCCTACCTGTGCACTACTC-3' |
| *A. muciniphila* (Collado et al. Appl. Environ. Microbiol. 2007, 73(23)) | VAKK_F (SEQ ID NO: 17) | 5'-CAGCACGTGAAGGTGGGGAC-3' |
| | VAKK_R (SEQ ID NO: 18) | 5'-CCTTGCGGTTGGCTTCAGAT-3' |
| Eubacteria | EubF (SEQ ID NO: 15) | 5'-ACTCCTACGGGAGGCAGCAGT-3' |
| | EubR (SEQ ID NO: 16) | 5'-GTATTACCGCGGCTGCTGGCAC-3' |

Samples were run in duplicate in the same plate. For data analysis, the mean of the duplicate quantifications was used. Bacterial abundances for each sample were expressed as Ct normalized to total DNA concentration, where the Ct (cycle threshold) value is defined as the number of q-PCR cycles required for the fluorescent signal to cross the threshold. Ct levels are inversely proportional to the logarithm of target nucleic acid concentration in the sample. The real-time assays undergo 40 cycles of amplification.

All quantitative PCR were performed using AriaMx PCR System (Stratagene by Agilent, Santa Clara, CA, USA), and analyzed using the AriaMx Software version1.2 (Stratagene by Agilent, Santa Clara, CA, USA).

6. Methods of Statistical Analysis

Statistical normal distribution of the data was analyzed through Kolmogorov-Smirnov test. According to whether there was a statistical normal distribution of the data or not, an adequate statistical test to compare the following groups was used. Normal t-test was used to compare groups distributed normally whereas Mann-Whitney non-parametric test was used to compare groups without normal distribution.

Results

In order to determine the potential improvement on the gut microbiota caused by Previpect™ addition, the abundance of Eubacteria, B46, *Roseburia hominis*, *A. muciniphila*, *F. prausnitzii*, phylogroup I, phylogroup II and *E. coli* of these patients were studied after incubation with the five different substrates. The bacterial species quantification results are presented in FIGS. 14A to 21B. *Akkermansia. muciniphila* is a muconutritive bacteria which has been described to degrade mucin polymers (Derrien et al., International Journal of Systematic and Evolutionary Microbiology (2004), 54, 1469-1476).

Statistical comparison was done among the four treatments in the two different sample groups: healthy (H) subjects and Irritable Bowel Syndrome (IBS) patients. Data did not show a normal distribution, therefore, Mann-Whitney, a non-parametric test was used to compare treatments.

Statistical Comparison Results

Healthy (H) Subjects

TABLE 10

Comparison of the total abundance of *Eubacteria* (EUB), B46, *F. prausnitzii* (Fpra), phylogroup I (PhGI), phylogroup II (PhGII), *Escherichia coli* (Eco), *Roseburia hominis* (ROS) and *Akkermansia muciniphila* (AKK) in feces samples from healthy subjects incubated with the different substrates. Numbers in the table indicate the p-value, a p-value <0.05 has been considered to be statistically significant.

| | | EUB | B46 | Fpra | Eco | PhGI | PhGII | ROS | AKK |
|---|---|---|---|---|---|---|---|---|---|
| Negative control | Previpect ™ 200 | 0.085 | 0.102 | 0.102 | 0.145 | 1.000 | 0.248 | 0.001 | 0.001 |
| | Plantago ovata 200 | 0.194 | 0.149 | 0.178 | 0.630 | 0.773 | 0.386 | 0.005 | 0.001 |

An Increase in *Roseburia hominis*, a butyrate producing species, is observed when comparing the negative control (without substrate) to Previpect™ 200 mg and *Plantago ovata* 200 mg. A decrease *R. hominis* is observed when compared Previpect™ 200 mg to Pectin 200 mg. In addition, a decrease in *Akkermansia muciniphila* abundance is observed when comparing the negative control (without substrate) to Previpect™ 200 mg, *Plantago ovata* 200 mg and Pectin 200 mg (i.e., apple pectin).

TABLE 11

Comparison of relative levels of B46, *F. prausnitzii* (Fpra), phylogroup I (PhGI), phylogroup II (PhGII), *Escherichia coli* (Eco), *Roseburia hominis* (ROS), and *Akkermansia* sp. compared to total bacteria represented by *Eubacteria* (EUB) in feces samples from healthy subjects. Numbers in the table indicate the p-value, a p-value <0.05 has been considered to be statistically significant.

|  |  | B46/EUB | Fpra/EUB | Eco/EUB | PhGI/EUB | PhGII/EUB | ROS/EUB | AKK/EUB |
|---|---|---|---|---|---|---|---|---|
| Negative control | Previpect ™ 200 | 0.627 | 0.736 | 0.001 | 0.213 | 0.586 | 0.007 | 0.000 |
|  | Plantago ovata 200 | 0.336 | 0.352 | 0.055 | 0.443 | 0.622 | 0.083 | 0.001 |
|  | Pectin 200 | 0.126 | 0.482 | 0.108 | 0.228 | 0.546 | 0.906 | 0.001 |
| Previpect 200 | Plantago ovata 200 | 0.700 | 0.156 | 0.315 | 0.513 | 0.458 | 0.596 | 0.923 |
|  | Pectin 200 | 0.099 | 0.436 | 0.243 | 0.586 | 0.938 | 0.034 | 0.216 |
| Plantago ovata 200 | Pectin 200 | 0.093 | 0.741 | 0.869 | 0.621 | 1.000 | 0.272 | 0.699 |

The observed statistically significant increase in *Roseburia hominis* abundance for Previpect™ 200 mg (with respect to the negative control) and the significant decrease in *R. hominis* abundance for Pectin 200 mg with respect to Previpect 200 mg are maintained when their relative levels over *Eubacteria* are determined. Similarly, the observed decrease in *Akkermansia muciniphila* abundance when comparing the negative control to Previpect™ 200 mg, *Plantago ovata* 200 mg and Pectin 200 mg is also maintained when relative levels with respect to *Eubacteria* are determined. In addition, *E. coli* is decreased when compared negative control to Previpect™ 200 mg when relative levels with respect to *Eubacteria* are determined.

Irritable Bowel Syndrome (IBS) Patients

TABLE 12

Comparison of the total abundance *Eubacteria* (EUB), B46, *F. prausnitzii* (Fpra), phylogroup I (PhGI), phylogroup II (PhGII), *Escherichia coli* (Eco), *Roseburia hominis* (ROS), and *Akkermansia* sp. in feces samples from irritable bowel syndrome patients. Numbers in the table indicate the p-value, a p-value <0.05 has been considered to be statistically significant.

|  |  | EUB | B46 | Fpra | Eco | PhGI | PhGII | ROS | AKK |
|---|---|---|---|---|---|---|---|---|---|
| Negative control | Previpect ™ 200 | 0.024 | 0.019 | 0.047 | 0.003 | 0.634 | 0.085 | 0.009 | 0.064 |
|  | Plantago ovata 200 | 0.031 | 0.019 | 0.012 | 0.012 | 0.027 | 0.030 | 0.005 | 0.354 |
|  | Pectin 200 | 0.077 | 0.018 | 0.045 | 0.157 | 0.346 | 0.018 | 0.034 | 0.018 |
| Previpect ™ 200 | Plantago ovata 200 | 0.825 | 0.627 | 0.508 | 0.310 | 0.081 | 0.965 | 0.825 | 0.019 |
|  | Pectin 200 | 0.906 | 0.556 | 0.480 | 0.059 | 0.570 | 0.195 | 0.480 | 0.480 |
| Plantago ovata 200 | Pectin 200 | 0.906 | 0.409 | 1.000 | 0.157 | 0.556 | 0.556 | 0.480 | 0.637 |

An increase in the microbiota abundance including butyrate producers such as B46, *F. prausnitzii*, and *R. hominis*, is observed when comparing Previpect™ 200 mg, *Plantago ovata* 200 mg and Pectin 200 mg to the negative control. In addition, a decrease of *A. muciniphila* is observed when compared Previpect™ 200 mg to *Plantago ovata* 200 mg.

TABLE 13

Comparison of relative levels of B46, *F. prausnitzii* (Fpra), phylogroup I (PhGI), phylogroup II (PhGII), *Escherichia coli* (Eco), *Roseburia hominis* (ROS), *Akkermansia* sp. compared to total bacteria represented by Eubacteria (EUB) in feces samples from irritable bowel syndrome patients. Numbers in the table indicate the p-value, a p-value <0.05 has been considered to be statistically significant.

|  |  | B46/EUB | Fpra/EUB | Eco/EUB | PhGI/EUB | PhGII/EUB | ROS/EUB | AKK/EUB |
|---|---|---|---|---|---|---|---|---|
| Negative control | Previpect ™ 200 | 0.377 | 0.664 | 0.505 | 0.706 | 0.259 | 0.102 | 0.354 |
|  | Plantago ovata 200 | 0.825 | 0.058 | 0.586 | 0.533 | 0.223 | 0.058 | 0.007 |
|  | Pectin 200 | 0.077 | 0.688 | 0.580 | 0.315 | 0.131 | 0.195 | 0.034 |
| Previpect ™ 200 | Plantago ovata 200 | 0.354 | 0.300 | 0.800 | 0.534 | 0.730 | 0.757 | 0.031 |
|  | Pectin200 | 0.479 | 0.725 | 0.054 | 0.693 | 0.792 | 1.000 | 0.346 |
| Plantago ovata 200 | Pectin 200 | 0.045 | 0.586 | 0.036 | 0.186 | 0.755 | 0.814 | 0.409 |

The statistically significant increases observed are not maintained when abundance values are expressed relative to Eubacteria abundance for any treatment in comparison with the negative control. A decrease of *A. muciniphila* abundance when comparing *Plantago ovata* 200 mg and Pectin 200 mg to negative control is observed when relative values with respect to Eubacteria are determined. A statistically significant decrease in *A. muciniphila* abundance is not observed when comparing Previpect™ 200 mg to the negative control. In addition, a decrease of *A. muciniphila* is also observed when compared Previpect™ 200 mg to *Plantago ovata* 200 mg.

Example 4.—In Vitro Incubation of Previpect™ with Faeces Samples-Dysbiosis Index of the Different Subjects Analysed Material & Methods Two different experiments were performed to check the effect of Previpect™ on the microbiota present in the colon of healthy subjects and with intestinal disorders patients. The material and methods used were equal for both experiments. Three different indexes were calculated in order to observed the initial dysbiosis of the analysed subjects and, also, the effect of the different substrates after incubation of samples.

Patients, Clinical Data and Sampling

Faecal samples were obtained by sixteen healthy subjects (H) and fourteen patients diagnosed with intestinal disorders. Eleven patients were diagnosed with inflammatory bowel disease (IBD): 5 Crohn's disease (CD) and 6 Ulcerative Colitis (UC); and three patients were diagnosed with irritable bowel syndrome (IBS). Those volunteers were recruited by the Gastroenterology Service of the Hospital Universitari Dr. Josep Trueta (Girona, Spain).

Subjects recruited as IBD patients were diagnosed according to standard clinical, pathological and endoscopic criteria and all were in active disease in terms of inflammatory response (with calprotectin levels over 250 µg/G or protein C reactive (PCR) levels over 0.5 µg/L). The control group consisted of healthy subjects, without any known gastrointestinal disorder, was recruited according to clinical standards.

Subjects recruited as IBS patients were diagnosed according to Rome IV criteria for IBS which are: "Recurrent abdominal pain on average at least 1 day a week in the last 3 months associated with two or more of the following:
 1. Related to defecation
 2. Associate with a change in a frequency stool
 3. Associated with a change in form (consistency) of stool.
Symptoms must have started at least 6 months ago."

The control group consisted of healthy subjects, without any known gastrointestinal disorder, was recruited according to clinical standards.

Indexes Calculation

Three different indexes were calculated:
 Ratio *Faecalibacterium prausnitzii/Escherichia coli* (FE index): the lower the value, the higher the dysbiosis degree of the subject.
 Ratio butyrate producing bacteria/proinflammatory bacteria (BP index): butyrate producing bacteria are calculated by the sum of the total abundance of *Faecalibacterium prausnitzii, Faecalibacterium prausnitzii* PHGI, *Faecalibacterium prausnitzii* PHGII, *Roseburia hominis* and *Subdoligranulum variabile* and the proinflammatory bacteria is the total abundance of *Escherichia coli*. The lower the value, the higher the dysbiosis degree of the subject.
 Ratio butyrate/butyrate producing bacteria (BB index): butyrate producing bacteria are calculated by the sum of the total abundance of *Faecalibacterium prausnitzii, Faecalibacterium prausnitzii* PHGI, *Faecalibacterium prausnitzii* PHGII, *Roseburia hominis* and *Subdoligranulum variabile* and butyrate is the concentration of butyrate obtained in the fermentation tubes. The lower the value, less active are the butyrate producing bacteria.

Three indexes are preferred with high values.

Protocols in connection with sample collection, preservation and storage; faecal incubations, DNA extraction, analysis of short chain fatty acids (SCFAs), and quantitative real-time PCR (qPCR) of DNA extracted from faecal samples was conducted as described herein above.

Results

Experiment 4.1: In Vitro Incubation of Previpect™ with Faeces Samples from Healthy Subjects, Ulcerative Colitis and Crohn's Disease Patients The compounds used to compare Previpect™ in faeces samples from ulcerative colitis and Crohn's disease patients were the followings:
 Initial sample: initial state of the sample with no incubation treatment.
 Negative control: 10 ml of fermentation buffer without substrate
 Previpect™ 200:200 mg of Previpect™ diluted in 10 ml of fermentation buffer;
 Previpect™ 600:600 mg of Previpect™ diluted in 10 ml of fermentation buffer;
 Pectin 200:200 mg of apple pectin (Solgar, Madrid, Spain) diluted in 10 ml of fermentation buffer;
 Previpect™+Pectin 200:200 mg of apple pectin plus 200 mg of Previpect™ both diluted in 10 ml of fermentation buffer.

TABLE 14

Calculation of the FE index. The value has been calculated after the incubations for each substrate for each subject. Mean values are shown for healthy subjects, ulcerative colitis and Crohn's disease patient.

| Index: FE | Healthy subjects | Ulcerative colitis | Crohn's Disease |
|---|---|---|---|
| Negative control | −0.675 | −2.102 | 1.071 |
| Previpect ™ 200 | −0.544 | −1.937 | 0.950 |
| Previpect ™ 600 | −0.415 | −1.875 | 0.822 |
| Previpect ™ + Pectin 200 | −0.340 | −1.789 | 0.994 |
| Pectin 200 | −0.390 | −1.611 | 1.073 |

It can be observed that the FE index increased during the incubations of any of the substrate in healthy subjects and ulcerative colitis meaning that the dysbiosis degree is corrected. However, in Crohn's disease patients, the FE indexes decreased after incubation with all substrates. A Kruskall-Wallis statistical test was done in order to observe significant differences among substrates used. In healthy subjects significant differences were found when the FE index was analysed ($p=0.035$), however, the differences observed in ulcerative colitis or Crohn's disease patients were not significative ($p=0.110$ and $p=0.597$).

TABLE 15

Statistical results obtained by comparisons one by one of index FE for each treatment analysed by Mann-Whitney test, p-value lower than 0.05 showed statistical significant results between treatments written in the first column.

| Index: FE (p-values) | Healthy subjects | Ulcerative colitis | Crohn's Disease |
|---|---|---|---|
| Negative control vs Previpect™ 200 | 0.359 | 0.986 | 0.758 |
| Negative control vs Previpect™ 600 | 0.074 | 0.770 | 0.758 |
| Negative control vs Previpect™ + Pectin 200 | 0.005 | 0.249 | 0.181 |
| Negative control vs Pectin 200 | 0.020 | 0.036 | 0.389 |
| Previpect™ 200 vs Previpect™ 600 | 0.380 | 0.667 | 0.564 |
| Previpect™ 200 vs Previpect™ + Pectin 200 | 0.043 | 0.265 | 0.291 |
| Previpect™ 200 vs Pectin 200 | 0.118 | 0.012 | 0.273 |
| Previpect™ 600 vs Previpect™ + Pectin 200 | 0.365 | 0.462 | 0.429 |
| Previpect™ 600 vs Pectin 200 | 0.656 | 0.109 | 0.299 |
| Previpect™ + Pectin 200 vs Pectin 200 | 0.727 | 0.110 | 0.742 |

Significant differences were found for healthy subjects when both Pectin and the combination of Previpect and Pectin were used for stool sample incubation compared to negative control. Also, significant differences were found for ulcerative colitis patients. Pectin incubation presented better results when compared to negative control and Previpect™ 200. No significant differences were found for Crohn's disease patients when samples incubated with Previpect™ were compared to the others.

TABLE 16

Calculation of the butyrate producing bacteria vs pro-inflammatory bacteria ratio. The value has been calculated after the incubations for each substrate for each subject. Mean values are shown for healthy subjects, ulcerative colitis and Crohn's disease patient.

| Index: BP | Healthy subjects | Ulcerative colitis | Crohn's Disease |
|---|---|---|---|
| Negative control | 0.645 | 0.419 | 0.915 |
| Previpect™ 200 | 1.077 | 0.447 | 1.262 |
| Previpect™ 600 | 2.330 | 0.958 | 1.387 |
| Previpect™ + Pectin 200 | 2.073 | 0.698 | 1.710 |
| Pectin 200 | 1.567 | 1.051 | 1.587 |

It can be observed that the BP index increased during the incubations of any of the substrate in healthy subjects, ulcerative colitis and Crohn's disease patients. In healthy subjects, Previpect was the substrate with more capacity to correct the dysbiosis degree, presenting the highest value. For Ulcerative colitis, Previpect and pectin presented a similar capacity for the dysbiosis degree correction. However, in Crohn's disease patients the BP index obtained by Previpect incubation were the lowest. A Kruskall-Wallis statistical test was done in order to observe significant differences among substrates used. In healthy subjects significant differences were found when the BP index was analysed (p=0.006), however, the differences observed in ulcerative colitis or Crohn's disease patients were not significative (p=0.277 and p=0.837, respectively).

TABLE 17

Statistical results obtained by comparisons one by one of index BP for each treatment analysed by Mann-Whitney test, p-value lower than 0.05 showed statistical significant results between treatments written in the first column.

| Index: BP (p-values) | Healthy subjects | Ulcerative colitis | Crohn's Disease |
|---|---|---|---|
| Negative control vs Previpect™ 200 | 0.160 | 0.959 | 0.902 |
| Negative control vs Previpect™ 600 | 0.006 | 0.326 | 0.424 |
| Negative control vs Previpect™ + Pectin 200 | 0.001 | 0.265 | 0.139 |
| Negative control vs Pectin 200 | 0.018 | 0.040 | 0.580 |
| Previpect™ 200 vs Previpect™ 600 | 0.099 | 0.502 | 0.908 |
| Previpect™ 200 vs Previpect™ + Pectin 200 | 0.034 | 0.485 | 0.692 |
| Previpect™ 200 vs Pectin 200 | 0.259 | 0.057 | 0.386 |
| Previpect™ 600 vs Previpect™ + Pectin 200 | 0.948 | 0.955 | 0.792 |
| Previpect™ 600 vs Pectin 200 | 0.529 | 0.375 | 0.686 |
| Previpect™ + Pectin 200 vs Pectin 200 | 0.383 | 0.330 | 0.895 |

Significant differences were found for healthy subjects when stool samples were incubated with Previpect, Previpect in combination with Pectin and Pectin when compared to negative control. Also, Previpect was observed to present better results when compared to the combination of Previpect and Pectin incubations. No significant differences were found for Crohn's disease patients when samples incubated with Previpect™ were compared to the others.

TABLE 18

Calculation of the butyrate vs butyrate producing bacteria ratio. The value has been calculated after the incubations for each substrate for each subject. Mean values are shown for healthy subjects, ulcerative colitis and Crohn's disease patient.

| Index: BB | Healthy subjects | Ulcerative colitis | Crohn's Disease |
|---|---|---|---|
| Negative control | 15.927 | 13.834 | 4.262 |
| Previpect™ 200 | 26.551 | 25.187 | 4.294 |
| Previpect™ 600 | 22.778 | 43.268 | 5.808 |
| Previpect™ + Pectin 200 | 17.829 | 30.810 | 5.215 |
| Pectin 200 | 23.563 | 12.342 | 4.532 |

It can be observed that the BB index increased during the incubations of any of the substrate in healthy subjects, ulcerative colitis (exception of pectin), and Crohn's disease patients, meaning that the productivity of the butyrate producing bacteria in the samples was enhanced by the substrates. In all the subjects (healthy subjects, ulcerative colitis, and Crohn's disease patients) the BB index highest values were found after the Previpect incubations. A Kruskall-Wallis statistical test was done in order to observe significant differences among substrates used. In ulcerative colitis patients significant differences were found when the BB index were analysed (p=0.023), however, the differences observed in healthy subjects or Crohn's disease patients were not significative (p=0.253 and p=0.630, respectively).

TABLE 19

Statistical results obtained by comparisons one by one of index BB for each treatment analysed by Mann-Whitney test, p-value lower than 0.05 showed statistical significant results between treatments written in the first column.

| Index: BB (p-values) | Healthy subjects | Ulcerative colitis | Crohn's Disease |
|---|---|---|---|
| Negative control vs Previpect™ 200 | 0.138 | 0.293 | 0.792 |
| Negative control vs Previpect™ 600 | 0.031 | 0.117 | 0.235 |

TABLE 19-continued

Statistical results obtained by comparisons one by one of index BB for each treatment analysed by Mann-Whitney test, p-value lower than 0.05 showed statistical significant results between treatments written in the first column.

| Index: BB (p-values) | Healthy subjects | Ulcerative colitis | Crohn's Disease |
|---|---|---|---|
| Negative control vs Previpect ™ + Pectin 200 | 0.056 | 0.022 | 0.597 |
| Negative control vs Pectin 200 | 0.151 | 0.136 | 0.895 |
| Previpect ™ 200 vs Previpect ™ 600 | 0.621 | 0.480 | 0.083 |
| Previpect ™ 200 vs Previpect ™ + Pectin 200 | 0.662 | 0.485 | 0.692 |
| Previpect ™ 200 vs Pectin 200 | 1.000 | 0.020 | 0.862 |
| Previpect ™ 600 vs Previpect ™ + Pectin 200 | 0.948 | 0.835 | 1.000 |
| Previpect ™ 600 vs Pectin 200 | 0.704 | 0.016 | 0.225 |
| Previpect ™ + Pectin 200 vs Pectin 200 | 0.650 | 0.012 | 0.598 |

Significant differences were found in healthy subjects when Previpect was incubated in stool samples and compared to negative control. Also, significant differences were found for ulcerative colitis patients when stool samples were incubated with Previpect and compared to Pectin and negative control. Higher results were obtained with Previpect incubation.

Conclusions: Previpect is able to decrease the dysbiosis degree of a healthy subject and ulcerative colitis patients (index BP). In addition, Previpect is the analysed substrate with more capacity of increasing the BB index enhancing the butyrate production in the colon.

Experiment 4. 2: In Vitro Incubation of Previpect™ with Faeces Samples from Healthy Subjects and Irritable Bowel Syndrome Patients The compounds used to compare Previpect™ in faeces samples from irritable bowel syndrome patients were the followings:
Negative control: 10 ml of fermentation buffer;
Previpect™ 200:200 mg of Previpect™ diluted in 10 ml of fermentation buffer;
*Plantago ovata* 200:200 mg of *Plantago ovata* (Cinfa, Spain) diluted in 10 ml of fermentation buffer.
Pectin 200:200 mg of pectin diluted in 10 ml of fermentation buffer.

TABLE 20

Calculation of the *Faecalibacterium prausnitzii* vs *Escherichia coli* index. The value has been calculated after the incubations for each substrate for each subject. Mean values are shown for healthy subjects and Irritable bowel syndrome patient.

| Index: FE | Healthy subjects | Irritable bowel syndrome patients |
|---|---|---|
| Negative control | −1.646 | −0.236 |
| Previpect ™ 200 | −1.017 | −0.481 |
| Plantago ovata 200 | −1.136 | 0.018 |
| Pectin 200 | −1.587 | −0.264 |

It can be observed that the FE index increased during the incubations of any of the substrate in healthy subjects presenting its highest value after Previpect incubations. In irritable bowel syndrome patients, only the FE index value was higher only for the *Plantago ovata* incubations.

A Kruskall-Wallis statistical test was done in order to observe significant differences among substrates used. But no significant differences were found when the FE index was analysed nor for healthy subjects or irritable bowel syndrome patients ($p=0.492$ and $p=0.282$, respectively), however, the differences observed in healthy subjects or Crohn's disease patients were not significative ($p>0.05$).

TABLE 21

Statistical results obtained by comparisons one by one of index EF for each treatment analysed by Mann-Whitney test, p-value lower than 0.05 showed statistical significant results between treatments written in the first column.

| Index: EF (p-values) | Healthy subjects | Irritable Bowel Syndrome |
|---|---|---|
| Negative control vs Previpect ™ 200 | 0.102 | 0.354 |
| Negative control vs Plantago ovata 200 | 0.700 | 0.965 |
| Negative control vs Pectin 200 | 0.195 | 0.289 |
| Previpect ™ 200 vs Plantago ovata 200 | 0.336 | 0.402 |
| Previpect ™ 200 vs Pectin 200 | 0.724 | 0.045 |
| Plantago ovata 200 vs Pectin 200 | 0.519 | 0.126 |

Significant differences were found for irritable bowel syndrome patients when stool samples were incubated with Previpect and compared to Pectin. Higher results were obtained with Pectin incubation.

TABLE 22

Calculation of the butyrate producing bacteria vs pro-inflammatory bacteria ratio. The value has been calculated after the incubations for each substrate for each subject. Mean values are shown for healthy subjects and irritable bowel syndrome patients.

| Index: BP | Healthy subjects | Irritable bowel syndrome patients |
|---|---|---|
| Negative control | 0.078 | 0.780 |
| Previpect ™ 200 | 0.417 | 0.767 |
| Plantago ovata 200 | 0.196 | 1.324 |
| Pectin 200 | 0.300 | 1.173 |

It can be observed that the BP index increased during the incubations of any of the substrate in healthy subjects and almost all the substrates in irritable bowel syndrome patients. Among all the treatments, in healthy subjects Previpect treatment presented the highest BP index value. However, in irritable bowel syndrome patients Previpect presented the lowest values of BP index. A Kruskall-Wallis statistical test was done in order to observe significant differences among substrates used. But no significant differences were found when the BP index was analysed nor for healthy subjects or irritable bowel syndrome patients ($p=0.587$ and $p=0.576$, respectively).

TABLE 23

Statistical results obtained by comparisons one by one of index BP for each treatment analysed by Mann-Whitney test, p-value lower than 0.05 showed statistical significant results between treatments written in the first column.

| Index: BP (p-values) | Healthy subjects | Irritable Bowel Syndrome |
|---|---|---|
| Negative control vs Previpect ™ 200 | 0.122 | 0.895 |
| Negative control vs Plantago ovata 200 | 0.630 | 0.825 |
| Negative control vs Pectin 200 | 0.289 | 0.346 |
| Previpect ™ 200 vs Plantago ovata 200 | 0.501 | 0.402 |
| Previpect ™ 200 vs Pectin 200 | 0.409 | 0.126 |
| Plantago ovata 200 vs Pectin 200 | 0.699 | 0.289 |

No significant differences were found for healthy subjects or irritable bowel syndrome patients when stool samples were incubated with Previpect.

TABLE 24

Calculation of the butyrate vs butyrate producing bacteria ratio. The value has been calculated after the incubations for each substrate for each subject. Mean values are shown for healthy subjects and irritable bowel syndrome.

| Index: BB | Healthy subjects | Irritable bowel syndrome patients |
|---|---|---|
| Negative control | 1.872 | 4.788 |
| Previpect ™ 200 | 2.124 | 2.881 |
| Plantago ovata 200 | 3.245 | 5.603 |
| Pectin 200 | 1.366 | 2.103 |

It can be observed that the BB index increased during the incubations of Previpect and *Plantago ovata* for healthy subjects meaning that the productivity of the butyrate producing bacteria in the samples is enhanced. In addition, pectin seemed not to have the ability of increasing butyrate productivity. For the irritable bowel syndrome patients, *Plantago ovata* was the only substrate with the capacity of increasing the butyrate production. A Kruskall-Wallis statistical test was done in order to observe significant differences among substrates used. Significant differences were observed in healthy subjects (p=0.002), but no significant differences were found when the BB index was analysed for irritable bowel syndrome patients (p=0.120).

TABLE 25

Statistical results obtained by comparisons one by one of index BP for each treatment analysed by Mann-Whitney test, p-value lower than 0.05 showed statistical significant results between treatments written in the first column.

| Index: BB (p-value) | Healthy subjects | Irritable Bowel Syndrome |
|---|---|---|
| Negative control vs Previpect ™ 200 | 0.310 | 0.691 |
| Negative control vs Plantago ovata 200 | 0.441 | 0.145 |
| Negative control vs Pectin 200 | 0.045 | 0.814 |
| Previpect ™ 200 vs Plantago ovata 200 | 0.034 | 0.122 |
| Previpect ™ 200 vs Pectin 200 | 0.157 | 0.724 |
| Plantago ovata 200 vs Pectin 200 | 0.002 | 0.239 |

Significant differences were found for healthy subjects when stool samples were incubated with Previpect and compared to *Plantago ovata*. However, higher results were obtained with *Plantago ovata* incubation.

Conclusions: Previpect, as well as pectin, is capable of selectively increase the butyrate producing species and its productivity in healthy subjects. In irritable bowel syndrome patients, Previpect presented similar effects than Pectin when talking about productivity but it did not present any Important modification in the index . . .

The invention claimed is:

1. A method of therapeutically treating intestinal dysbiosis in a human subject, the method comprising administering an effective amount of isolated grape skin from the grape species *Vitis vinifera* to the human subject in need thereof, wherein the intestinal dysbiosis in the subject is characterized by decreased intestinal levels of butyrate-producing bacteria or a reduction in activity of butyrate-producing bacteria, wherein the butyrate-producing bacteria are selected from the group consisting of *Roseburia hominis* and *Subdoligranulum variabile*, and wherein the administered amount of the isolated grape skin has prebiotic effects that increase the intestinal levels of said butyrate-producing bacteria or increase the activity of said butyrate-producing bacteria, or both.

2. The method according to claim 1, wherein the human subject does not present signs or symptoms, or both, of intestinal disease.

3. The method according to claim 1, wherein the human subject has an intestinal disease selected from the group consisting of ulcerative colitis, Crohn's disease, or irritable bowel syndrome.

4. The method according to claim 1, wherein a decrease of butyrate-producing bacteria is determined by a method comprising:
   a. determining the levels of a butyrate-producing bacteria in an intestinal sample of the human subject; and then
   b. comparing the levels of the butyrate-producing bacteria in the intestinal sample of the human subject with the levels of butyrate-producing bacteria in a reference sample;
   wherein when the levels of butyrate-producing bacteria in the intestinal sample of the human subject are below the levels of butyrate-producing bacteria in the reference sample there is a decrease of butyrate-producing bacteria.

5. The method according to claim 4, wherein the respective levels of butyrate-producing bacteria are determined by a method comprising the use of one or more of the following:
   a polynucleotide selected from the group consisting of SEQ ID NO: 11, SEQ ID NO: 12, and a polynucleotide with an identity of at least 85% thereto, for the determination of the levels of *Roseburia hominis*; and
   a polynucleotide selected from the group consisting of SEQ ID NO: 13, SEQ ID NO: 14, and a polynucleotide with an identity of at least 85% thereto, for the determination of the levels of *Subdoligranulum variabile*.

6. The method according to claim 4, wherein the levels of butyrate-producing bacteria are determined by quantitative PCR.

7. The method according to claim 4, wherein the intestinal sample of the subject is a fecal sample.

8. The method according to claim 4, wherein the reference sample is a sample of a subject or group of subjects not having an intestinal disease.

9. The method according to claim 1, wherein said grape skin is dehydrated grape skin having a content of water equal to or less than 20%.

10. The method according to claim 1, wherein said isolated grape skin is present in a composition further comprising a single probiotic species or a group of probiotic species selected from the group consisting of butyrate-producing bacteria, lactobacilli, bifidobacteria, *Streptococcus thermophilus, Saccharomyces boulardii, Bacillus subtilis*, and non-pathogenic strains of *Escherichia coli*.

11. The method according to claim 10, wherein the butyrate-producing bacteria is selected from the group consisting of *Faecalibacterium prausnitzii, Faecalibacterium prausnitzii* phylogroup I, *Faecalibacterium prausnitzii* phylogroup II, *Roseburia hominis*, and *Subdoligranulum variabile*.

12. The method according to claim 1, wherein said administering is by oral or rectal administration.

13. The method according to claim 1, wherein said isolated grape skin is formulated as a delayed-release oral composition.

14. The method according to claim 1, wherein the isolated grape skin increases the activity of said butyrate-producing bacteria.

15. The method according to claim 14, wherein the activity is determined by the ratio of butyrate to butyrate-producing bacteria (BB index).

16. The method according to claim 12, wherein said grape skin is from a white grape variety of the grape species *Vitis vinifera*.

* * * * *

SEQUENCE LISTING

```
<160> NUMBER OF SEQ ID NOS: 18

<210> SEQ ID NO 1
<211> LENGTH: 28
<212> TYPE: DNA
<213> ORGANISM: Artificial Sequence
<220> FEATURE:
<223> OTHER INFORMATION: Fpra428F; Faecalibacterium prausnitzii forward
      primer
<220> FEATURE:
<221> NAME/KEY: misc_feature
<222> LOCATION: (1)..(28)

<400> SEQUENCE: 1
tgtaaactcc tgttgttgag gaagataa                                             28

<210> SEQ ID NO 2
<211> LENGTH: 18
<212> TYPE: DNA
<213> ORGANISM: Artificial Sequence
<220> FEATURE:
<223> OTHER INFORMATION: Fpra583R; Faecalibacterium prausnitzii reverse
      primer
<220> FEATURE:
<221> NAME/KEY: misc_feature
<222> LOCATION: (1)..(18)

<400> SEQUENCE: 2
gcgctccctt tacaccca                                                        18

<210> SEQ ID NO 3
<211> LENGTH: 29
<212> TYPE: DNA
<213> ORGANISM: Artificial Sequence
<220> FEATURE:
<223> OTHER INFORMATION: Fpra493PR; Faecalibacterium prausnitzii probe
<220> FEATURE:
<221> NAME/KEY: misc_feature
```

<222> LOCATION: (1)..(29)

<400> SEQUENCE: 3
caaggaagtg acggctaact acgtgccag                                            29

<210> SEQ ID NO 4
<211> LENGTH: 22
<212> TYPE: DNA
<213> ORGANISM: Artificial Sequence
<220> FEATURE:
<223> OTHER INFORMATION: Fpra(PHG)136F; Faecalibacterium prausnitzii PHG
      Forward primer
<220> FEATURE:
<221> NAME/KEY: misc_feature
<222> LOCATION: (1)..(22)

<400> SEQUENCE: 4
ctcaaagagg gggacaacag tt                                                   22

<210> SEQ ID NO 5
<211> LENGTH: 19
<212> TYPE: DNA
<213> ORGANISM: Artificial Sequence
<220> FEATURE:
<223> OTHER INFORMATION: Fpra(PHG)232R; Faecalibacterium prausnitzii PHG
      reverse primer
<220> FEATURE:
<221> NAME/KEY: misc_feature
<222> LOCATION: (1)..(19)

<400> SEQUENCE: 5
gccatctcaa agcggattg                                                       19

<210> SEQ ID NO 6
<211> LENGTH: 21
<212> TYPE: DNA
<213> ORGANISM: Artificial Sequence
<220> FEATURE:
<223> OTHER INFORMATION: PHG1180PR; Faecalibacterium prausnitzii PhGI
      probe
<220> FEATURE:
<221> NAME/KEY: misc_feature
<222> LOCATION: (1)..(21)

<400> SEQUENCE: 6
taagcccacg acccggcatc g                                                    21

<210> SEQ ID NO 7
<211> LENGTH: 20
<212> TYPE: DNA
<213> ORGANISM: Artificial Sequence
<220> FEATURE:
<223> OTHER INFORMATION: PHG2180PR; Faecalibacterium prausnitzii PhGII
      probe
<220> FEATURE:
<221> NAME/KEY: misc_feature
<222> LOCATION: (1)..(20)

<400> SEQUENCE: 7
taagcccacr gctcggcatc                                                      20

<210> SEQ ID NO 8
<211> LENGTH: 20
<212> TYPE: DNA
<213> ORGANISM: Artificial Sequence
<220> FEATURE:
<223> OTHER INFORMATION: Eco395F; Escherichia coli forward primer
<220> FEATURE:
<221> NAME/KEY: misc_feature

```
<222> LOCATION: (1)..(20)

<400> SEQUENCE: 8
catgccgcgt gtatgaagaa                                              20

<210> SEQ ID NO 9
<211> LENGTH: 21
<212> TYPE: DNA
<213> ORGANISM: Artificial Sequence
<220> FEATURE:
<223> OTHER INFORMATION: Eco490R; Escherichia coli reverse primer
<220> FEATURE:
<221> NAME/KEY: misc_feature
<222> LOCATION: (1)..(21)

<400> SEQUENCE: 9
cgggtaacgt caatgagcaa a                                            21

<210> SEQ ID NO 10
<211> LENGTH: 31
<212> TYPE: DNA
<213> ORGANISM: Artificial Sequence
<220> FEATURE:
<223> OTHER INFORMATION: Eco437PR; Escherichia coli probe
<220> FEATURE:
<221> NAME/KEY: misc_feature
<222> LOCATION: (1)..(31)

<400> SEQUENCE: 10
tattaacttt actcccttcc tccccgctga a                                 31

<210> SEQ ID NO 11
<211> LENGTH: 20
<212> TYPE: DNA
<213> ORGANISM: Artificial Sequence
<220> FEATURE:
<223> OTHER INFORMATION: VROS2F; Roseburia hominis forward primer
<220> FEATURE:
<221> NAME/KEY: misc_feature
<222> LOCATION: (1)..(20)

<400> SEQUENCE: 11
tactgcattg gaaactgtcg                                              20

<210> SEQ ID NO 12
<211> LENGTH: 17
<212> TYPE: DNA
<213> ORGANISM: Artificial Sequence
<220> FEATURE:
<223> OTHER INFORMATION: VROS2R; Roseburia hominis reverse primer
<220> FEATURE:
<221> NAME/KEY: misc_feature
<222> LOCATION: (1)..(17)

<400> SEQUENCE: 12
cggcaccgaa gagcaat                                                 17

<210> SEQ ID NO 13
<211> LENGTH: 19
<212> TYPE: DNA
<213> ORGANISM: Artificial Sequence
<220> FEATURE:
<223> OTHER INFORMATION: B46F; Subdoligranulum variabile (B46) forward
      primer
<220> FEATURE:
<221> NAME/KEY: misc_feature
<222> LOCATION: (1)..(19)

<400> SEQUENCE: 13
```
tccacgtaag tcacaagcg                                              19

<210> SEQ ID NO 14
<211> LENGTH: 20
<212> TYPE: DNA
<213> ORGANISM: Artificial Sequence
<220> FEATURE:
<223> OTHER INFORMATION: B46R; Subdoligranulum variabile (B46) reverse
      primer
<220> FEATURE:
<221> NAME/KEY: misc_feature
<222> LOCATION: (1)..(20)

<400> SEQUENCE: 14
cgcctacctg tgcactactc                                             20

<210> SEQ ID NO 15
<211> LENGTH: 21
<212> TYPE: DNA
<213> ORGANISM: Artificial Sequence
<220> FEATURE:
<223> OTHER INFORMATION: EubF; Eubacteria forward primer
<220> FEATURE:
<221> NAME/KEY: misc_feature
<222> LOCATION: (1)..(21)

<400> SEQUENCE: 15
actcctacgg gaggcagcag t                                           21

<210> SEQ ID NO 16
<211> LENGTH: 22
<212> TYPE: DNA
<213> ORGANISM: Artificial Sequence
<220> FEATURE:
<223> OTHER INFORMATION: EubR; Eubacteria reverse primer
<220> FEATURE:
<221> NAME/KEY: misc_feature
<222> LOCATION: (1)..(22)

<400> SEQUENCE: 16
gtattaccgc ggctgctggc ac                                          22

<210> SEQ ID NO 17
<211> LENGTH: 20
<212> TYPE: DNA
<213> ORGANISM: Artificial Sequence
<220> FEATURE:
<223> OTHER INFORMATION: VAKK_F; A. muciniphila forward primer
<220> FEATURE:
<221> NAME/KEY: misc_feature
<222> LOCATION: (1)..(20)

<400> SEQUENCE: 17
cagcacgtga aggtggggac                                             20

<210> SEQ ID NO 18
<211> LENGTH: 20
<212> TYPE: DNA
<213> ORGANISM: Artificial Sequence
<220> FEATURE:
<223> OTHER INFORMATION: VAKK_R; A. muciniphila reverse primer
<220> FEATURE:
<221> NAME/KEY: misc_feature
<222> LOCATION: (1)..(20)

<400> SEQUENCE: 18
ccttgcggtt ggcttcagat                                             20